United States Patent
Gao et al.

(10) Patent No.: US 12,454,586 B2
(45) Date of Patent: Oct. 28, 2025

(54) DIIMINE METAL COMPLEX, PREPARATION METHOD THEREFOR, AND APPLICATION THEREOF

(71) Applicants: CHINA PETROLEUM & CHEMICAL CORPORATION, Beijing (CN); BEIJING RESEARCH INSTITUTE OF CHEMICAL INDUSTRY, CHINA PETROLEUM & CHEMICAL CORPORATION, Beijing (CN)

(72) Inventors: Rong Gao, Beijing (CN); Jingjing Lai, Beijing (CN); Zifang Guo, Beijing (CN); Qingqiang Gou, Beijing (CN); Junling Zhou, Beijing (CN); Dongbing Liu, Beijing (CN); Xiaofan Zhang, Beijing (CN); Jie Lin, Beijing (CN); Xinyang Li, Beijing (CN); Junhui Zhang, Beijing (CN); Yuanning Gu, Beijing (CN); Yan Li, Beijing (CN); Jingyan An, Beijing (CN); Jie Fu, Beijing (CN); Yanhong Wan, Beijing (CN)

(73) Assignees: CHINA PETROLEUM & CHEMICAL CORPORATION, Beijing (CN); BEIJING RESEARCH INSTITUTE OF CHEMICAL INDUSTRY, CHINA PETROLEUM & CHEMICAL CORPORATION, Beijing (CN)

( * ) Notice: Subject to any disclaimer, the term of this patent is extended or adjusted under 35 U.S.C. 154(b) by 709 days.

(21) Appl. No.: 17/755,554

(22) PCT Filed: Oct. 30, 2020

(86) PCT No.: PCT/CN2020/125399
§ 371 (c)(1),
(2) Date: May 2, 2022

(87) PCT Pub. No.: WO2021/083350
PCT Pub. Date: May 6, 2021

(65) Prior Publication Data
US 2022/0282005 A1  Sep. 8, 2022

(30) Foreign Application Priority Data

Oct. 31, 2019 (CN) .......................... 201911048975.0
Oct. 31, 2019 (CN) .......................... 201911049039.1
Oct. 31, 2019 (CN) .......................... 201911049898.0
Oct. 31, 2019 (CN) .......................... 201911049899.5

(51) Int. Cl.
| | |
|---|---|
| C08F 4/70 | (2006.01) |
| C07F 15/00 | (2006.01) |
| C07F 15/04 | (2006.01) |
| C08F 2/38 | (2006.01) |
| C08F 4/659 | (2006.01) |
| C08F 110/02 | (2006.01) |

(52) U.S. Cl.
CPC ............ *C08F 4/7098* (2013.01); *C07F 15/04* (2013.01); *C07F 15/045* (2013.01); *C08F 2/38* (2013.01); *C08F 4/65912* (2013.01); *C08F 4/7006* (2013.01); *C08F 110/02* (2013.01); *C07F 15/0066* (2013.01)

(58) Field of Classification Search
CPC .... C07F 15/045; C07F 15/04; C07F 15/0066; C08F 4/7006; C08F 4/7098; C08F 2410/03
See application file for complete search history.

(56) References Cited

U.S. PATENT DOCUMENTS

| | | | |
|---|---|---|---|
| 6,103,658 A | 8/2000 | Mackenzie et al. | |
| 6,660,677 B1 | 12/2003 | Mackenzie et al. | |
| 2022/0396646 A1* | 12/2022 | Gao | C08F 220/64 |
| 2023/0002432 A1* | 1/2023 | Gao | C08F 10/02 |

FOREIGN PATENT DOCUMENTS

| | | | | |
|---|---|---|---|---|
| CN | 106397264 A | 2/2017 | | |
| CN | 106397261 B | 7/2018 | | |
| CN | 108864334 A | * 11/2018 | ............ | C07F 15/006 |
| CN | 108864335 A | * 11/2018 | ............ | C07F 15/006 |

(Continued)

OTHER PUBLICATIONS

Gao, R.; Guo, Z.; Zhou, J.; Li, Y.; Liu, D.; Zhang, X. Journal of Catalysis 2020, 385, 103-106. (Year: 2020).*

(Continued)

*Primary Examiner* — Rip A Lee
(74) *Attorney, Agent, or Firm* — NKL LAW; Allen Xue

(57) ABSTRACT

A diimine metal complex represented by Formula I, a preparation method therefor, and application thereof are provided. The complex is used as a main catalyst in catalysts for olefin polymerization, and can achieve catalytic ethylene polymerization at a high temperature to prepare high molecular weight branched polyethylene.

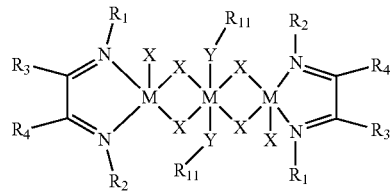

Formula I

29 Claims, 1 Drawing Sheet

(56) References Cited

FOREIGN PATENT DOCUMENTS

| | | | | |
|---|---|---|---|---|
| CN | 108864336 A | * | 11/2018 | ............ C07F 15/045 |
| CN | 112745358 A | * | 5/2021 | ............ C07F 15/04 |
| CN | 112745359 A | * | 5/2021 | ............ C07F 15/04 |
| CN | 112745361 A | * | 5/2021 | ............ C07F 15/04 |
| CN | 112745362 A | * | 5/2021 | ............ C07F 15/04 |
| DE | 889229 C | | 9/1953 | |
| EP | 4053174 A1 | | 9/2022 | |
| RU | 2681535 C1 | | 3/2019 | |
| WO | 9623010 A2 | | 8/1996 | |
| WO | 9803521 A1 | | 1/1998 | |
| WO | 9840374 A2 | | 9/1998 | |
| WO | 9905189 A1 | | 2/1999 | |
| WO | 9962968 A1 | | 12/1999 | |
| WO | 0006620 A3 | | 6/2000 | |
| WO | WO-2021083330 A1 | * | 5/2021 | ............ C07F 15/04 |
| WO | WO-2021083358 A1 | * | 5/2021 | ............ C07F 15/045 |

OTHER PUBLICATIONS

Viganò, Marta et al.; "A Chiral Ligand Accessible In One Step: Synthesis Of Bis-((R)-(+)-bornyl) acenaphthenequinonediimine And Of Its Zinc And Nickel Complexes"; Inorganica Chimica Acta; Aug. 31, 2018, vol. 483, 1, pp. 305-309.

Wen, Chunyan et al.; "Tailoring Polyethylenes by Nickel Complexes Bearing Modified 1-(2-Benzhydrylnaphthylimino)-2-phenyliminoacenaphthylene Derivatives"; American Chemical Society, Organometallics; Dec. 9, 2014, vol. 33, Issue 24, pp. 7223-7231.

Gao, Rong et al.; "One-step synthesis of hollow spherical polyethylene by dispersion", Journal of Catalysis, vol. 385; Mar. 31, 2020; pp. 103-106.

Meinhard, Dieter et al.; "Activation of Polymerization Catalysts: Synthesis and Characterization of Novel Dinuclear Nickel(I) Diimine Complexes", Organometallics; vol. 26; May 1, 2007; pp. 751-754.

Zhou, Mengxiang et al.; "Synthesis, crystal structures and electrochemical properties of Co(II) and Mn(II) complexes with asymmetric bulky BIAN ligands", Polyhedron, vol. 148, Apr. 7, 2018; pp. 88-99.

Helldorfer, Markus et al.; "(α-Diimine)nickel(II) complexes containing chloro substituted ligands as catalyst precursors for the oligomerization and polymerization of ethylene", Journal of Molecular Catalysis A: Chemical; vol. 193; Dec. 31, 2003; pp. 59-70.

Huo, Ping et al.; "Nickel(II) Complexes with Three-Dimensional Geometry α-Diimine Ligands: Synthesis and Catalytic Activity toward Copolymerization of Norbornene"; Organometallics; vol. 32; 2013; pp. 2291-2299.

Johnson, Lynda K. et al.; "New Pd(11)- and Ni(11)-Based Catalysts for Polymerization of Ethylene and a-Olefins"; J. Am.Chem.Soc; vol. 117; 1995; pp. 6414-6415.

* cited by examiner

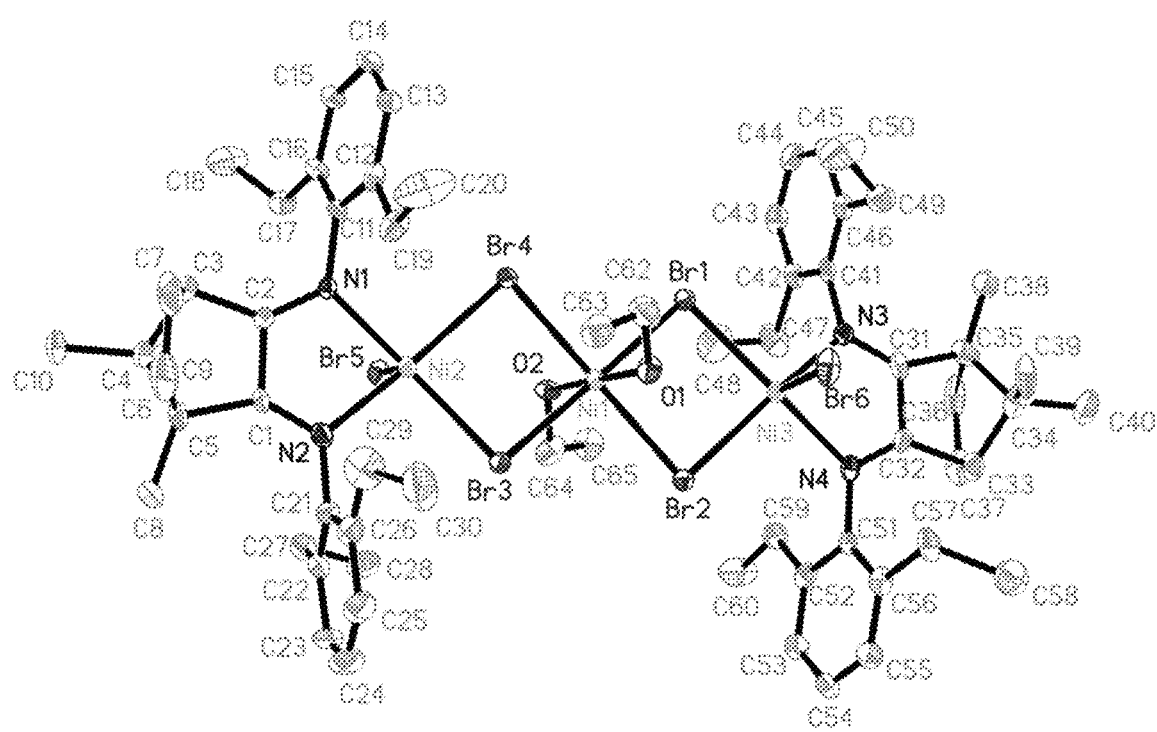

DIIMINE METAL COMPLEX, PREPARATION METHOD THEREFOR, AND APPLICATION THEREOF

TECHNICAL FIELD

The invention relates to diimine-metal complexes, preparation methods therefor and application thereof.

BACKGROUND ART

Compared with other resin materials, polyolefin resins have excellent environmental compatibility, and they are therefore widely used in industry and living goods. Polyethylene resins are important polyolefin resins. Commercial polyethylene catalysts include Ziegler-Natta type catalysts (see, for example, DE Pat 889229 (1953); IT Pat 545332 (1956) and IT Pat 536899 (1955); Chem. Rev., 2000, 100, 1169 and related references therein), Phillips type catalysts (see, for example, Belg. Pat. 530617 (1955); Chem. Rev. 1996, 96, 3327), and metallocene type catalysts (see, for example, W. Kaminsky, Metalorganic Catalysts for Synthesis and Polymerization, Berlin: Springer, 1999), as well as late-transition metal complex type high-efficiency ethylene oligomerization and polymerization catalysts that have been rapidly developed in recent years. For example, in 1995, Brookhart et al. reported a class of α-diimine Ni(II) complexes that can polymerize ethylene at a high activity.

The α-diimine nickel catalysts have attracted much attention because of their high activity and a great adjustability in molecular weight and branching degree of resulting polymers. Companies including Du Pont have filed multiple patent applications (WO 96/23010, WO 98/03521, WO 98/40374, WO 99/05189, WO 99/62968, WO 00/06620, U.S. Pat. Nos. 6,103,658, 6,660,677). Such α-diimine nickel catalysts can catalyze ethylene oligomerization or polymerization at a high activity under the action of methylaluminoxane or aluminum alkyls at normal temperature or a low temperature. However, when the reaction temperature is increased to above 50° C., the activity of such α-diimide nickel catalysts generally decreases rapidly, and the molecular weight of the prepared polyethylene decreases rapidly as the polymerization temperature increases.

Existing ethylene gas phase polymerization processes usually require a polymerization temperature of 85° C. or higher, and ethylene solution polymerization processes usually require a polymerization temperature of 130 to 250° C. Thus, there is a need to develop a late-transition metal catalyst suitable for use at a relatively high temperature, such as 80° C. or higher, to meet the requirements of existing gas-phase and solution ethylene polymerization equipment.

BRIEF DESCRIPTION OF THE DRAWINGS

The FIGURE is a structural unit diagram of the nickel complex Ni11 of Example 27 of the invention, in which hydrogen atoms, dichloromethane solvent molecules and atoms for symmetry operations are not marked to improve clarity.

SUMMARY OF THE INVENTION

In order to overcome the shortcomings of the prior art, the inventors have conducted diligent researches. As a result, it has been found that a class of diimine-metal complexes have good thermal stability. In particular, the diimine-metal complexes can still maintain a higher ethylene polymerization activity at a higher temperature, and the resulting polymer has a narrower molecular weight distribution.

An object of the present invention is to provide a diimine-metal complex as shown by Formula I:

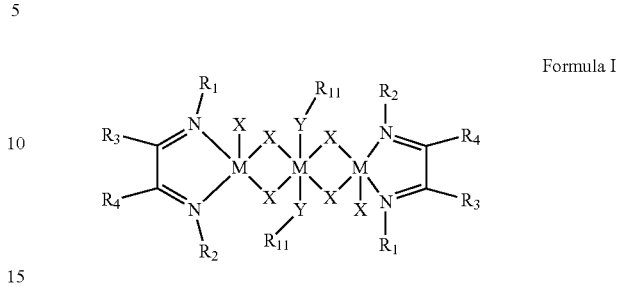

Formula I wherein, $R_1$ and $R_2$ are each independently a C1-C30 hydrocarbyl with or without a substituent Q; $R_3$ and $R_4$ are each independently selected from the group consisting of hydrogen, halogen, hydroxy, C1-C20 hydrocarbyl with or without a substituent Q, and adjacent $R_3$ and $R_4$ groups are optionally joined to form a ring or ring system; each $R_{11}$ is independently a C1-C20 hydrocarbyl with or without a substituent Q; each Y is independently a Group VIA non-metal atom; each M is independently a Group VIII metal, each X is independently selected from the group consisting of halogen, C1-C10 hydrocarbyl with or without a substituent Q and C1-C10 hydrocarbyloxy with or without a substituent Q.

Another object of the present invention is to provide a method for preparing the diimine-metal complex.

Another object of the present invention is to provide the use of the diimine-metal complex in olefin polymerization.

Still another object of the present invention is to provide a process for olefin polymerization, comprising performing an olefin polymerization reaction in the presence of the diimine-metal complex or a catalyst comprising the same.

DETAILED DESCRIPTION OF THE PREFERRED EMBODIMENTS

In a first aspect, the present invention provides a diimine-metal complex represented by Formula I:

Formula I wherein, $R_1$ and $R_2$ are each independently a C1-C30 hydrocarbyl with or without a substituent Q; $R_3$ and $R_4$ are each independently selected from the group consisting of hydrogen, halogen, hydroxy, C1-C20 hydrocarbyl with or without a substituent Q, and adjacent $R_3$ and $R_4$ groups are optionally joined to form a ring or ring system; each $R_{11}$ is independently a C1-C20 hydrocarbyl with or without a substituent Q; each Y is independently a Group VIA non-metal atom; each M is independently a Group VIII metal; each X is independently selected from the group consisting of halogen, C1-C10 hydrocarbyl with or without a substituent Q and C1-C10 hydrocarbyloxy with or without a substituent Q.

In some embodiments, $R_1$ and $R_2$ are independently selected from the group consisting of C1-C20 alkyl with or without a substituent Q and C6-C20 aryl with or without a substituent Q.

In preferred embodiments, $R_1$ and/or $R_2$ are/is a group represented by Formula A:

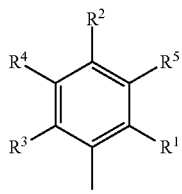

Formula A wherein, $R^1$-$R^5$ are each independently selected from the group consisting of hydrogen, halogen, hydroxy, C1-C20 alkyl with or without a substituent Q, C2-C20 alkenyl with or without a substituent Q, C2-C20 alkynyl with or without a substituent Q, C1-C20 alkoxy with or without a substituent Q, C2-C20 alkenoxy with or without a substituent Q, C2-C20 alkynoxy with or without a substituent Q, C6-C20 aryl with or without a substituent Q, C6-C20 aryloxy with or without a substituent Q, C7-C20 aralkyl with or without a substituent Q, C7-C20 aralkoxy with or without a substituent Q, C7-C20 alkaryl with or without a substituent Q and C7-C20 alkaryloxy with or without a substituent Q, and $R^1$-$R^5$ are optionally joined to form a ring or ring system.

Preferably, in Formula A, $R^1$-$R^5$ are each independently selected from the group consisting of hydrogen, halogen, hydroxy, C1-C10 alkyl with or without a substituent Q, C2-C10 alkenyl with or without a substituent Q, C2-C10 alkynyl with or without a substituent Q, C3-C10 cycloalkyl with or without a substituent Q, C1-C10 alkoxy with or without a substituent Q, C2-C10 alkenoxy with or without a substituent Q, C2-C10 alkynoxy with or without a substituent Q, C3-C10 cycloalkoxy with or without a substituent Q, C6-C15 aryl with or without a substituent Q, C6-C15 aryloxy with or without a substituent Q, C7-C15 aralkyl with or without a substituent Q, C7-C15 aralkoxy with or without a substituent Q, C7-C15 alkaryl with or without a substituent Q and C7-C15 alkaryloxy with or without a substituent Q.

In some embodiments, each M is independently selected from the group consisting of nickel and palladium.

In some embodiments, each Y is independently selected from the group consisting of O and S.

In some embodiments, each X is independently selected from the group consisting of halogen, C1-C10 alkyl with or without a substituent Q and C1-C10 alkoxy with or without a substituent Q, preferably from the group consisting of halogen, C1-C6 alkyl with or without a substituent Q and C1-C6 alkoxy with or without a substituent Q.

In some embodiments, each $R_{11}$ is independently a C1-C20 alkyl with or without a substituent Q, preferably a C1-C10 alkyl with or without a substituent Q, and more preferably a C1-C6 alkyl with or without a substituent Q.

In some embodiments, $R_3$ and $R_4$ are each independently selected from the group consisting of hydrogen, halogen, hydroxy, C1-C20 alkyl with or without a substituent Q, C2-C20 alkenyl with or without a substituent Q, C2-C20 alkynyl with or without a substituent Q, C1-C20 alkoxy with or without a substituent Q, C2-C20 alkenoxy with or without a substituent Q, C2-C20 alkynoxy with or without a substituent Q, C6-C20 aryl with or without a substituent Q, C6-C20 aryloxy with or without a substituent Q, C7-C20 aralkyl with or without a substituent Q, C7-C20 aralkoxy with or without a substituent Q, C7-C20 alkaryl with or without a substituent Q and C7-C20 alkaryloxy with or without a substituent Q. Preferably, $R_3$ and $R_4$ are each independently selected from the group consisting of hydrogen, halogen, hydroxy, C1-C10 alkyl with or without a substituent Q, C2-C10 alkenyl with or without a substituent Q, C2-C10 alkynyl with or without a substituent Q, C3-C10 cycloalkyl with or without a substituent Q, C1-C10 alkoxy with or without a substituent Q, C2-C10 alkenoxy with or without a substituent Q, C2-C10 alkynoxy with or without a substituent Q, C3-C10 cycloalkoxy with or without a substituent Q, C6-C15 aryl with or without a substituent Q, C6-C15 aryloxy with or without a substituent Q, C7-C15 aralkyl with or without a substituent Q, C7-C15 aralkoxy with or without a substituent Q, C7-C15 alkaryl with or without a substituent Q and C7-C15 alkaryloxy with or without a substituent Q. More preferably, $R_3$ and $R_4$ are each independently selected from the group consisting of hydrogen, C1-C10 alkyl, halogenated C1-C10 alkyl, C1-C10 alkoxy, halogenated C1-C10 alkoxy and halogen, and more preferably from the group consisting of hydrogen, C1-C6 alkyl, halogenated C1-C6 alkyl, C1-C6 alkoxy, halogenated C1-C6 alkoxy and halogen.

In some embodiments, the substituent Q is selected from the group consisting of halogen, hydroxy, C1-C10 alkyl, halogenated C1-C10 alkyl, C1-C10 alkoxy and halogenated C1-C10 alkoxy, preferably from the group consisting of halogen, hydroxy, C1-C6 alkyl, halogenated C1-C6 alkyl, C1-C6 alkoxy and halogenated C1-C6 alkoxy. Preferably, the C1-C6 alkyl is selected from the group consisting of methyl, ethyl, n-propyl, isopropyl, n-butyl, isobutyl, n-pentyl, isopentyl, n-hexyl, isohexyl and 3,3-dimethylbutyl. Preferably, the C1-C6 alkoxy is selected from the group consisting of methoxy, ethoxy, n-propoxy, iso-propoxy, n-butoxy, iso-butoxy, n-pentoxy, iso-pentoxy, n-hexoxy, iso-hexoxy and 3,3-dimethylbutoxy.

As used herein, the term "halogen" refers to fluorine, chlorine, bromine or iodine.

In some embodiments, the diimine-metal complexes according to the invention are as shown by Formula III:

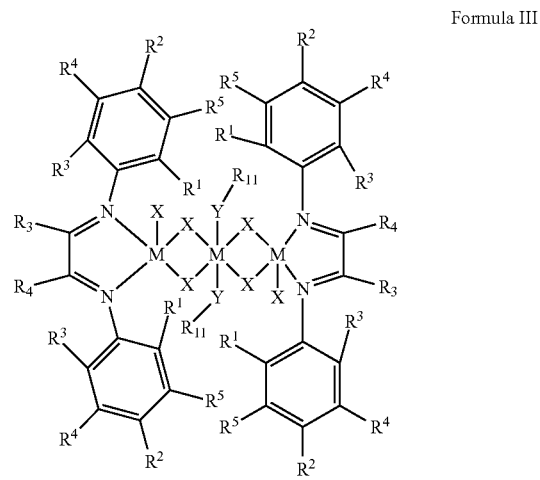

Formula III wherein, $R^1$-$R^5$ are each independently selected from the group consisting of hydrogen, halogen, hydroxy, C1-C10 alkyl with or without a substituent Q, C3-C10 cycloalkyl with or without a substituent Q, C1-C10 alkoxy with or without a substituent Q, C3-C10 cycloalkoxy with or without a substituent Q, C6-C15 aryl with or without a substituent Q, C7-C15 aralkyl with or without a substituent Q and C7-C15 alkaryl with or without a substituent Q;

$R_3$ and $R_4$ are each independently selected from the group consisting of hydrogen, C1-C10 alkyl, halogenated C1-C10 alkyl, C1-C10 alkoxy, halogenated C1-C10 alkoxy and halogen, and more preferably from the group consisting of hydrogen, C1-C6 alkyl, halogenated C1-C6 alkyl, C1-C6 alkoxy, halogenated C1-C6 alkoxy and halogen;

each M is nickel;

each Y is O;

each X is independently selected from the group consisting of fluorine, chlorine and bromine;

each $R_{11}$ is independently a C1-C20 alkyl with or without a substituent Q, preferably a C1-C10 alkyl with or without a substituent Q, and more preferably a C1-C6 alkyl with or without a substituent Q;

preferably, the substituent Q are independently selected from the group consisting of halogen, hydroxy, C1-C6 alkyl, halogenated C1-C6 alkyl, C1-C6 alkoxy and halogenated C1-C6 alkoxy.

In a subaspect, the diimine-metal complexes according to the invention are as shown by Formula Ia:

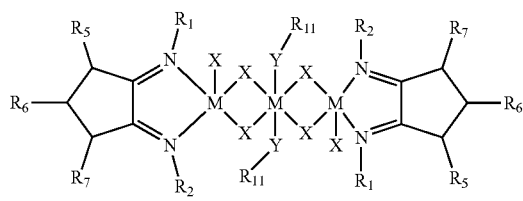

Formula Ia wherein, $R_5$-$R_7$ are each independently selected from the group consisting of hydrogen, halogen, hydroxy, C1-C20 hydrocarbyl with or without a substituent Q, and $R_5$-$R_7$ are optionally joined to form a ring or ring system; $R_1$, $R_2$, $R_{11}$, Y, M and X are as defined above for Formula I.

In some embodiments of this subaspect, $R_1$ and $R_2$ are independently selected from the group consisting of C1-C20 alkyl with or without a substituent Q and C6-C20 aryl with or without a substituent Q. Preferably, $R_1$ and/or $R_2$ are/is a group represented by Formula A:

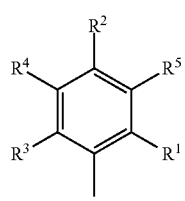

Formula A wherein, $R^1$-$R^5$ are each independently selected from the group consisting of hydrogen, halogen, hydroxy, C1-C20 alkyl with or without a substituent Q, C2-C20 alkenyl with or without a substituent Q, C2-C20 alkynyl with or without a substituent Q, C1-C20 alkoxy with or without a substituent Q, C2-C20 alkenoxy with or without a substituent Q, C2-C20 alkynoxy with or without a substituent Q, C6-C20 aryl with or without a substituent Q, C6-C20 aryloxy with or without a substituent Q, C7-C20 aralkyl with or without a substituent Q, C7-C20 aralkoxy with or without a substituent Q, C7-C20 alkaryl with or without a substituent Q and C7-C20 alkaryloxy with or without a substituent Q, and $R^1$-$R^5$ are optionally joined to form a ring or ring system. Preferably, $R^1$-$R^5$ are each independently selected from the group consisting of hydrogen, halogen, hydroxy, C1-C10 alkyl with or without a substituent Q, C2-C10 alkenyl with or without a substituent Q, C2-C10 alkynyl with or without a substituent Q, C3-C10 cycloalkyl with or without a substituent Q, C1-C10 alkoxy with or without a substituent Q, C2-C10 alkenoxy with or without a substituent Q, C2-C10 alkynoxy with or without a substituent Q, C3-C10 cycloalkoxy with or without a substituent Q, C6-C15 aryl with or without a substituent Q, C6-C15 aryloxy with or without a substituent Q, C7-C15 aralkyl with or without a substituent Q, C7-C15 aralkoxy with or without a substituent Q, C7-C15 alkaryl with or without a substituent Q and C7-C15 alkaryloxy with or without a substituent Q.

In some embodiments of this subaspect, each M is independently selected from the group consisting of nickel and palladium.

In some embodiments of this subaspect, each Y is independently selected from the group consisting of O and S.

In some embodiments of this subaspect, each X is independently selected from the group consisting of halogen, C1-C10 alkyl with or without a substituent Q and C1-C10 alkoxy with or without a substituent Q, preferably from the group consisting of halogen, C1-C6 alkyl with or without a substituent Q and C1-C6 alkoxy with or without a substituent Q.

In some embodiments of this subaspect, each $R_{11}$ is independently a C1-C20 alkyl with or without a substituent Q, preferably a C1-C10 alkyl with or without a substituent Q, and more preferably a C1-C6 alkyl with or without a substituent Q.

In some embodiments of this subaspect, the substituent Q is selected from the group consisting of halogen, hydroxy, C1-C10 alkyl, halogenated C1-C10 alkyl, C1-C10 alkoxy and halogenated C1-C10 alkoxy, preferably from the group consisting of halogen, hydroxy, C1-C6 alkyl, halogenated C1-C6 alkyl, C1-C6 alkoxy and halogenated C1-C6 alkoxy. Preferably, the C1-C6 alkyl is selected from the group consisting of methyl, ethyl, n-propyl, isopropyl, n-butyl, isobutyl, n-pentyl, isopentyl, n-hexyl, isohexyl and 3,3-dimethylbutyl. Preferably, the C1-C6 alkoxy is selected from the group consisting of methoxy, ethoxy, n-propoxy, iso-propoxy, n-butoxy, iso-butoxy, n-pentoxy, iso-pentoxy, n-hexoxy, iso-hexoxy and 3,3-dimethylbutoxy.

In some embodiments of this subaspect, the diimine-metal complexes are as shown by Formula IIa:

Formula IIa

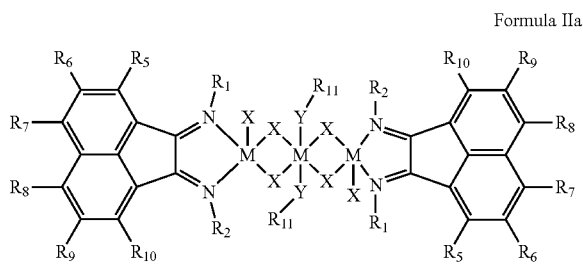

wherein, $R_5$-$R_{10}$ are each independently selected from the group consisting of hydrogen, halogen, hydroxy, C1-C20 alkyl with or without a substituent Q, C2-C20 alkenyl with or without a substituent Q, C2-C20 alkynyl with or without a substituent Q, C1-C20 alkoxy with or without a substituent Q, C2-C20 alkenoxy with or without a substituent Q, C2-C20 alkynoxy with or without a substituent Q, C6-C20 aryl with or without a substituent Q, C6-C20 aryloxy with or without a substituent Q, C7-C20 aralkyl with or without a substituent Q, C7-C20 aralkoxy with or without a substituent Q, C7-C20 alkaryl with or without a substituent Q and C7-C20 alkaryloxy with or without a substituent Q, $R_1$, $R_2$, M, X, Y and Ru are as defined above for Formula Ia.

In some embodiments of this subaspect, $R_5$-$R_7$ in Formula Ia and $R_5$-$R_{10}$ in Formula IIIa are each independently selected from the group consisting of hydrogen, halogen, hydroxy, C1-C10 alkyl with or without a substituent Q, C2-C10 alkenyl with or without a substituent Q, C2-C10 alkynyl with or without a substituent Q, C3-C10 cycloalkyl with or without a substituent Q, C1-C10 alkoxy with or without a substituent Q, C2-C10 alkenoxy with or without a substituent Q, C2-C10 alkynoxy with or without a substituent Q, C3-C10 cycloalkoxy with or without a substituent Q, C6-C15 aryl with or without a substituent Q, C6-C15 aryloxy with or without a substituent Q, C7-C15 aralkyl with or without a substituent Q, C7-C15 aralkoxy with or without a substituent Q, C7-C15 alkaryl with or without a substituent Q and C7-C15 alkaryloxy with or without a substituent Q. Preferably, $R_5$-$R_7$ in Formula Ia and $R_5$-$R_{10}$ in Formula IIIa are each independently selected from the group consisting of hydrogen, C1-C10 alkyl, halogenated C1-C10 alkyl, C1-C10 alkoxy, halogenated C1-C10 alkoxy and halogen, and more preferably from the group consisting of hydrogen, C1-C6 alkyl, halogenated C1-C6 alkyl, C1-C6 alkoxy, halogenated C1-C6 alkoxy and halogen.

In some embodiments of this subaspect, the diimine-metal complexes are as shown by Formula IIIa:

Formula IIIa

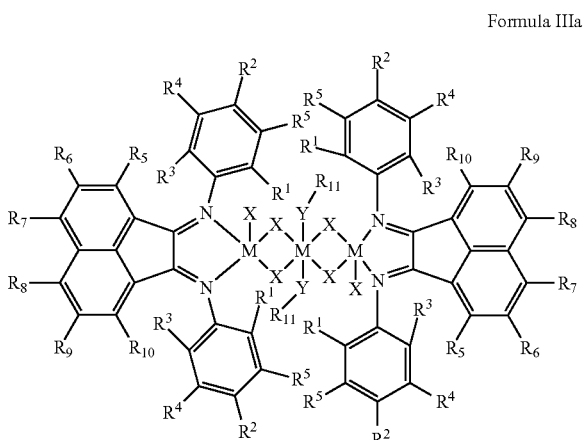

wherein, $R^1$-$R^5$ are independently selected from the group consisting of hydrogen, halogen, C1-C6 alkyl with or without a substituent Q and C1-C6 alkoxy with or without a substituent Q; $R_5$-$R_{10}$ are independently selected from the group consisting of hydrogen, halogen, C1-C6 alkyl and C1-C6 alkoxy; each M is nickel; each Y is O; each X is independently a halogen; each $R_{11}$ is independently a C1-C6 alkyl with or without a substituent Q.

In some embodiments of this subaspect, the diimine-metal complexes according to the invention are selected from the group consisting of:

1) the complex represented by Formula IIIa, wherein $R^1$=$R^3$=isopropyl, $R^2$=$R^4$=$R^5$=$R_5$-$R_{10}$=H, $R_{11}$=methyl, M=Ni, Y=O, X=Br;
2) the complex represented by Formula IIIa, wherein $R^1$=$R^3$=ethyl, $R^2$=$R^4$=$R^5$=$R_5$-$R_{10}$=H, $R_{11}$=methyl, M=Ni, Y=O, X=Br;
3) the complex represented by Formula IIIa, wherein $R^1$=$R^3$=methyl, $R^2$=$R^4$=$R^5$=$R_5$-$R_{10}$=H, $R_{11}$=methyl, M=Ni, Y=O, X=Br;
4) the complex represented by Formula IIIa, wherein $R^1$-$R^3$=methyl, $R^4$=$R^5$=$R_5$-$R_{10}$=H, $R_{11}$=methyl, M=Ni, Y=O, X=Br;
5) the complex represented by Formula IIIa, wherein $R^1$=$R^3$=methyl, $R^2$=Br, $R^4$=$R^5$=$R_5$-$R_{10}$=H, $R_{11}$=methyl, M=Ni, Y=O, X=Br;
6) the complex represented by Formula IIIa, wherein $R^1$=$R^3$=Br, $R^2$=$R^4$=$R^5$=$R_5$-$R_{10}$=H, $R_{11}$=methyl, M=Ni, Y=O, X=Br;
7) the complex represented by Formula IIia, wherein $R^1$=$R^3$=Cl, $R^2$=$R^4$=$R^5$=$R_5$-$R_{10}$=H, $R_{11}$=methyl, M=Ni, Y=O, X=Br;
8) the complex represented by Formula IIIa, wherein $R^1$=$R^3$=F, $R^2$=$R^4$=$R^5$=$R_5$-$R_{10}$=H, $R_{11}$=methyl, M=Ni, Y=O, X=Br;
9) the complex represented by Formula IIIa, wherein $R^1$=$R^3$=isopropyl, $R^2$-$R^4$=$R^5$=$R_5$-$R_{10}$=H, $R_{11}$=ethyl, M=Ni, Y=O, X=Br;
10) the complex represented by Formula IIIa, wherein $R^1$=$R^3$=ethyl, $R^2$=$R^4$=$R^5$=$R_5$-$R_{10}$=H, $R_{11}$=ethyl, M=Ni, Y=O, X=Br;
11) the complex represented by Formula IIIa, wherein $R^1$=$R^3$=methyl, $R^2$=$R^4$=$R^5$=$R_5$-$R_{10}$=H, $R_{11}$=ethyl, M=Ni, Y=O, X=Br;
12) the complex represented by Formula IIIa, wherein $R_1$-$R^3$=methyl, $R^4$=$R^5$=$R_5$-$R_{10}$=H, $R_{11}$=ethyl, M=Ni, Y=O, X=Br;
13) the complex represented by Formula IIIa, wherein $R^1$=$R^3$=methyl, $R^2$=Br, $R^4$=$R^5$=$R_5$-$R_{10}$=H, $R_{11}$=ethyl, M=Ni, Y=O, X=Br;
14) the complex represented by Formula IIIa, wherein $R^1$=$R^3$=Br, $R^2$=$R^4$=$R^5$=$R_5$-$R_{10}$=H, $R_{11}$=ethyl, M=Ni, Y=O, X=Br;
15) the complex represented by Formula IIIa, wherein $R^1$=$R^3$=Cl, $R^2$=$R^4$=$R^5$=$R_5$-$R_{10}$=H, $R_{11}$=ethyl, M=Ni, Y=O, X=Br;
16) the complex represented by Formula IIIa, wherein $R^1$=$R^3$=F, $R^2$=$R^4$=$R^5$=$R_5$-$R_{10}$=H, $R_{11}$=ethyl, M=Ni, Y=O, X=Br;
17) the complex represented by Formula IIIa, wherein $R^1$=$R^3$=isopropyl, $R^2$=$R^4$=$R^5$=$R_5$-$R_{10}$=H, $R_{11}$=isobutyl, M=Ni, Y=O, X=Br;
18) the complex represented by Formula IIIa, wherein $R^1$=$R^3$=ethyl, $R^2$=$R^4$=$R_5$=$R_5$-$R_{10}$=H, $R_{11}$=isobutyl, M=Ni, Y=O, X=Br;

19) the complex represented by Formula IIIa, wherein $R^1=R^3=$methyl, $R^2=R^4=R^5=R_5-R_{10}=H$, $R_{11}=$isobutyl, M=Ni, Y=O, X=Br;
20) the complex represented by Formula IIIa, wherein $R_1-R^3=$methyl, $R^4=R^5=R_5-R_{10}=H$, $R_{11}=$isobutyl, M=Ni, Y=O, X=Br;
21) the complex represented by Formula IIIa, wherein $R^1=R^3=$methyl, $R^2=$Br, $R^4=R^5=R_5-R_{10}=H$, $R_{11}=$isobutyl, M=Ni, Y=O, X=Br;
22) the complex represented by Formula IIIa, wherein $R^1=R^3=$Br, $R^2=R^4=R^5=R_5-R_{10}=H$, $R_{11}=$isobutyl, M=Ni, Y=O, X=Br;
23) the complex represented by Formula IIIa, wherein $R^1=R^3=$Cl, $R^2=R^4=R^5=R_5-R_{10}=H$, $R_{11}=$isobutyl, M=Ni, Y=O, X=Br;
24) the complex represented by Formula IIIa, wherein $R^1=R^3=$F, $R^2=R^4=R^5=R_5-R_{10}=H$, $R_{11}=$isobutyl, M=Ni, Y=O, X=Br;
25) the complex represented by Formula IIIa, wherein $R^1=R^3=$isopropyl, $R^2=R^4=R_3=R_5=R_6=R_9=R_{10}=H$, $R_7=R_8=$methyl, $R_{11}=$ethyl, M=Ni, Y=O, X=Br;
26) the complex represented by Formula IIIa, wherein $R^1=R^3=$ethyl, $R^2=R^4=R^5=R_5=R_6=R_9=R_{10}=H$, $R_7=R_8=$methyl, $R_{11}=$ethyl, M=Ni, Y=O, X=Br;
27) the complex represented by Formula IIIa, wherein $R^1=R^3=$methyl, $R^2=R^4=R^5=R_5=R_6=R_9=R_{10}=H$, $R_7=R_8=$methyl, $R_{11}=$ethyl, M=Ni, Y=O, X=Br;
28) the complex represented by Formula IIIa, wherein $R^1-R^3=$methyl, $R^4=R^5=R_5=R_6=R_9=R_{10}=H$, $R_7=R_8=$methyl, $R_{11}=$ethyl, M=Ni, Y=O, X=Br;
29) the complex represented by Formula IIIa, wherein $R^1=R^3=$methyl, $R^2=$Br, $R^4=R^5=R_5=R_6=R_9=R_{10}=H$, $R_7=R_8=$methyl, $R_{11}=$ethyl, M=Ni, Y=O, X=Br;
30) the complex represented by Formula IIIa, wherein $R^1=R^3=$Br, $R^2=R^4=R^5=R_5=R_6=R_9=R_{10}=H$, $R_7=R_8=$methyl, $R_{11}=$ethyl, M=Ni, Y=O, X=Br;
31) the complex represented by Formula IIIa, wherein $R_1=R_3=$Cl, $R^2=R^4=R^5=R_5=R_6=R_9=R_{10}=H$, $R_7=R_8=$methyl, $R_{11}=$ethyl, M=Ni, Y=O, X=Br; and
32) the complex represented by Formula IIIa, wherein $R^1=R^3=$F, $R^2=R^4=R^5=R_5=R_6=R_9=R_{10}=H$, $R_7=R_8=$methyl, $R_{11}=$ethyl, M=Ni, Y=O, X=Br.

In a subaspect, the diimine-metal complexes according to the invention are represented by Formula Ib:

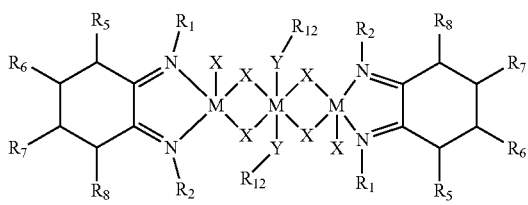

Formula Ib wherein, $R_1$ and $R_2$ are each independently a C1-C30 hydrocarbyl with or without a substituent Q; $R_5-R_8$ are each independently selected from the group consisting of hydrogen, halogen, hydroxy, C1-C20 hydrocarbyl with or without a substituent Q, and $R_5-R_8$ are optionally joined to form a ring or ring system; each $R_{12}$ is independently a C1-C20 hydrocarbyl with or without a substituent Q; each Y is independently a Group VIA nonmetal atom; each M is independently a Group VIII metal; each X is independently selected from the group consisting of halogen, C1-C10 hydrocarbyl with or without a substituent Q and C1-C10 hydrocarbyloxy with or without a substituent Q.

In some embodiments of this subaspect, $R_1$ and $R_2$ are independently selected from the group consisting of C1-C20 alkyl with or without a substituent Q and C6-C20 aryl with or without a substituent Q. Preferably, $R_1$ and/or $R_2$ are/is a group represented by Formula A:

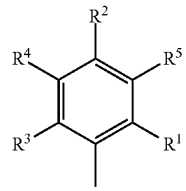

Formula A wherein $R^1-R^5$ are each independently selected from the group consisting of hydrogen, halogen, hydroxy, C1-C20 alkyl with or without a substituent Q, C2-C20 alkenyl with or without a substituent Q, C2-C20 alkynyl with or without a substituent Q, C1-C20 alkoxy with or without a substituent Q, C2-C20 alkenoxy with or without a substituent Q, C2-C20 alkynoxy with or without a substituent Q, C6-C20 aryl with or without a substituent Q, C6-C20 aryloxy with or without a substituent Q, C7-C20 aralkyl with or without a substituent Q, C7-C20 aralkoxy with or without a substituent Q, C7-C20 alkaryl with or without a substituent Q and C7-C20 alkaryloxy with or without a substituent Q, and $R^1-R^5$ are optionally joined to form a ring or ring system. Preferably, $R^1-R^5$ are each independently selected from the group consisting of hydrogen, halogen, hydroxy, C1-C10 alkyl with or without a substituent Q, C2-C10 alkenyl with or without a substituent Q, C2-C10 alkynyl with or without a substituent Q, C3-C10 cycloalkyl with or without a substituent Q, C1-C10 alkoxy with or without a substituent Q, C2-C10 alkenoxy with or without a substituent Q, C2-C10 alkynoxy with or without a substituent Q, C3-C10 cycloalkoxy with or without a substituent Q, C6-C15 aryl with or without a substituent Q, C6-C15 aryloxy with or without a substituent Q, C7-C15 aralkyl with or without a substituent Q, C7-C15 aralkoxy with or without a substituent Q, C7-C15 alkaryl with or without a substituent Q and C7-C15 alkaryloxy with or without a substituent Q.

In some embodiments of this subaspect, each M is independently selected from the group consisting of nickel and palladium.

In some embodiments of this subaspect, each Y is independently selected from the group consisting of O and S.

In some embodiments of this subaspect, each X is independently selected from the group consisting of halogen, C1-C10 alkyl with or without a substituent Q and C1-C10 alkoxy with or without a substituent Q, preferably from the group consisting of halogen, C1-C6 alkyl with or without a substituent Q and C1-C6 alkoxy with or without a substituent Q.

In some embodiments of this subaspect, each $R_{12}$ is independently a C1-C20 alkyl with or without a substituent Q, preferably a C1-C10 alkyl with or without a substituent Q, and more preferably a C1-C6 alkyl with or without a substituent Q.

In some embodiments of this subaspect, the substituent Q is selected from the group consisting of halogen, hydroxy, C1-C10 alkyl, halogenated C1-C10 alkyl, C1-C10 alkoxy and halogenated C1-C10 alkoxy, preferably from the group consisting of halogen, hydroxy, C1-C6 alkyl, halogenated C1-C6 alkyl, C1-C6 alkoxy and halogenated C1-C6 alkoxy. Preferably, the C1-C6 alkyl is selected from the group consisting of methyl, ethyl, n-propyl, isopropyl, n-butyl, isobutyl, n-pentyl, isopentyl, n-hexyl, isohexyl and 3,3-dimethylbutyl. Preferably, the C1-C6 alkoxy is selected from the group consisting of methoxy, ethoxy, n-propoxy, iso-propoxy, n-butoxy, iso-butoxy, n-pentoxy, iso-pentoxy, n-hexoxy, iso-hexoxy and 3,3-dimethylbutoxy.

In some embodiments of this subaspect, the diimine-metal complexes are as shown by Formula IIIb:

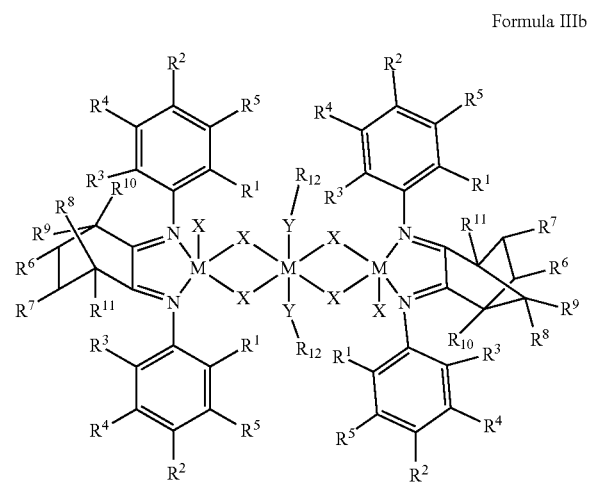

Formula IIIb wherein, $R^1$-$R^{11}$ are each independently selected from the group consisting of hydrogen, halogen, hydroxy, C1-C20 alkyl with or without a substituent Q, C2-C20 alkenyl with or without a substituent Q, C2-C20 alkynyl with or without a substituent Q, C1-C20 alkoxy with or without a substituent Q, C2-C20 alkenoxy with or without a substituent Q, C2-C20 alkynoxy with or without a substituent Q, C6-C20 aryl with or without a substituent Q, C6-C20 aryloxy with or without a substituent Q, C7-C20 aralkyl with or without a substituent Q, C7-C20 aralkoxy with or without a substituent Q, C7-C20 alkaryl with or without a substituent Q and C7-C20 alkaryloxy with or without a substituent Q, M, X, Y and $R_{12}$ are as defined above for Formula Ib.

In some embodiments of this subaspect, $R^1$-$R^{11}$ are each independently selected from the group consisting of hydrogen, halogen, hydroxy, C1-C10 alkyl with or without a substituent Q, C2-C10 alkenyl with or without a substituent Q, C2-C10 alkynyl with or without a substituent Q, C3-C10 cycloalkyl with or without a substituent Q, C1-C10 alkoxy with or without a substituent Q, C2-C10 alkenoxy with or without a substituent Q, C2-C10 alkynoxy with or without a substituent Q, C3-C10 cycloalkoxy with or without a substituent Q, C6-C15 aryl with or without a substituent Q, C6-C15 aryloxy with or without a substituent Q, C7-C15 aralkyl with or without a substituent Q, C7-C15 aralkoxy with or without a substituent Q, C7-C15 alkaryl with or without a substituent Q and C7-C15 alkaryloxy with or without a substituent Q. Preferably, $R^1$-$R^{11}$ are each independently selected from the group consisting of hydrogen, C1-C10 alkyl, halogenated C1-C10 alkyl, C1-C10 alkoxy, halogenated C1-C10 alkoxy and halogen, and more preferably from the group consisting of hydrogen, C1-C6 alkyl, halogenated C1-C6 alkyl, C1-C6 alkoxy, halogenated C1-C6 alkoxy and halogen.

In some embodiments of this subaspect, the diimine-metal complexes according to the invention are selected from the group consisting of:

1) the diimine-metal complex represented by Formula IIIb, wherein $R^1=R^3$=methyl, $R^2=R^4$-$R^7=R^{10}$=H, $R^8=R^9=R^{11}=R_{12}$=methyl, M=Ni, Y=O, X=Br;
2) the diimine-metal complex represented by Formula IIIb, wherein $R^1=R^3$=ethyl, $R^2=R^4$-$R^7=R^{10}$=H, $R^8=R^9=R^{11}=R_{12}$=methyl, M=Ni, Y=O, X=Br;
3) the diimine-metal complex represented by Formula IIIb, wherein $R^1=R^3$=isopropyl, $R^2=R^4$-$R^7=R^{10}$=H, $R^8=R^9=R^{11}=R_{12}$=methyl, M=Ni, Y=O, X=Br;
4) the diimine-metal complex represented by Formula IIIb, wherein $R^1$-$R^3$=methyl, $R^4$-$R^7=R^{10}$=H, $R^8=R^9=R^{11}=R_{12}$=methyl, M=Ni, Y=O, X=Br;
5) the diimine-metal complex represented by Formula IIIb, wherein $R^1=R^3$=methyl, $R^2$=Br, $R^4$-$R^7=R^{10}$=H, $R^8=R^9=R^{11}=R_{12}$=methyl, M=Ni, Y=O, X=Br;
6) the diimine-metal complex represented by Formula IIIb, wherein $R^1=R^3$=F, $R^2=R^4$-$R^7=R^{10}$=H, $R^8=R^9=R^{11}=R_{12}$=methyl, M=Ni, Y=O, X=Br;
7) the diimine-metal complex represented by Formula IIIb, wherein $R^1=R^3$=Cl, $R^2=R^4$-$R^7=R^{10}$=H, $R^8=R^9=R^{11}=R_{12}$=methyl, M=Ni, Y=O, X=Br;
8) the diimine-metal complex represented by Formula IIIb, wherein $R^1=R^3$=Br, $R^2=R^4$-$R^7=R^{10}$=H, $R^8=R^9=R^{11}=R_{12}$=methyl, M=Ni, Y=O, X=Br;
9) the diimine-metal complex represented by Formula IIIb, wherein $R^1=R^3$=methyl, $R^2=R^4$-$R^7=R^{10}$=H, $R^8=R^9=R^{11}$=methyl, $R_{12}$=ethyl, M=Ni, Y=O, X=Br;
10) the diimine-metal complex represented by Formula IIIb, wherein $R^1=R^3$=ethyl, $R^2=R^4$-$R^7=R^{10}$=H, $R^8=R^9=R^{11}$=methyl, $R_{12}$=ethyl, M=Ni, Y=O, X=Br;
11) the diimine-metal complex represented by Formula IIIb, wherein $R^1=R^3$=isopropyl, $R^2=R^4$-$R^7=R^{10}$=H, $R^8=R^9=R^{11}$=methyl, $R_{12}$=ethyl, M=Ni, Y=O, X=Br;
12) the diimine-metal complex represented by Formula IIIb, wherein $R^1$-$R^3$=methyl, $R^4$-$R^7=R^{10}$=H, $R^8=R^9=R^{11}$=methyl, $R_{12}$=ethyl, M=Ni, Y=O, X=Br;
13) the diimine-metal complex represented by Formula IIIb, wherein $R^1=R^3$=methyl, $R^2$=Br, $R^4$-$R^7=R^{10}$=H, $R^8=R^9=R^{11}$=methyl, $R_{12}$=ethyl, M=Ni, Y=O, X=Br;
14) the diimine-metal complex represented by Formula IIIb, wherein $R^1=R^3$=F, $R^2=R^4$-$R^7=R^{10}$=H, $R^8=R^9=R^{11}$=methyl, $R_{12}$=ethyl, M=Ni, Y=O, X=Br;
15) the diimine-metal complex represented by Formula IIIb, wherein $R^1=R^3$=Cl, $R^2=R^4$-$R^7=R^{10}$=H, $R^8=R^9=R^{11}$=methyl, $R_{12}$=ethyl, M=Ni, Y=O, X=Br;
16) the diimine-metal complex represented by Formula IIIb, wherein $R^1=R^3$=Br, $R^2=R^4$-$R^7=R^{10}$=H, $R^8=R^9=R^{11}$=methyl, $R_{12}$=ethyl, M=Ni, Y=O, X=Br;
17) the diimine-metal complex represented by Formula IIIb, wherein $R^1=R^3$=methyl, $R^2=R^4$-$R^7=R^{10}$=H, $R^8=R^9=R^{11}$=methyl, $R_{12}$=isobutyl, M=Ni, Y=O, X=Br;
18) the diimine-metal complex represented by Formula IIIb, wherein $R^1=R^3$=ethyl, $R^2=R^4$-$R^7=R^{10}$=H, $R^8=R^9=R^{11}$=methyl, $R_{12}$=isobutyl, M=Ni, Y=O, X=Br;

19) the diimine-metal complex represented by Formula IIIb, wherein $R^1=R^3$=isopropyl, $R^2=R^4$-$R^7=R^{10}$=H, $R^8=R^9=R^{11}$=methyl, $R_{12}$=isobutyl, M=Ni, Y=O, X=Br;
20) the diimine-metal complex represented by Formula IIIb, wherein $R^1$-$R^3$=methyl, $R^4$-$R^7=R^{10}$=H, $R^8=R^9=R^{11}$=methyl, $R_{12}$=isobutyl, M=Ni, Y=O, X=Br;
21) the diimine-metal complex represented by Formula IIIb, wherein $R^1=R^3$=methyl, $R^2$=Br, $R^4$-$R^7=R^{10}$=H, $R^8=R^9=R^{11}$=methyl, $R_{12}$=isobutyl, M=Ni, Y=O, X=Br;
22) the diimine-metal complex represented by Formula IIIb, wherein $R^1=R^3$=F, $R^2=R^4$-$R^7=R^{10}$=H, $R^8=R^9=R^{11}$=methyl, $R_{12}$=isobutyl, M=Ni, Y=O, X=Br;
23) the diimine-metal complex represented by Formula IIIb, wherein $R^1=R^3$=Cl, $R^2=R^4$-$R^7=R^{10}$=H, $R^8=R^9=R^{11}$=methyl, $R_{12}$=isobutyl, M=Ni, Y=O, X=Br;
24) the diimine-metal complex represented by Formula IIIb, wherein $R^1=R^3$=Br, $R^2=R^4$-$R^7=R^{10}$=H, $R^8=R^9=R^{11}$=methyl, $R_{12}$=isobutyl, M=Ni, Y=O, X=Br;
25) the diimine-metal complex represented by Formula IIIb, wherein $R^1=R^3$=methyl, $R^2=R^4$-$R^7=R^{10}$=H, $R^8=R^9$=methyl, $R^{11}$=bromomethyl, $R_{12}$=ethyl, M=Ni, Y=O, X=Br;
26) the diimine-metal complex represented by Formula IIIb, wherein $R^1=R^3$=ethyl, $R^2=R^4$-$R^7=R^{10}$=H, $R^8=R^9$=methyl, $R^{11}$=bromomethyl, $R_{12}$=ethyl, M=Ni, Y=O, X=Br;
27) the diimine-metal complex represented by Formula IIIb, wherein $R^1=R^3$=isopropyl, $R^2=R^4$-$R^7=R^{10}$=H, $R^8=R^9$=methyl, $R^{11}$=bromomethyl, $R_{12}$=ethyl, M=Ni, Y=O, X=Br;
28) the diimine-metal complex represented by Formula IIIb, wherein $R^1$-$R^3$=methyl, $R^4$-$R^7=R^{10}$=H, $R^8=R^9$=methyl, $R^{11}$=bromomethyl, $R_{12}$=ethyl, M=Ni, Y=O, X=Br;
29) the diimine-metal complex represented by Formula IIIb, wherein $R^1=R^3$=methyl, $R^2$=Br, $R^4$-$R^7=R^{10}$=H, $R^8=R^9$=methyl, $R^{11}$=bromomethyl, $R_{12}$=ethyl, M=Ni, Y=O, X=Br;
30) the diimine-metal complex represented by Formula IIIb, wherein $R^1=R^3$=F, $R^2=R^4$-$R^7=R^{10}$=H, $R^8=R^9$=methyl, $R^{11}$=bromomethyl, $R_{12}$=ethyl, M=Ni, Y=O, X=Br;
31) the diimine-metal complex represented by Formula IIIb, wherein $R^1=R^3$=Cl, $R^2=R^4$-$R^7=R^{10}$=H, $R^8=R^9$=methyl, $R^{11}$=bromomethyl, $R_{12}$=ethyl, M=Ni, Y=O, X=Br;
32) the diimine-metal complex represented by Formula IIIb, wherein $R^1=R^3$=Br, $R^2=R^4$-$R^7=R^{10}$=H, $R^8=R^9$=methyl, $R^{11}$=bromomethyl, $R_{12}$=ethyl, M=Ni, Y=O, X=Br.

In another sub-aspect, the diimine-metal complexes according to the invention are represented by Formula Ic:

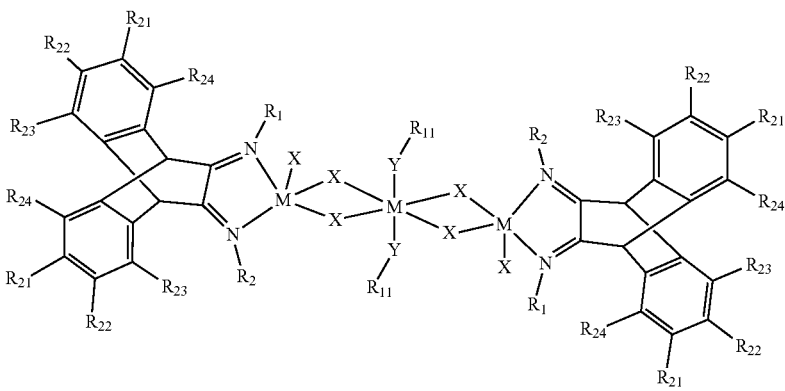

Formula Ic wherein, $R_{21}$-$R_{24}$ are each independently selected from the group consisting of hydrogen, halogen, hydroxy, C1-C20 hydrocarbyl with or without a substituent Q and C1-C20 hydrocarbyloxy with or without a substituent Q, and $R_{21}$-$R_{24}$ are optionally joined to form a ring or ring system; $R_1$, $R_2$, $R_{11}$, Y, M and X are as defined above for Formula I.

In some embodiments of this subaspect, $R_1$ and $R_2$ are independently selected from the group consisting of C1-C20 alkyl with or without a substituent Q and C6-C20 aryl with or without a substituent Q. Preferably, $R_1$ and/or $R_2$ are/is a group represented by Formula A:

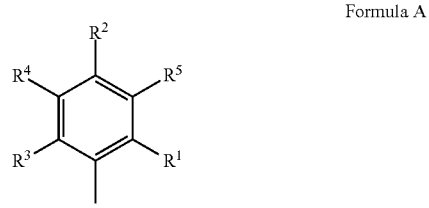

Formula A wherein, $R^1$-$R^5$ are each independently selected from the group consisting of hydrogen, halogen, hydroxy, C1-C20 alkyl with or without a substituent Q, C2-C20 alkenyl with or without a substituent Q, C2-C20 alkynyl with or without a substituent Q, C1-C20 alkoxy with or without a substituent Q, C2-C20 alkenoxy with or without a substituent Q, C2-C20 alkynoxy with or without a substituent Q, C6-C20 aryl with or without a substituent Q, C6-C20 aryloxy with or without a substituent Q, C7-C20 aralkyl with or without a substituent Q, C7-C20 aralkoxy with or without a substituent Q, C7-C20 alkaryl with or without a substituent Q and C7-C20 alkaryloxy with or without a substituent Q, and $R^1$-$R^5$ are optionally joined to form a ring or ring system. Preferably, $R^1$-$R^5$ are each independently selected from the group consisting of hydrogen, halogen, hydroxy, C1-C10 alkyl with or without a substituent Q, C2-C10 alkenyl with or without a substituent Q, C2-C10 alkynyl with or without a substituent Q, C3-C10 cycloalkyl with or without a substituent Q, C1-C10 alkoxy with or without a substituent Q, C2-C10 alkenoxy with or without a substituent Q, C2-C10 alkynoxy with or without a substituent Q, C3-C10 cycloalkoxy with or without a substituent Q, C6-C15 aryl with or without a substituent Q, C6-C15 aryloxy with or without a substituent Q, C7-C15 aralkyl with or without a substituent Q, C7-C15 aralkoxy with or without a substituent Q, C7-C15 alkaryl with or without a substituent Q and C7-C15 alkaryloxy with or without a substituent Q.

In some embodiments of this subaspect, each M is independently selected from the group consisting of nickel and palladium.

In some embodiments of this subaspect, each Y is independently selected from the group consisting of O and S.

In some embodiments of this subaspect, each X is independently selected from the group consisting of halogen, C1-C10 alkyl with or without a substituent Q and C1-C10 alkoxy with or without a substituent Q, preferably from the group consisting of halogen, C1-C6 alkyl with or without a substituent Q and C1-C6 alkoxy with or without a substituent Q.

In some embodiments of this subaspect, each $R_{11}$ is independently a C1-C20 alkyl with or without a substituent Q, preferably a C1-C10 alkyl with or without a substituent Q, and more preferably a C1-C6 alkyl with or without a substituent Q.

In some embodiments of this subaspect, the substituent Q is selected from the group consisting of halogen, hydroxy, C1-C10 alkyl, halogenated C1-C10 alkyl, C1-C10 alkoxy and halogenated C1-C10 alkoxy, preferably from the group consisting of halogen, hydroxy, C1-C6 alkyl, halogenated C1-C6 alkyl, C1-C6 alkoxy and halogenated C1-C6 alkoxy. Preferably, the C1-C6 alkyl is selected from the group consisting of methyl, ethyl, n-propyl, isopropyl, n-butyl, isobutyl, n-pentyl, isopentyl, n-hexyl, isohexyl and 3,3-dimethylbutyl. Preferably, the C1-C6 alkoxy is selected from the group consisting of methoxy, ethoxy, n-propoxy, iso-propoxy, n-butoxy, iso-butoxy, n-pentoxy, iso-pentoxy, n-hexoxy, iso-hexoxy and 3,3-dimethylbutoxy.

In some embodiments of this subaspect, the diimine-metal complexes according to the invention have a structure represented by Formula IIIc:

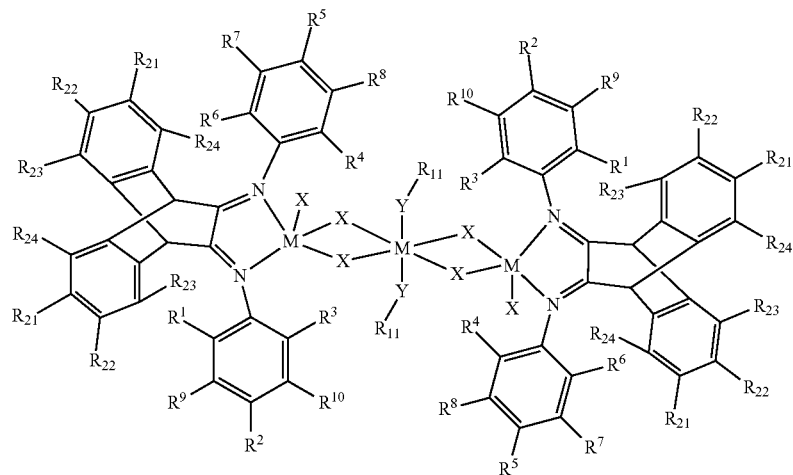

Formula IIIc wherein, $R^1$-$R^{10}$, $R_{21}$-$R_{24}$ are each independently selected from the group consisting of hydrogen, halogen, hydroxy, C1-C20 alkyl with or without a substituent Q, C2-C20 alkenyl with or without a substituent Q, C2-C20 alkynyl with or without a substituent Q, C1-C20 alkoxy with or without a substituent Q, C2-C20 alkenoxy with or without a substituent Q, C2-C20 alkynoxy with or without a substituent Q, C6-C20 aryl with or without a substituent Q, C6-C20 aryloxy with or without a substituent Q, C7-C20 aralkyl with or without a substituent Q, C7-C20 aralkoxy with or without a substituent Q, C7-C20 alkaryl with or without a substituent Q and C7-C20 alkaryloxy with or without a substituent Q, and $R^1$-$R^{10}$ are optionally joined to form a ring or ring system, $R_{21}$-$R_{24}$ are optionally joined to form a ring or ring system; $R_{11}$, Y, M and X are as defined above for Formula Ic.

In some embodiments of this subaspect, $R^1$-$R^{10}$, $R_{21}$-$R_{24}$ are each independently selected from the group consisting of hydrogen, halogen, hydroxy, C1-C10 alkyl with or without a substituent Q, C2-C10 alkenyl with or without a substituent Q, C2-C10 alkynyl with or without a substituent Q, C3-C10 cycloalkyl with or without a substituent Q, C1-C10 alkoxy with or without a substituent Q, C2-C10 alkenoxy with or without a substituent Q, C2-C10 alkynoxy with or without a substituent Q, C3-C10 cycloalkoxy with or without a substituent Q, C6-C15 aryl with or without a substituent Q, C6-C15 aryloxy with or without a substituent Q, C7-C15 aralkyl with or without a substituent Q, C7-C15 aralkoxy with or without a substituent Q, C7-C15 alkaryl with or without a substituent Q and C7-C15 alkaryloxy with or without a substituent Q. Preferably, $R^1$-$R^{10}$, $R_{21}$-$R_{24}$ are each independently selected from the group consisting of hydrogen, C1-C10 alkyl, halogenated C1-C10 alkyl, C1-C10 alkoxy, halogenated C1-C10 alkoxy and halogen, and more preferably from the group consisting of hydrogen, C1-C6 alkyl, halogenated C1-C6 alkyl, C1-C6 alkoxy, halogenated C1-C6 alkoxy and halogen.

In some embodiments of this subaspect, the diimine-metal complexes of the present invention have a structure represented by Formula IIIc:

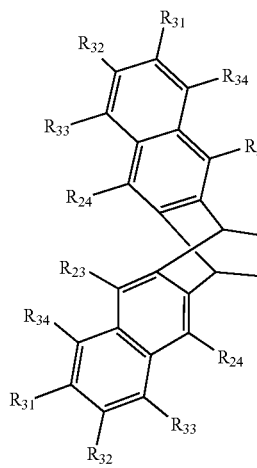

wherein, $R_{31}$-$R_{34}$ have the same meanings as $R_{21}$-$R_{24}$ in Formula Ic, preferably $R_{33}$ and $R_{34}$ are hydrogen; and $R_{11}$, Y, M and X are as defined above for Formula Ic.

In some embodiments, $R_{31}$-$R_{34}$ are each independently selected from the group consisting of hydrogen, hydroxy, C1-C20 alkyl with or without a substituent Q, C2-C20 alkenyl with or without a substituent Q, C2-C20 alkynyl with or without a substituent Q, C1-C20 alkoxy with or without a substituent Q, C2-C20 alkenoxy with or without a substituent Q, C2-C20 alkynoxy with or without a substituent Q, C6-C20 aryl with or without a substituent Q, C6-C20 aryloxy with or without a substituent Q, C7-C20 aralkyl with or without a substituent Q, C7-C20 aralkoxy with or without a substituent Q, C7-C20 alkaryl with or without a substituent Q, C7-C20 alkaryloxy with or without a substituent Q and halogen. Preferably, $R_{31}$-$R_{34}$ are each independently selected from the group consisting of hydrogen, halogen, hydroxy, C1-C10 alkyl with or without a substituent Q, C2-C10 alkenyl with or without a substituent Q, C2-C10 alkynyl with or without a substituent Q, C3-C10 cycloalkyl with or without a substituent Q, C1-C10 alkoxy with or without a substituent Q, C2-C10 alkenoxy with or without a substituent Q, C2-C10 alkynoxy with or without a substituent Q, C3-C10 cycloalkoxy with or without a substituent Q, C6-C15 aryl with or without a substituent Q, C6-C15 aryloxy with or without a substituent Q, C7-C15 aralkyl with or without a substituent Q, C7-C15 aralkoxy with or without a substituent Q, C7-C15 alkaryl with or without a substituent Q and C7-C15 alkaryloxy with or without a substituent Q. More preferably, $R_{31}$-$R_{34}$ are each independently selected from the group consisting of hydrogen, C1-C10 alkyl, halogenated C1-C10 alkyl, C1-C10 alkoxy, halogenated C1-C10 alkoxy and halogen, and more preferably from the group consisting of hydrogen, C1-C6 alkyl, halogenated C1-C6 alkyl, C1-C6 alkoxy, halogenated C1-C6 alkoxy and halogen.

In some embodiments of this subaspect, the diimine-metal complexes of the present invention are selected from the group consisting of:

Formula IIc

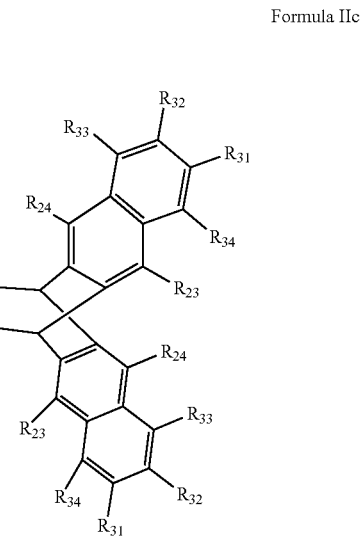

1) the complex represented by Formula IIIc, wherein $R^1$=$R^3$=$R^4$=$R^6$=isopropyl, $R^2$=$R^5$=$R^7$-$R^{10}$$R_{21}$=$R_{22}$=$R_{23}$=$R_{24}$=H, $R_{11}$=ethyl, M=Ni, Y=O, X=Br;
2) the complex represented by Formula IIIc, wherein $R^1$=$R^3$=$R^4$=$R^6$=ethyl, $R^2$=$R^5$=$R^7$-$R^{10}$$R_{21}$=$R_{22}$=$R_{23}$=$R_{24}$=H, $R_{11}$=ethyl, M=Ni, Y=O, X=Br;
3) the complex represented by Formula IIIc, wherein $R^1$=$R^3$=$R^4$=$R^6$=methyl, $R^2$=$R^5$=$R^7$-$R^{10}$$R_{21}$=$R_{22}$=$R_{23}$=$R_{24}$=H, $R_{11}$=ethyl, M=Ni, Y=O, X=Br;
4) the complex represented by Formula IIIc, wherein $R^1$-$R^6$=methyl, $R^7$-$R^{10}$=$R_{21}$=$R_{22}$=$R_{23}$=$R_{24}$=H, $R_{11}$=ethyl, M=Ni, Y=O, X=Br;
5) the complex represented by Formula IIIc, wherein $R^1$=$R^3$=$R^4$=$R^6$=Br, $R^2$=$R^5$=$R^7$-$R^{10}$$R_{21}$=$R_{22}$=$R_{23}$=$R_{24}$=H, $R_{11}$=ethyl, M=Ni, Y=O, X=Br;
6) the complex represented by Formula IIIc, wherein $R^1$=$R^3$=$R^4$=$R^6$=Cl, $R^2$=$R^5$=$R^7$-$R^{10}$$R_{21}$=$R_{22}$=$R_{23}$=$R_{24}$=H, $R_{11}$=ethyl, M=Ni, Y=O, X=Br;
7) the complex represented by Formula IIIc, wherein $R^1$=$R^3$=$R^4$=$R^6$=F, $R^2$=$R^5$=$R^7$-$R^{10}$$R_{21}$=$R_{22}$=$R_{23}$=$R_{24}$=H, $R_{11}$=ethyl, M=Ni, Y=O, X=Br;
8) the complex represented by Formula IIIc, wherein $R^1$=$R^3$=$R^4$=$R^6$=isopropyl, $R^2$=$R^5$=$R^7$-$R^{10}$$R_{21}$=$R_{22}$=$R_3$=$R_{24}$=H, $R_{11}$=isobutyl, M=Ni, Y=O, X=Br;
9) the complex represented by Formula IIIc, wherein $R^1$=$R^3$=$R^4$=$R^6$=ethyl, $R^2$=$R^5$=$R^7$-$R^{10}$=$R_{21}$=$R_{22}$=$R_{23}$=$R_{24}$=H, $R_{11}$=isobutyl, M=Ni, Y=O, X=Br;
10) the complex represented by Formula IIIc, wherein $R^1$=$R^3$=$R^4$=$R^6$=methyl, $R^2$=$R^5$=$R^7$-$R^{10}$=$R_{21}$=$R_{22}$=$R_{23}$=$R_{24}$=H, $R_{11}$=isobutyl, M=Ni, Y=O, X=Br;

11) the complex represented by Formula IIIc, wherein $R^1$-$R^6$=methyl, $R^7$-$R^{10}$=$R_{21}$=$R_{22}$=$R_{23}$=$R_{24}$=H, $R_{11}$=isobutyl, M=Ni, Y=O, X=Br;
12) the complex represented by Formula IIIc, wherein $R^1$=$R^3$=$R^4$=$R^6$=Br, $R^2$=$R^5$=$R^7$-$R^{10}$$R_{21}$=$R_{22}$=$R_{23}$=$R_{24}$=H, $R_{11}$=isobutyl, M=Ni, Y=O, X=Br;
13) the complex represented by Formula IIIc, wherein $R^1$=$R^3$=$R^4$=$R^6$=Cl, $R^2$=$R^5$=$R^7$-$R^{10}$=$R_{21}$=$R_{22}$=$R_{23}$=$R_{24}$=H, $R_{11}$=isobutyl, M=Ni, Y=O, X=Br,
14) the complex represented by Formula IIIc, wherein $R^1$=$R^3$=$R^4$=$R^6$=F, $R^2$=$R^5$=$R^7$-$R^{10}$=$R_{21}$=$R_{22}$=$R_{23}$=$R_{24}$=H, $R_{11}$=isobutyl, M=Ni, Y=O, X=Br;
15) the complex represented by Formula IIIc, wherein $R^1$=$R^3$=$R^4$=$R^6$=isopropyl, $R^2$=$R^5$=$R^7$-$R^{10}$=$R_{22}$=H, $R_{21}$=tert-butyl, $R_{23}$=$R_{24}$=H, $R_{11}$=ethyl, M=Ni, Y=O, X=Br;
16) the complex represented by Formula IIIc, wherein $R^1$=$R^3$=$R^4$=$R^6$=ethyl, $R^2$=$R^5$=$R^7$-$R^{10}$=$R_{22}$=H, $R_{21}$=tert-butyl, $R_{23}$=$R_{24}$=H, $R_{11}$=ethyl, M=Ni, Y=O, X=Br;
17) the complex represented by Formula IIIc, wherein $R^1$=$R^3$=$R^4$=$R^6$=methyl, $R^2$=$R^5$=$R^7$-$R^{10}$=$R_{22}$=H, $R_{21}$=tert-butyl, $R_{23}$=$R_{24}$=H, $R_{11}$=ethyl, M=Ni, Y=O, X=Br;
18) the complex represented by Formula IIIc, wherein $R^1$-$R^6$=methyl, $R^7$-$R^{10}$=$R_{22}$=H, $R_{21}$=tert-butyl, $R_{23}$=$R_{24}$=H, $R_{11}$=ethyl, M=Ni, Y=O, X=Br;
19) the complex represented by Formula IIIc, wherein $R^1$=$R^3$=$R^4$=$R^6$=Br, $R^2$=$R^5$=$R^7$-$R^{10}$=$R_{22}$=H, $R_{21}$=tert-butyl, $R_{23}$=$R_{24}$=H, $R_{11}$=ethyl, M=Ni, Y=O, X=Br;
20) the complex represented by Formula IIIc, wherein $R^1$=$R^3$=$R^4$=$R^6$=Cl, $R^2$=$R^5$=$R^7$-$R^{10}$=$R_{22}$=H, $R_{21}$=tert-butyl, $R_{23}$=$R_{24}$=H, $R_{11}$=ethyl, M=Ni, Y=O, X=Br;
21) the complex represented by Formula IIIc, wherein $R^1$=$R^3$=$R^4$=$R^6$=F, $R^2$=$R^5$=$R^7$-$R^{10}$=$R_{22}$=H, $R_{21}$=tert-butyl, $R_{23}$=$R_{24}$=H, $R_{11}$=ethyl, M=Ni, Y=O, X=Br;
22) the complex represented by Formula IIIc, wherein $R^1$=$R^3$=$R^4$=$R^6$=isopropyl, $R^2$=$R^5$=$R^7$-$R^{10}$=$R_{22}$=H, $R_{21}$=tert-butyl, $R_{23}$=$R_{24}$=H, $R_{11}$=isobutyl, M=Ni, Y=O, X=Br;
23) the complex represented by Formula IIIc, wherein $R^1$=$R^3$=$R^4$=$R^6$=ethyl, $R^2$=$R^5$=$R^7$-$R^{10}$=$R_{22}$=H, $R_{21}$=tert-butyl, $R_{23}$=$R_{24}$=H, $R_{11}$=isobutyl, M=Ni, Y=O, X=Br;
24) the complex represented by Formula IIIc, wherein $R^1$=$R^3$=$R^4$=$R^6$=methyl, $R^2$=$R^5$=$R^7$-$R^{10}$=$R_{22}$=H, $R_{21}$=tert-butyl, $R_{23}$=$R_{24}$=H, $R_{11}$=isobutyl, M=Ni, Y=O, X=Br;
25) the complex represented by Formula IIIc, wherein $R^1$-$R^6$=methyl, $R^7$-$R^{10}$=$R_{22}$=H, $R_{21}$=tert-butyl, $R_{23}$=$R_{24}$=H, $R_{11}$=isobutyl, M=Ni, Y=O, X=Br;
26) the complex represented by Formula IIIc, wherein $R^1$=$R^3$=$R^4$=$R^6$=Br, $R^2$=$R^5$=$R^7$-$R^{10}$=$R_{22}$=H, $R_{21}$=tert-butyl, $R_{23}$=$R_{24}$=H, $R_{11}$=isobutyl, M=Ni, Y=O, X=Br;
27) the complex represented by Formula IIIc, wherein $R^1$=$R^3$=$R^4$=$R^6$=Cl, $R^2$=$R^5$=$R^7$-$R^{10}$=$R_{22}$=H, $R_{21}$=tert-butyl, $R_{23}$=$R_{24}$=H, $R_{11}$=isobutyl, M=Ni, Y=O, X=Br;
28) the complex represented by Formula IIIc, wherein $R^1$=$R^3$=$R^4$=$R^6$=F, $R^2$=$R^5$=$R^7$-$R^{10}$=$R_{22}$=H, $R_{21}$=tert-butyl, $R_{23}$=$R_{24}$=H, $R_{11}$=isobutyl, M=Ni, Y=O, X=Br;

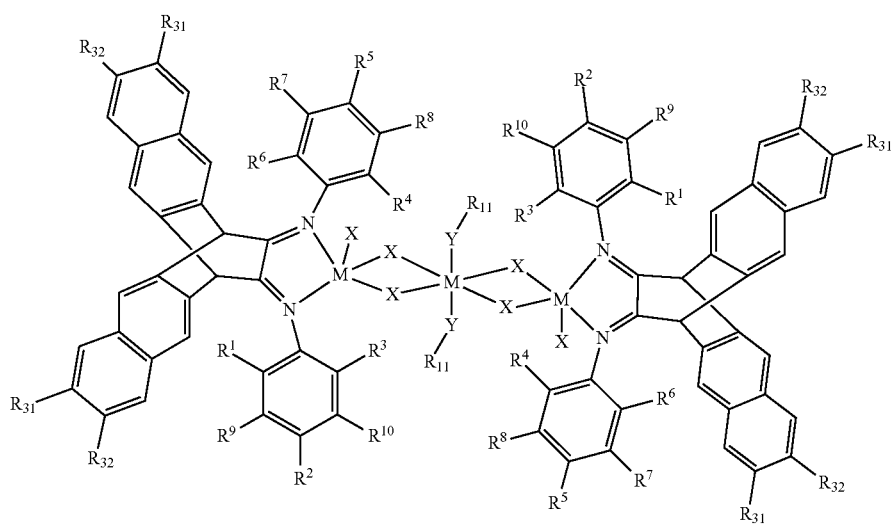

(IIIc')

29) the complex represented by Formula (IIIc'), wherein $R^1$=$R^3$=$R^4$=$R^6$=isopropyl, $R^2$=$R^5$=$R^7$-$R^{10}$=$R_{31}$=$R_{32}$=H, $R_{11}$=ethyl, M=Ni, Y=O, X=Br;
30) the complex represented by Formula (IIIc'), wherein $R^1$=$R^3$=$R^4$=$R^6$=ethyl, $R^2$=$R^5$=$R^7$-$R^{10}$=$R_{31}$=$R_{32}$=H, $R_{11}$=ethyl, M=Ni, Y=O, X=Br;
31) the complex represented by Formula (IIIc'), wherein $R^1$=$R^3$=$R^4$=$R^6$=methyl, $R^2$=$R^5$=$R^7$-$R^{10}$=$R_{31}$=$R_{32}$=H, $R_{11}$=ethyl, M=Ni, Y=O, X=Br;
32) the complex represented by Formula (IIIc'), wherein $R^1$-$R^6$=methyl, $R^7$-$R^{10}$=$R_{31}$=$R_{32}$=H, $R_{11}$=ethyl, M=Ni, Y=O, X=Br;
33) the complex represented by Formula (IIIc'), wherein $R^1$=$R^3$=$R^4$=$R^6$=Br, $R^2$=$R^5$=$R^7$-$R^{10}$=$R_{31}$=$R_{32}$=H, $R_{11}$=ethyl, M=Ni, Y=O, X=Br;
34) the complex represented by Formula (IIIc'), wherein $R^1$=$R^3$=$R^4$=$R^6$=Cl, $R^2$=$R^5$=$R^7$-$R^{10}$=$R_{31}$=$R_{32}$=H, $R_{11}$=ethyl, M=Ni, Y=O, X=Br;

35) the complex represented by Formula (IIIc'), wherein $R^1=R^3=R^4=R^6=F$, $R^2=R^5=R^7-R^{10}=R_{31}=R_{32}=H$, $R_{11}$=ethyl, M=Ni, Y=O, X=Br;
36) the complex represented by Formula (IIIc'), wherein $R^1=R^3=R^4=R^6$=isopropyl, $R^2=R^5=R^7-R^{10}=R_{31}=R_{32}=H$, $R_{11}$=isobutyl, M=Ni, Y=O, X=Br;
37) the complex represented by Formula (IIIc'), wherein $R^1=R^3=R^4=R^6$=ethyl, $R^2=R^5=R^7-R^{10}=R_{31}=R_{32}=H$, $R_{11}$=isobutyl, M=Ni, Y=O, X=Br;
38) the complex represented by Formula (IIIc'), wherein $R^1=R^3=R^4=R^6$=methyl, $R^2=R^5=R^7-R^{10}=R_{31}=R_{32}=H$, $R_{11}$=isobutyl, M=Ni, Y=O, X=Br;
39) the complex represented by Formula (IIIc'), wherein $R^1-R^6$=methyl, $R^7-R^{10}=R_{31}=R_{32}=H$, $R_{11}$=isobutyl, M=Ni, Y=O, X=Br;
40) the complex represented by Formula (IIIc'), wherein $R^1=R^3=R^4=R^6$=Br, $R^2=R^5=R^7—R^{10}=R_{31}=R_{32}=H$, $R_{11}$=isobutyl, M=Ni, Y=O, X=Br;
41) the complex represented by Formula (IIIc'), wherein $R^1=R^3=R^4=R^6$=Cl, $R^2=R^5=R^7-R^{10}=R_{31}=R_{32}=H$, $R^{11}$=isobutyl, M=Ni, Y=O, X=Br;
42) the complex represented by Formula (IIIc'), wherein $R^1=R^3=R^4=R^6$=F, $R^2=R^5=R^7-R^{10}=R_{31}=R_{32}=H$, $R_{11}$=isobutyl, M=Ni, Y=O, X=Br;
43) the complex represented by Formula (IIIc'), wherein $R^1=R^3=R^4=R^6$=isopropyl, $R^2=R^5=R^7-R^{10}=H$, $R_{31}=R_{32}=R_{11}$=ethyl, M=Ni, Y=O, X=Br;
44) the complex represented by Formula (IIIc'), wherein $R^1=R^3=R^4=R^6$=ethyl, $R^2=R^5=R^7-R^{10}=H$, $R_{31}=R_{32}=R_{11}$=ethyl, M=Ni, Y=O, X=Br;
45) the complex represented by Formula (IIIc'), wherein $R^1=R^3=R^4=R^6$=methyl, $R^2=R^5=R^7-R^{10}=H$, $R_{31}=R_{32}=R_{11}$=ethyl, M=Ni, Y=O, X=Br;
46) the complex represented by Formula (IIIc'), wherein $R^1-R^6$=methyl, $R^7-R^{10}$=H, $R_{31}=R_{32}=R_{11}$=ethyl, M=Ni, Y=O, X=Br;
47) the complex represented by Formula (IIIc'), wherein $R^1=R^3=R^4=R^6$=Br, $R^2=R^5=R^7-R^{10}=H$, $R_{31}=R_{32}=R_{11}$=ethyl, M=Ni, Y=O, X=Br;
48) the complex represented by Formula (IIIc'), wherein $R^1=R^3=R^4=R^6$=Cl, $R^2=R^5=R^7-R^{10}=H$, $R_{31}=R_{32}=R_{11}$=ethyl, M=Ni, Y=O, X=Br;
49) the complex represented by Formula (IIc'), wherein $R^1=R^3=R^4=R^6$=F, $R^2=R^5=R^7-R^{10}=H$, $R_{31}=R_{32}=R_{11}$=ethyl, M=Ni, Y=O, X=Br;
50) the complex represented by Formula (IIIc'), wherein $R^1=R^3=R^4=R^6$=isopropyl, $R^2=R^5=R^7-R^{10}=H$, $R_{31}=R_{32}=R_{11}$=ethyl, M=Ni, Y=O, X=Br;
51) the complex represented by Formula (IIIc'), wherein $R^1=R^3=R^4=R^6$=ethyl, $R^2=R^5=R^7-R^{10}=H$, $R_{31}=R_{32}$=ethyl, $R_{11}$=isobutyl, M=Ni, Y=O, X=Br;
52) the complex represented by Formula (IIIc'), wherein $R^1=R^3=R^4=R^6$=methyl, $R^2=R^5=R^7-R^{10}=H$, $R_{31}=R_{32}$=ethyl, $R_{11}$=isobutyl, M=Ni, Y=O, X=Br;
53) the complex represented by Formula (IIIc'), wherein $R^1-R^6$=methyl, $R^7-R^{10}$=H, $R_{31}=R_{32}$=ethyl, $R_{11}$=isobutyl, M=Ni, Y=O, X=Br;
54) the complex represented by Formula (IIIc'), wherein $R^1=R^3=R^4=R^6$=Br, $R^2=R^5=R^7-R^{10}=H$, $R_{31}=R_{32}$=ethyl, $R_{11}$=isobutyl, M=Ni, Y=O, X=Br;
55) the complex represented by Formula (IIIc'), wherein $R^1=R^3=R^4=R^6$=Cl, $R^2=R^5=R^7-R^{10}=H$, $R_{31}=R_{32}$=ethyl, $R_{11}$=isobutyl, M=Ni, Y=O, X=Br;
56) the complex represented by Formula (IIIc'), wherein $R^1=R^3=R^4=R^6$=F, $R^2=R^5=R^7-R^{10}=H$, $R_{31}=R_{32}$=ethyl, $R_{11}$=isobutyl, M=Ni, Y=O, X=Br.

In a second aspect, the present invention provides a method for preparing the diimine-metal complexes as described above, comprising step 1) reacting a diimine compound represented by Formula IV with $MX_n$ and $R_{11}YH$ to form the diimine-metal complex represented by Formula I,

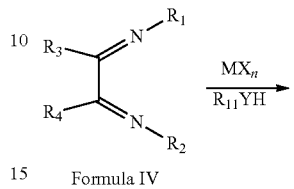

Formula IV

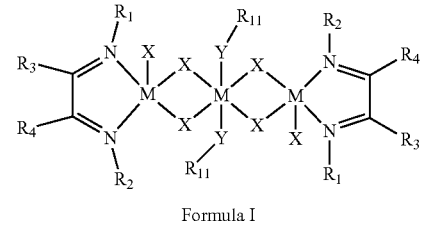

Formula I wherein $R_1$, $R_2$, $R_3$ and $R_4$ in Formula IV have the same definitions as in Formula I;

M and X in the $MX_n$ have the same definitions as in Formula I, n is the number of X satisfying the valence state of M, such as 1, 2 or 3;

Y and $R_{11}$ in the $R_{11}YH$ have the same definitions as in Formula I.

According to some embodiments of the invention, the reaction in step 1) is carried out in an organic solvent, and the organic solvent is preferably a halogenated alkane, and more preferably the organic solvent is one or more selected from dichloromethane, trichloromethane and 1,2-dichloroethane. According to some embodiments of the present invention, the reaction in step 1) is carried out at a temperature of 15-40° C.

In some embodiments of the present invention, the $MX_n$ includes nickel halides, such as nickel bromide and nickel chloride, 1,2-dimethoxyethane nickel halides, such as 1,2-dimethoxyethane nickel bromide and 1,2-dimethoxyethane nickel chloride.

In a third aspect, the present invention provides use of the above-described diimine-metal complexes in olefin polymerization. Preferably, the olefin includes ethylene and α-olefins containing a polar group.

In a fourth aspect, the present invention provides a catalyst for olefin polymerization, the catalyst comprising the above-described diimine-metal complex.

According to some embodiments of the invention, the catalyst further comprises a cocatalyst selected from the group consisting of organoaluminum compounds and/or organoboron compounds; the organoaluminum compounds are independently selected from the group consisting of alkylaluminoxanes or organoaluminum compounds of general Formula $AlR_nX^1_{3-n}$ (alkylaluminums or alkyl aluminum halides), in which R is H, a $C_1$-$C_{20}$ hydrocarbyl or a $C_1$-$C_{20}$ hydrocarbyloxy, preferably a $C_1$-$C_{20}$ alkyl, a $C_1$-$C_{20}$ alkoxy, a $C_7$-$C_{20}$ aralkyl or a $C_6$-$C_{20}$ aryl; $X^1$ is a halogen, preferably chlorine or bromine; and $0<n\le3$.

According to some embodiments of the invention, specific examples of the organoaluminum compound include, but are not limited to, trimethylaluminum, triethylaluminum, triisobutylaluminum, tri-n-hexylaluminum, trioctylaluminum, diethyl aluminum hydride, diisobutyl aluminum hydride, diethyl aluminum chloride, diisobutyl aluminum chloride, ethyl aluminum sesquichloride, ethyl aluminum dichloride, methylaluminoxane (MAO), and modified methyl aluminoxane (MMAO). Preferably, the organoaluminum compound is methylaluminoxane (MAO).

According to some embodiments of the invention, the organoboron compound is selected from the group consisting of aromatic hydrocarbyl boron compounds and borates. The aromatic hydrocarbyl boron compounds are preferably substituted or unsubstituted phenyl boron, more preferably tris(pentafluorophenyl)boron. The borates are preferably N,N-dimethylanilinium tetrakis(pentafluorophenyl)borate and/or triphenylcarbonium tetrakis(pentafluorophenyl)borate.

According to some embodiments of the invention, when the cocatalyst is an organoaluminum compound, the molar ratio of aluminum in the co-catalyst to M in the main catalyst is $(10-10^7):1$, for example, 10:1, 20:1, 50:1, 100:1, 200:1, 300:1, 500:1, 700:1, 800:1, 1,000:1, 2,000:1, 3,000:1, 5,000:1, 10,000:1, 100,000:1, 1,000,000:1, 10,000,000:1, and any value therebetween, preferably (10-100000):1, and more preferably (100-10,000):1; when the cocatalyst is an organoboron compound, the molar ratio of boron in the cocatalyst to M in the main catalyst is (0.1-1000):1, for example, 0.1:1, 0.2:1, 0.5:1, 1:1, 2:1, 3:1, 5:1, 8:1, 10:1, 20:1, 50:1, 100:1, 200:1, 300:1, 500:1, 700:1, 800:1, 1,000:1, and any value therebetween, preferably (0.1-500):1.

According to some embodiments of the present invention, the catalyst further comprises a chain transfer agent, which is one or more selected from aluminum alkyls, magnesium alkyls, boron alkyls and zinc alkyls, and the molar ratio of the chain transfer agent to M in the main catalyst is (0.1-5,000):1.

The catalyst provided by the invention can be used in the homopolymerization or copolymerization of olefins, particularly in the homopolymerization of ethylene or the copolymerization of ethylene with other α-olefin(s) and olefin(s) with a polar functional group such as hydroxyl and carboxyl group. The α-olefin is at least one selected from propylene, butene, pentene, hexene, octene, 4-methylpentene-1, and the like. The olefin with a polar functional group may be a vinyl monomer containing one or more hydroxyl groups and/or one or more carboxyl groups. The same molecule of the vinyl monomer can contain multiple different polar groups.

According to some embodiments of the present invention, the olefin polymerized by using the catalyst of the present invention is a C2-C16 olefin. Preferably, the olefin is ethylene or an α-olefin having 3-16 carbon atoms.

In a fifth aspect, the present invention provides an olefin polymerization method comprising performing an olefin polymerization reaction such as homopolymerization or copolymerization in the presence of the above-described diimine-metal complex or the above-described catalyst, with the temperature of the polymerization reaction ranging from −78° C. to 200° C., preferably from −20° C. to 150° C. and the polymerization pressure ranging from 0.01 to 10.0 MPa, preferably from 0.01 to 2.0 MPa.

According to some embodiments of the present invention, the olefin includes a C2-C16 olefin.

According to some embodiments of the present invention, the olefin includes a C2-C16 α-olefin.

According to some embodiments of the present invention, the olefin includes ethylene.

According to some embodiments of the present invention, the olefin includes ethylene and α-olefins containing a polar group.

According to some embodiments of the present invention, the polymerization temperature ranges from −78° C. to 200° C., and preferably from −20° C. to 150° C.

According to some embodiments of the present invention, the polymerization pressure ranges from 0.01 to 10.0 MPa, and preferably from 0.01-2.0 MPa.

According to some embodiments of the present invention, the polymerization is performed by using an olefin monomer in a solvent, and the solvent for polymerization is one or more selected from alkanes, aromatic hydrocarbons and halogenated hydrocarbons.

According to some specific embodiments of the present invention, the solvent for polymerization is one or more selected from hexane, pentane, heptane, benzene, toluene, dichloromethane, chloroform and dichloroethane, preferably one or more of hexane, toluene and heptane.

In the present invention, the term "alkyl" refers to straight chain alkyl, branched chain alkyl or cycloalkyl, and examples include, but are not limited to, methyl, ethyl, n-propyl, isopropyl, n-butyl, sec-butyl, isobutyl, tert-butyl, n-pentyl, isopentyl, tert-pentyl, neopentyl, n-hexyl, n-heptyl, n-octyl, n-decyl, cyclopropyl, cyclopentyl, cyclohexyl, 4-methylcyclohexyl, 4-ethylcyclohexyl, 4-n-propylcyclohexyl and 4-n-butylcyclohexyl.

In the present invention, examples of aryl include, but are not limited to, phenyl, 4-methylphenyl, 4-ethylphenyl, dimethylphenyl, vinylphenyl.

In the present invention, the term "alkenyl" refers to straight chain alkenyl, branched alkenyl or cycloalkenyl, and examples include, but are not limited to, vinyl, allyl, butenyl.

In the present invention, examples of aralkyl include, but are not limited to, phenylmethyl, phenylethyl, phenyl-n-propyl, phenylisopropyl, phenyl-n-butyl and phenyl-tert-butyl.

In the present invention, examples of alkaryl include, but are not limited to, tolyl, ethylphenyl, n-propylphenyl, isopropylphenyl, n-butylphenyl, and tert-butylphenyl.

Compared with the prior art, the present invention has the following advantages:

1. The synthesis method of the complexes of the present invention is simple and easy to implement, whereby the trinuclear complexes can be directly prepared from the ligands.
2. The catalyst of the present invention can catalyze, under the action of the organoaluminum or organoboron co-catalyst, the polymerization of ethylene at a high activity, and especially can maintain high polymerization activity at a higher polymerization temperature. (The activity of diimine nickel catalysts reported in the previous literatures or patents is greatly attenuated above 50 degrees, and the molecular weight is greatly reduced).
3. The catalyst of the present invention has better copolymerization performance with α-olefins or polar monomers.

EXAMPLES

The present invention will be described in detail below in conjunction with examples, but it should be understood that the examples are used only to exemplarily illustrate the present invention, and do not constitute any limitation on the protection scope of the present invention. All reasonable alterations and combinations included in the scope of the inventive concept of the present invention fall into the protection scope of the present invention.

The analytical characterization instruments and test methods used in the present invention are as follows:
1. Nuclear magnetic resonance instrument: Bruker DMX 300 (300 MHz), with tetramethyl silicon (TMS) as the internal standard.
2. Molecular weight and molecular weight distribution PDI (PDI=Mw/Mn) of polymer: PL-GPC220 chromatograph, with trichlorobenzene as solvent, measured at 150° C. (standard sample. PS; flow rate: 1.0 mL/min; Column: 3×PLgel 10 um M1×ED-B 300×7.5 nm).
3. Activity measurement method: polymer weight (g)/nickel (mol)×2.
4. Structure analysis of complex: single crystal test analysis, using Rigaku RAXIS Rapid IP diffractometer.
5. Analysis of comonomer content of polymer: measured through $^1$H NMR and $^{13}$C NMR spectra recorded on a 400 MHz Bruker Avance 400 nuclear magnetic resonance spectrometer, using a 10 mm PA SEX 13 probe, with the polymer sample being dissolved in 1,2,4-trichlorobenzene at 120° C.

Example 1—Preparation of Complex $Ni_1$

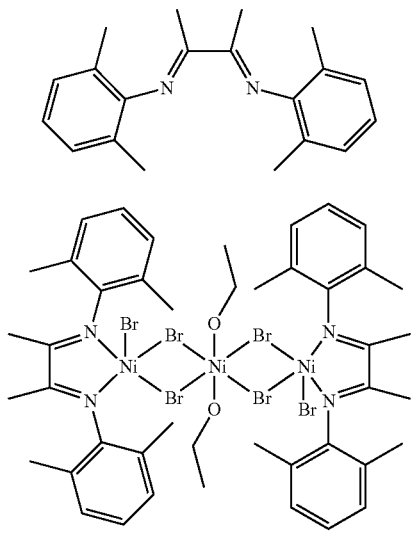

A solution of 0.277 g (0.9 mmol) of (DME)NiBr$_2$ in ethanol (10 mL) was added slowly dropwise to a solution of 0.175 g (0.6 mmol) of ligand Li in dichloromethane (10 mL), the resulting mixture was stirred at room temperature for 6 h, and then anhydrous diethyl ether was added to cause precipitation. A filtration was performed to afford a filter cake, and the filter cake was washed with anhydrous diethyl ether and dried in vacuum to afford $Ni_1$ as yellow powdery solids. Yield: 70.2%. Elemental analysis (calculated for $C_{44}H_{58}Br_6N_4Ni_3O_2$): C, 39.72; H, 4.39; N, 4.21; experimental value (%): C, 39.38; H, 4.60; N, 3.96.

After having been continuously dried at 130° C. for 6 hrs, a 1 L stainless steel polymerization autoclave equipped with mechanical stirring was evacuated while it was hot and then filled with $N_2$ gas 3 times. 500 mL of hexane was charged into the polymerization autoclave, then 5.0 mL of methylaluminoxane (MAO) (1.53 mol/l solution in toluene) was added, and 3.3 mg (2.5 μmol) of the complex $Ni_1$ was added. The reaction was vigorously stirred at 60° C. for 30 minutes, with ethylene pressure being maintained at 10 atm. The reaction mixture was neutralized with an ethanol solution acidified with 10 wt % hydrochloric acid to obtain a polyethylene. The results are shown in Table 1 below.

Example 2

After having been continuously dried at 130° C. for 6 hrs, a 1 L stainless steel polymerization autoclave equipped with mechanical stirring was evacuated while it was hot and then filled with $N_2$ gas 3 times. 500 mL of hexane was charged into the polymerization autoclave, then 5.0 mL of methylaluminoxane (MAO) (1.53 mol/l solution in toluene) was added, and 3.3 mg (2.5 μmol) of the complex $Ni_1$ was added. The reaction was vigorously stirred at 80° C. for 30 minutes, with ethylene pressure being maintained at 10 atm. The reaction mixture was neutralized with an ethanol solution acidified with 10 wt % hydrochloric acid to obtain a polyethylene. The results are shown in Table 1 below.

Example 3

After having been continuously dried at 130° C. for 6 hrs, a 1 L stainless steel polymerization autoclave equipped with mechanical stirring was evacuated while it was hot and then filled with $N_2$ gas 3 times. 500 mL of hexane and 10 ml of 1-hexene were charged into the polymerization autoclave, then 5.0 mL of methylaluminoxane (MAO) (1.53 mol/1 solution in toluene) was added, and 3.3 mg (2.5 μmol) of the complex $Ni_1$ was added. The reaction was vigorously stirred at 80° C. for 30 minutes, with ethylene pressure being maintained at 10 atm. The reaction mixture was neutralized with an ethanol solution acidified with 10 wt % hydrochloric acid to obtain a polyethylene. The results are shown in Table 1 below.

Example 4

After having been continuously dried at 130° C. for 6 hrs, a 1 L stainless steel polymerization autoclave equipped with mechanical stirring was evacuated while it was hot and then filled with $N_2$ gas 3 times. 500 mL of hexane was charged into the polymerization autoclave, and at the same time 3.3 mg (2.5 μmol) of the complex $Ni_1$, 6 mL of 10-undecen-1-ol, 30 mL of $AlEt_3$ (1.0 mol/L solution in hexane), and 5.0 mL of MAO (1.53 mol/1 solution in toluene) were added thereto. The reaction was stirred at 60° C. for 30 minutes, with ethylene pressure being maintained at 10 atm. The reaction mixture was finally neutralized with an ethanol solution acidified with 10 wt % hydrochloric acid to obtain a polymer. The polymerization activity and polymer performance parameters are shown in Table 1 below.

Example 5

After having been continuously dried at 130° C. for 6 hrs, a 1 L stainless steel polymerization autoclave equipped with mechanical stirring was evacuated while it was hot and then filled with $N_2$ gas 3 times. 500 mL of hexane was charged into the polymerization autoclave, and at the same time 3.3 mg (2.5 μmol) of the complex $Ni_1$, 5.52 g of 10-undecenoic acid, 30 mL of $AlEt_3$ (1.0 mol/L solution in hexane), and 5.0 mL of MAO (1.53 mol/1 solution in toluene) were added thereto. The reaction was stirred at 60° C. for 30 minutes, with ethylene pressure being maintained at 10 atm. The reaction mixture was finally neutralized with an ethanol solution acidified with 10 wt % hydrochloric acid to obtain a polymer. The polymerization activity and polymer performance parameters are shown in Table 1 below.

Example 6—Preparation of Complex Ni$_2$

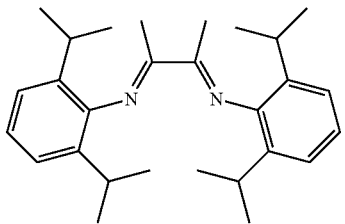

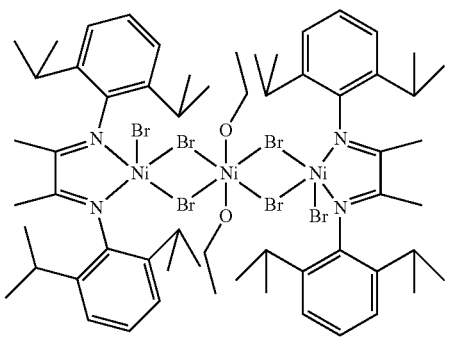

A solution of 0.277 g (0.9 mmol) of (DME)NiBr$_2$ in ethanol (10 mL) was added slowly dropwise to a solution of 0.243 g (0.6 mmol) of ligand L$_2$ in dichloromethane (10 mL), the resulting mixture was stirred at room temperature for 6 h, and then anhydrous diethyl ether was added to cause precipitation. A filtration was performed to afford a filter cake, and the filter cake was washed with anhydrous diethyl ether and dried in vacuum to afford Ni$_2$ as yellow powdery solids. Yield: 74.0%. Elemental analysis (calculated for C$_{60}$H$_{90}$Br$_6$N$_4$Ni$_3$O$_2$): C, 46.35; H, 5.83; N, 3.60; experimental value (%): C, 46.48; H, 6.12; N, 3.50.

After having been continuously dried at 130° C. for 6 hrs, a 1 L stainless steel polymerization autoclave equipped with mechanical stirring was evacuated while it was hot and then filled with N$_2$ gas 3 times. 500 mL of hexane was charged into the polymerization autoclave, then 5.0 mL of methylaluminoxane (MAO) (1.53 mol/l solution in toluene) was added, and 3.9 mg (2.5 μmol) of the complex Ni$_2$ was added. The reaction was vigorously stirred at 60° C. for 30 minutes, with ethylene pressure being maintained at 10 atm. The reaction mixture was neutralized with an ethanol solution acidified with 10 wt % hydrochloric acid to obtain a polyethylene. The results are shown in Table 1 below.

Example 7

After having been continuously dried at 130° C. for 6 hrs, a 1 L stainless steel polymerization autoclave equipped with mechanical stirring was evacuated while it was hot and then filled with N$_2$ gas 3 times. 500 mL of hexane was charged into the polymerization autoclave, then 5.0 mL of methylaluminoxane (MAO) (1.53 mol/l solution in toluene) was added, and 3.9 mg (2.5 μmol) of the complex Ni$_2$ was added. The reaction was vigorously stirred at 80° C. for 30 minutes, with ethylene pressure being maintained at 10 atm. The reaction mixture was neutralized with an ethanol solution acidified with 10 wt % hydrochloric acid to obtain a polyethylene. The results are shown in Table 1 below.

Example 8

After having been continuously dried at 130° C. for 6 hrs, a 1 L stainless steel polymerization autoclave equipped with mechanical stirring was evacuated while it was hot and then filled with N$_2$ gas 3 times. 500 mL of hexane and 10 mL of 1-hexene were charged into the polymerization autoclave, then 5.0 mL of methylaluminoxane (MAO) (1.53 mol/l solution in toluene) was added, and 3.9 mg (2.5 μmol) of the complex Ni$_2$ was added. The reaction was vigorously stirred at 80° C. for 30 minutes, with ethylene pressure being maintained at 10 atm. The reaction mixture was neutralized with an ethanol solution acidified with 10 wt % hydrochloric acid to obtain a polyethylene. The results are shown in Table 1 below.

Example 9

After having been continuously dried at 130° C. for 6 hrs, a 1 L stainless steel polymerization autoclave equipped with mechanical stirring was evacuated while it was hot and then filled with N$_2$ gas 3 times. 500 mL of hexane was charged into the polymerization autoclave, and at the same time 3.9 mg (2.5 μmol) of the complex Ni$_2$, 6 mL of 10-undecen-1-ol, 30 mL of AlEt$_3$ (1.0 mol/L solution in hexane), and 5.0 mL of MAO (1.53 mol/l solution in toluene) were added thereto. The reaction was stirred at 60° C. for 30 minutes, with ethylene pressure being maintained at 10 atm. The reaction mixture was finally neutralized with an ethanol solution acidified with 10 wt % hydrochloric acid to obtain a polymer. The polymerization activity and polymer performance parameters are shown in Table 1 below.

Example 10

After having been continuously dried at 130° C. for 6 hrs, a 1 L stainless steel polymerization autoclave equipped with mechanical stirring was evacuated while it was hot and then filled with N$_2$ gas 3 times. 500 mL of hexane was charged into the polymerization autoclave, and at the same time 3.9 mg (2.5 μmol) of the complex Ni$_2$, 5.52 g of 10-undecenoic acid, 30 mL of AlEt$_3$ (1.0 mol/L solution in hexane), and 5.0 mL of MAO (1.53 mol/l solution in toluene) were added thereto. The reaction was stirred at 60° C. for 30 minutes, with ethylene pressure being maintained at 10 atm. The reaction mixture was finally neutralized with an ethanol solution acidified with 10 wt % hydrochloric acid to obtain a polymer. The polymerization activity and polymer performance parameters are shown in Table 1 below.

Example 11—Preparation of Complex Ni₃

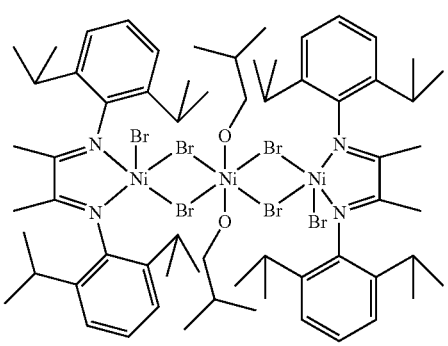

Ni₃

A solution of 0.277 g (0.9 mmol) of (DME)NiBr₂ in 2-methyl-1-propanol (10 mL) was added slowly dropwise to a solution of 0.243 g (0.6 mmol) of ligand L₂ in dichloromethane (10 mL), the resulting mixture was stirred at room temperature for 6 h, and then anhydrous diethyl ether was added to cause precipitation. A filtration was performed to afford a filter cake, and the filter cake was washed with anhydrous diethyl ether and dried in vacuum to afford Ni₃ as yellow powdery solids. Yield: 74.5%. Elemental analysis (calculated for $C_{64}H_{98}Br_6N_4Ni_3O_2$): C, 47.71; H, 6.13; N, 3.48; experimental value (%): C, 47.48; H, 6.42; N, 3.29.

After having been continuously dried at 130° C. for 6 hrs, a 1 L stainless steel polymerization autoclave equipped with mechanical stirring was evacuated while it was hot and then filled with N₂ gas 3 times. 500 mL of hexane was charged into the polymerization autoclave, then 5.0 mL of methylaluminoxane (MAO) (1.53 mol/l solution in toluene) was added, and 4.0 mg (2.5 μmol) of the complex Ni₃ was added. The reaction was vigorously stirred at 80° C. for 30 minutes, with ethylene pressure being maintained at 10 atm. The reaction mixture was neutralized with an ethanol solution acidified with 10 wt % hydrochloric acid to obtain a polyethylene. The results are shown in Table 1 below.

Example 12—Preparation of Complex Ni₄

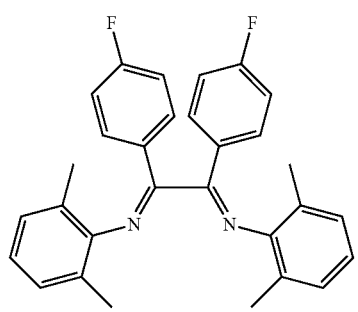

L₃

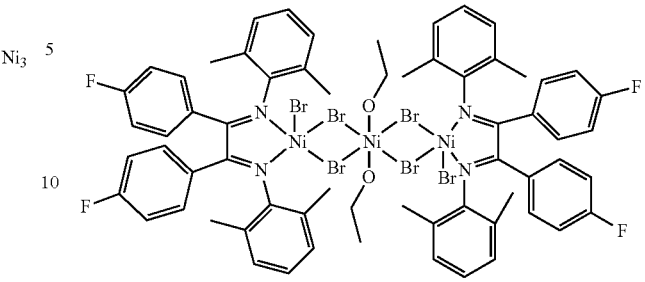

Ni₄

A solution of 0.277 g (0.9 mmol) of (DME)NiBr₂ in ethanol (10 mL) was added slowly dropwise to a solution of 0.272 g (0.6 mmol) of ligand L₃ in dichloromethane (10 mL). The color of the solution immediately changed to deep red, and a large quantity of precipitants was formed. The reaction was stirred at room temperature for 6 h, and then anhydrous diethyl ether was added to perform precipitation. A filtration was performed to afford a filter cake, and the filter cake was washed with anhydrous diethyl ether and dried in vacuum to afford Ni₄ as brownish-red powdery solids. Yield: 74.1%. Elemental analysis (calculated for $C_{64}H_{62}Br_6F_4N_4Ni_3O_2$): C, 46.57; H, 3.79; N, 3.39; experimental value (%): C, 46.72; H, 3.97; N, 3.48.

After having been continuously dried at 130° C. for 6 hrs, a 1 L stainless steel polymerization autoclave equipped with mechanical stirring was evacuated while it was hot and then filled with N₂ gas 3 times. 500 mL of hexane was charged into the polymerization autoclave, then 5.0 mL of methylaluminoxane (MAO) (1.53 mol/1 solution in toluene) was added, and 4.1 mg (2.5 μmol) of the complex Ni₄ was added. The reaction was vigorously stirred at 80° C. for 30 minutes, with ethylene pressure being maintained at 10 atm. The reaction mixture was neutralized with an ethanol solution acidified with 10 wt % hydrochloric acid to obtain a polyethylene. The results are shown in Table 1 below.

Comparative Example 1

10 Atm ethylene: After having been continuously dried at 130° C. for 6 hrs, a 1 L stainless steel polymerization autoclave equipped with mechanical stirring was evacuated while it was hot and then filled with N₂ gas 3 times. 500 mL of hexane was charged into the polymerization autoclave, then 5.0 mL of methylaluminoxane (MAO) (1.53 mol/l solution in toluene) was added, and 7.7 mg (15 μmol) of catalyst compound A was added. The reaction was vigorously stirred at 60° C. for 30 minutes, with ethylene pressure being maintained at 10 atm. The reaction mixture was neutralized with an ethanol solution acidified with 10 wt % hydrochloric acid to obtain a polyethylene. The results are shown in Table 1 below.

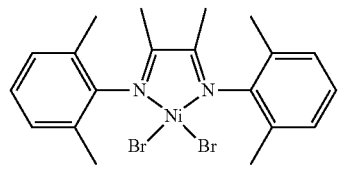

Catalyst Compound A

Comparative Example 2

After having been continuously dried at 130° C. for 6 hrs, a 1 L stainless steel polymerization autoclave equipped with mechanical stirring was evacuated while it was hot and then filled with $N_2$ gas 3 times. 500 mL of hexane was charged into the polymerization autoclave, then 5.0 mL of methylaluminoxane (MAO) (1.53 mol/l solution in toluene) was added, and 7.7 mg (15 μmol) of catalyst compound A was added. The reaction was vigorously stirred at 80° C. for 30 minutes, with ethylene pressure being maintained at 10 atm. The reaction mixture was neutralized with an ethanol solution acidified with 10 wt % hydrochloric acid to obtain a polyethylene. The results are shown in Table 1 below.

Comparative Example 3

After having been continuously dried at 130° C. for 6 hrs, a 1 L stainless steel polymerization autoclave equipped with mechanical stirring was evacuated while it was hot and then filled with $N_2$ gas 3 times. 500 mL of hexane and 10 mL of 1-hexene were charged into the polymerization autoclave, then 5.0 mL of methylaluminoxane (MAO) (1.53 mol/l solution in toluene) was added, and 7.7 mg (15 μmol) of catalyst compound A was added. The reaction was vigorously stirred at 80° C. for 30 minutes, with ethylene pressure being maintained at 10 atm. The reaction mixture was neutralized with an ethanol solution acidified with 10 wt % hydrochloric acid to obtain a polyethylene. The results are shown in Table 1 below.

TABLE 1

| Example | Complex | Activity ($10^6$ g/molcat · h) | Mw × $10^{-4}$ | Mw/Mn |
|---|---|---|---|---|
| Example 1 | $Ni_1$ | 3.53 | 20.9 | 2.10 |
| Example 2 | $Ni_1$ | 1.27 | 11.4 | 2.08 |
| Example 3 | $Ni_1$ | 1.53 | 11.0 | 2.03 |
| Example 4 | $Ni_1$ | 3.12 | 18.4 | 2.12 |
| Example 5 | $Ni_1$ | 3.21 | 17.3 | 2.13 |
| Example 6 | $Ni_2$ | 6.04 | 70.2 | 2.04 |
| Example 7 | $Ni_2$ | 3.22 | 33.1 | 2.03 |
| Example 8 | $Ni_2$ | 3.41 | 32.8 | 2.02 |
| Example 9 | $Ni_2$ | 4.73 | 48.4 | 2.10 |
| Example 10 | $Ni_2$ | 4.20 | 41.6 | 2.12 |
| Example 11 | $Ni_3$ | 3.02 | 30.3 | 2.02 |
| Example 12 | $Ni_4$ | 1.25 | 8.9 | 2.06 |
| Comp. Ex. 1 | A | 1.96 | 15.4 | 2.65 |
| Comp. Ex. 2 | A | 0.82 | 8.3 | 2.62 |
| Comp. Ex. 3 | A | 0.96 | 8.7 | 2.57 |

It can be seen from Table 1 that, compared with the complex of the comparative examples, when the metal complexes of the present invention are used as the main catalyst, the polymerization activity under high temperature polymerization conditions is higher, and the molecular weight distribution of the obtained polymer is significantly lower than that of the polymers obtained in the comparative examples.

Example 13—Preparation of Complex $Ni_5$

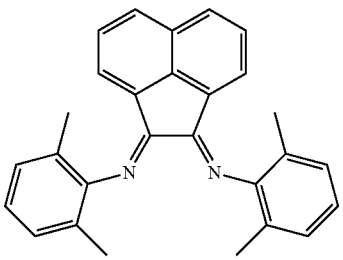

L5

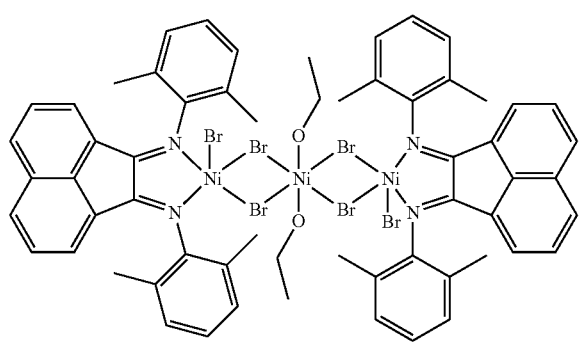

Ni5

A solution of 0.277 g (0.9 mmol) of (DME)$NiBr_2$ in ethanol (10 mL) was added slowly dropwise to a solution of 0.233 g (0.6 mmol) of ligand La in dichloromethane (10 mL). The color of the solution immediately changed to deep red, and a large quantity of precipitants was formed. The reaction was stirred at room temperature for 6 h, and then anhydrous diethyl ether was added to perform precipitation. A filtration was performed to afford a filter cake, and the filter cake was washed with anhydrous diethyl ether and dried in vacuum to afford $Ni_5$ as brownish-red powdery solids. Yield: 78.2%. Elemental analysis (calculated for $C_{60}H_{58}Br_6N_4Ni_3O_2$): C, 47.33; H, 3.84; N, 3.68; experimental value (%): C, 47.38; H, 4.00; N, 3.46.

Ethylene Polymerization:

After having been continuously dried at 130° C. for 6 hrs, a 1 L stainless steel polymerization autoclave equipped with mechanical stirring was evacuated while it was hot and then filled with $N_2$ gas 3 times. 500 mL of hexane was charged into the polymerization autoclave, then 6.5 mL of methylaluminoxane (MAO) (1.53 mol/l solution in toluene) was added, and 3.8 mg (2.5 μmol) of the complex $Ni_5$ was added. The reaction was vigorously stirred at 60° C. for 30 minutes, with ethylene pressure being maintained at 10 atm. The reaction mixture was neutralized with an ethanol solution acidified with 10 wt % hydrochloric acid to obtain a polyethylene. The results are shown in Table 1 below.

Example 14

After having been continuously dried at 130° C. for 6 hrs, a 1 L stainless steel polymerization autoclave equipped with mechanical stirring was evacuated while it was hot and then filled with $N_2$ gas 3 times. 500 mL of hexane was charged into the polymerization autoclave, then 6.5 mL of methylaluminoxane (MAO) (1.53 mol/l solution in toluene) was added, and 3.8 mg (2.5 μmol) of the complex $Ni_5$ was added. The reaction was stirred at 80° C. for 30 minutes, with ethylene pressure being maintained at 10 atm. The reaction mixture was neutralized with an ethanol solution acidified with 10 wt % hydrochloric acid to obtain a polyethylene. The results are shown in Table 1 below.

Example 15

After having been continuously dried at 130° C. for 6 hrs, a 1 L stainless steel polymerization autoclave equipped with mechanical stirring was evacuated while it was hot and then filled with $N_2$ gas 3 times. 500 mL of hexane and 10 mL of 1-hexene were charged into the polymerization autoclave, then 6.5 mL of methylaluminoxane (MAO) (1.53 mol/l solution in toluene) was added, and 3.8 mg (5 μmol) of the complex $Ni_5$ was added. The reaction was vigorously stirred at 80° C. for 30 minutes, with ethylene pressure being maintained at 10 atm. The reaction mixture was neutralized with an ethanol solution acidified with 10 wt % hydrochloric acid to obtain a polyethylene. The results are shown in Table 1 below.

Example 16

After having been continuously dried at 130° C. for 6 hrs, a 1 L stainless steel polymerization autoclave equipped with mechanical stirring was evacuated while it was hot and then filled with $N_2$ gas 3 times. 500 mL of hexane was charged into the polymerization autoclave, and at the same time 3.8 mg (2.5 μmol) of the complex $Ni_5$, 6 mL of 10-undecen-1-ol, 30 mL of $AlEt_3$ (1.0 mol/L solution in hexane), and 6.5 mL of MAO (1.53 mol/l solution in toluene) were added thereto. The reaction was stirred at 60° C. for 30 minutes, with ethylene pressure being maintained at 10 atm. The reaction mixture was finally neutralized with an ethanol solution acidified with 10 wt/o hydrochloric acid to obtain a polymer. The polymerization activity and polymer performance parameters are shown in Table 1 below.

Example 17

After having been continuously dried at 130° C. for 6 hrs, a 1 L stainless steel polymerization autoclave equipped with mechanical stirring was evacuated while it was hot and then filled with $N_2$ gas 3 times. 500 mL of hexane was charged into the polymerization autoclave, and at the same time 3.8 mg (2.5 μmol) of the complex $Ni_5$, 5.52 g of 10-undecenoic acid, 30 mL of $AlEt_3$ (1.0 mol/L solution in hexane), and 6.5 mL of MAO (1.53 mol/l solution in toluene) were added thereto. The reaction was stirred at 60° C. for 30 minutes, with ethylene pressure being maintained at 10 atm. The reaction mixture was finally neutralized with an ethanol solution acidified with 10 wt % hydrochloric acid to obtain a polymer. The polymerization activity and polymer performance parameters are shown in Table 1 below.

Example 18—Preparation of Complex $Ni_6$

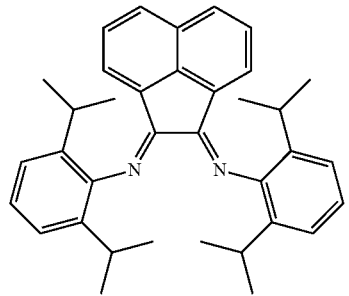

$L_6$

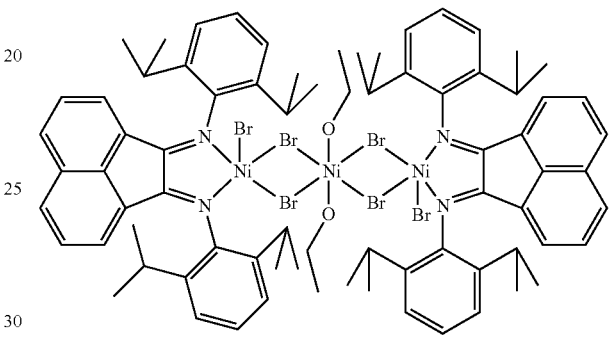

$Ni6$

A solution of 0.277 g (0.9 mmol) of $(DME)NiBr_2$ in ethanol (10 mL) was added slowly dropwise to a solution of 0.300 g (0.6 mmol) of ligand $L_6$ in dichloromethane (10 mL). The color of the solution immediately changed to deep red, and a large quantity of precipitants was formed. The reaction was stirred at room temperature for 6 h, and then anhydrous diethyl ether was added to perform precipitation. A filtration was performed to afford a filter cake, and the filter cake was washed with anhydrous diethyl ether and dried in vacuum to afford $Ni_6$ as brownish-red powdery solids. Yield: 74.0%. Elemental analysis (calculated for $C_{76}H_{90}Br_6N_4Ni_3O_2$): C, 52.25; H, 5.19; N, 3.21; experimental value (%): C, 52.48; H, 5.52; N, 3.10.

After having been continuously dried at 130° C. for 6 hrs, a 1 L stainless steel polymerization autoclave equipped with mechanical stirring was evacuated while it was hot and then filled with $N_2$ gas 3 times. 500 mL of hexane was charged into the polymerization autoclave, then 6.5 mL of methylaluminoxane (MAO) (1.53 mol/l solution in toluene) was added, and 4.4 mg (2.5 μmol) of the complex $Ni_6$ was added. The reaction was vigorously stirred at 60° C. for 30 minutes, with ethylene pressure being maintained at 10 atm. The reaction mixture was neutralized with an ethanol solution acidified with 10 wt % hydrochloric acid to obtain a polyethylene. The results are shown in Table 2 below.

Example 19

After having been continuously dried at 130° C. for 6 hrs, a 1 L stainless steel polymerization autoclave equipped with mechanical stirring was evacuated while it was hot and then filled with $N_2$ gas 3 times. 500 mL of hexane was charged into the polymerization autoclave, then 6.5 mL of methylaluminoxane (MAO) (1.53 mol/l solution in toluene) was added, and 4.4 mg (2.5 μmol) of the complex $Ni_6$ was added.

The reaction was vigorously stirred at 80° C. for 30 minutes, with ethylene pressure being maintained at 10 atm. The reaction mixture was neutralized with an ethanol solution acidified with 10 wt % hydrochloric acid to obtain a polyethylene. The results are shown in Table 2 below.

Example 20

After having been continuously dried at 130° C. for 6 hrs, a 1 L stainless steel polymerization autoclave equipped with mechanical stirring was evacuated while it was hot and then filled with $N_2$ gas 3 times. 500 mL of hexane and 10 mL of 1-hexene were charged into the polymerization autoclave, then 6.5 mL of methylaluminoxane (MAO) (1.53 mol/l solution in toluene) was added, and 4.4 mg (5 μmol) of the complex $Ni_6$ was added. The reaction was vigorously stirred at 80° C. for 30 minutes, with ethylene pressure being maintained at 10 atm. The reaction mixture was neutralized with an ethanol solution acidified with 10 wt % hydrochloric acid to obtain a polymer. The results are shown in Table 2 below.

Example 21

After having been continuously dried at 130° C. for 6 hrs, a 1 L stainless steel polymerization autoclave equipped with mechanical stirring was evacuated while it was hot and then filled with $N_2$ gas 3 times. 500 mL of hexane was charged into the polymerization autoclave, and at the same time 4.4 mg (2.5 μmol) of the complex $Ni_6$, 6 mL of 10-undecen-1-ol, 30 mL of $AlEt_3$ (1.0 mol/L solution in hexane), and 6.5 mL of MAO (1.53 mol/l solution in toluene) were added thereto. The reaction was stirred at 60° C. for 30 minutes, with ethylene pressure being maintained at 10 atm. The reaction mixture was finally neutralized with an ethanol solution acidified with 10 wt % hydrochloric acid to obtain a polymer. The polymerization activity and polymer performance parameters are shown in Table 2 below.

Example 22

After having been continuously dried at 130° C. for 6 hrs, a 1 L stainless steel polymerization autoclave equipped with mechanical stirring was evacuated while it was hot and then filled with $N_2$ gas 3 times. 500 mL of hexane was charged into the polymerization autoclave, and at the same time 4.4 mg (2.5 μmol) of the complex $Ni_6$, 5.52 g of 10-undecenoic acid, 30 mL of $AlEt_3$ (1.0 mol/L solution in hexane), and 6.5 mL of MAO (1.53 mol/l solution in toluene) were added thereto. The reaction was stirred at 60° C. for 30 minutes, with ethylene pressure being maintained at 10 atm. The reaction mixture was finally neutralized with an ethanol solution acidified with 10 wt % hydrochloric acid to obtain a polymer. The polymerization activity and polymer performance parameters are shown in Table 2 below.

Example 23—Preparation of Complex $Ni_7$

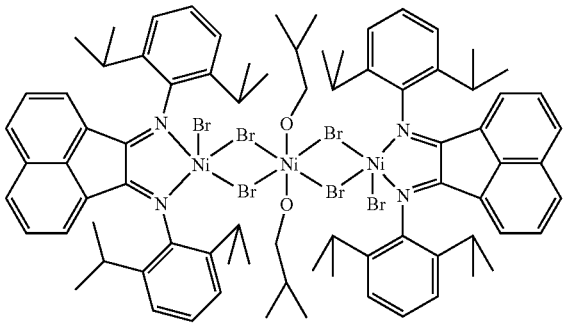

$Ni_7$

A solution of 0.277 g (0.9 mmol) of $(DME)NiBr_2$ in 2-methyl-1-propanol (10 mL) was added slowly dropwise to a solution of 0.300 g (0.6 mmol) of ligand $L_2$ in dichloromethane (10 mL). The color of the solution immediately changed to deep red, and a large quantity of precipitants was formed. The reaction was stirred at room temperature for 6 h, and then anhydrous diethyl ether was added to perform precipitation. A filtration was performed to afford a filter cake, and the filter cake was washed with anhydrous diethyl ether and dried in vacuum to afford $Ni_7$ as brownish-red powdery solids. Yield: 74.0%. Elemental analysis (calculated for $C_{80}H_{98}Br_6N_4Ni_3O_2$): C, 53.29; H, 5.48; N, 3.11; experimental value (%): C, 53.28; H, 5.82; N, 3.29.

Ethylene Polymerization:

After having been continuously dried at 130° C. for 6 hrs, a 1 L stainless steel polymerization autoclave equipped with mechanical stirring was evacuated while it was hot and then filled with $N_2$ gas 3 times. 500 mL of hexane was charged into the polymerization autoclave, then 6.5 mL of methylaluminoxane (MAO) (1.53 mol/l solution in toluene) was added, and 4.5 mg (2.5 μmol) of the complex $Ni_7$ was added. The reaction was vigorously stirred at 60° C. for 30 minutes, with ethylene pressure being maintained at 10 atm. The reaction mixture was neutralized with an ethanol solution acidified with 10 wt % hydrochloric acid to obtain a polyethylene. The results are shown in Table 2 below.

Example 24—Preparation of Complex $Ni_8$

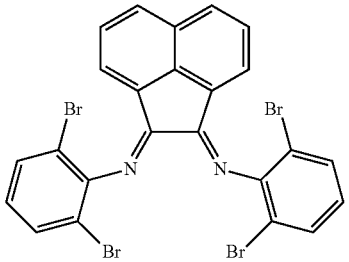

$L_7$

-continued

Ni8

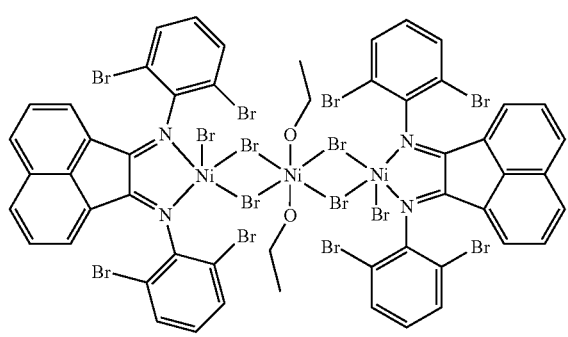

Ni9

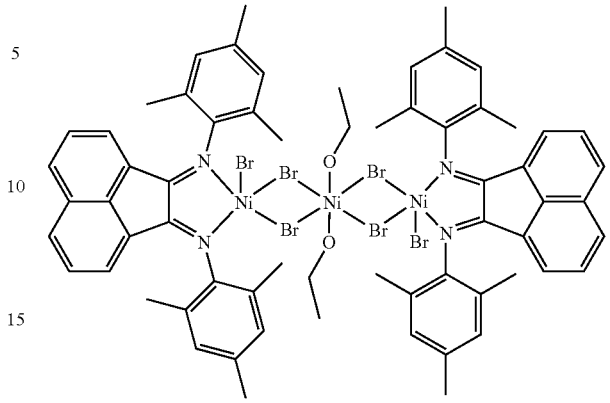

A solution of 0.277 g (0.9 mmol) of (DME)NiBr$_2$ in ethanol (10 mL) was added slowly dropwise to a solution of 0.389 g (0.6 mmol) of ligand L$_7$ in dichloromethane (10 mL). The color of the solution immediately changed to deep red, and a large quantity of precipitants was formed. The reaction was stirred at room temperature for 6 h, and then anhydrous diethyl ether was added to perform precipitation. A filtration was performed to afford a filter cake, and the filter cake was washed with anhydrous diethyl ether and dried in vacuum to afford Ni$_5$ as brownish-red powdery solids. Yield: 74.1%. Elemental analysis (calculated for C$_{52}$H$_{34}$Br$_{14}$N$_4$Ni$_3$O$_2$): C, 30.59; H, 1.68; N, 2.74; experimental value (%): C, 30.72; H, 1.97; N, 2.48.

Ethylene Polymerization:

After having been continuously dried at 130° C. for 6 hrs, a 1 L stainless steel polymerization autoclave equipped with mechanical stirring was evacuated while it was hot and then filled with N$_2$ gas 3 times. 500 mL of hexane was charged into the polymerization autoclave, then 6.5 mL of methylaluminoxane (MAO) (1.53 mol/l solution in toluene) was added, and 5.1 mg (2.5 μmol) of the complex Ni$_8$ was added. The reaction was vigorously stirred at 60° C. for 30 minutes, with ethylene pressure being maintained at 10 atm. The reaction mixture was neutralized with an ethanol solution acidified with 10 wt % hydrochloric acid to obtain a polyethylene. The results are shown in Table 2 below.

Example 25—Preparation of Complex Ni$_9$

A solution of 0.277 g (0.9 mmol) of (DME)NiBr$_2$ in ethanol (10 mL) was added slowly dropwise to a solution of 0.249 g (0.6 mmol) of ligand L$_8$ in dichloromethane (10 mL). The color of the solution immediately changed to deep red, and a large quantity of precipitants was formed. The reaction was stirred at room temperature for 6 h, and then anhydrous diethyl ether was added to perform precipitation. A filtration was performed to afford a filter cake, and the filter cake was washed with anhydrous diethyl ether and dried in vacuum to afford Ni$_9$ as brownish-red powdery solids. Yield: 78.6%. Elemental analysis (calculated for C$_{64}$H$_{66}$Br$_6$N$_4$Ni$_3$O$_2$): C, 48.69; H, 4.21; N, 3.55; experimental value (%): C, 48.54; H, 4.47; N, 3.21.

Ethylene Polymerization:

After having been continuously dried at 130° C. for 6 hrs, a 1 L stainless steel polymerization autoclave equipped with mechanical stirring was evacuated while it was hot and then filled with N$_2$ gas 3 times. 500 mL of hexane was charged into the polymerization autoclave, then 6.5 mL of methylaluminoxane (MAO) (1.53 mol/l solution in toluene) was added, and 3.9 mg (2.5 μmol) of the complex Ni$_9$ was added. The reaction was vigorously stirred at 60° C. for 30 minutes, with ethylene pressure being maintained at 10 atm. The reaction mixture was neutralized with an ethanol solution acidified with 10 wt % hydrochloric acid to obtain a polyethylene. The results are shown in Table 2 below.

Example 26—Preparation of Complex Ni$_{10}$

L$_8$

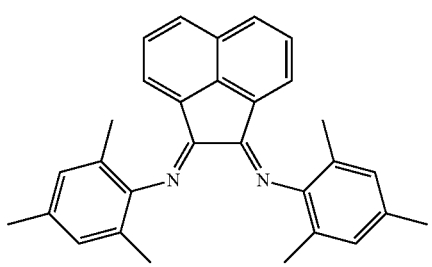

L$_9$

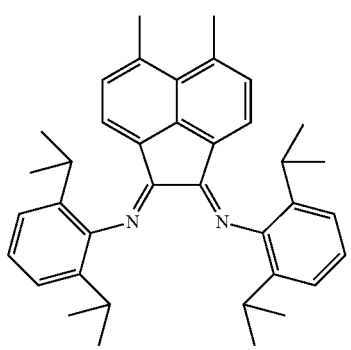

-continued

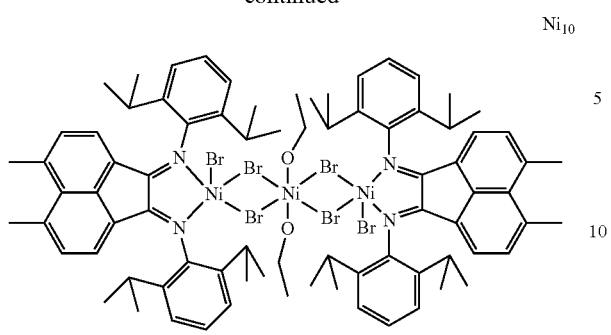

Ni₁₀

A solution of 0.277 g (0.9 mmol) of (DME)NiBr₂ in ethanol (10 mL) was added slowly dropwise to a solution of 0.317 g (0.6 mmol) of ligand L₉ in dichloromethane (10 mL). The color of the solution immediately changed to deep red, and a large quantity of precipitants was formed. The reaction was stirred at room temperature for 6 h, and then anhydrous diethyl ether was added to perform precipitation. A filtration was performed to afford a filter cake, and the filter cake was washed with anhydrous diethyl ether and dried in vacuum to afford Ni₁₀ as brownish-red powdery solids. Yield: 75.2%. Elemental analysis (calculated for $C_{80}H_{98}Br_6N_4Ni_3O_2$): C, 53.29; H, 5.48; N, 3.11; experimental value (%). C, 53.62; H, 5.87; N, 3.00.

Ethylene Polymerization:

After having been continuously dried at 130° C. for 6 hrs, a 1 L stainless steel polymerization autoclave equipped with mechanical stirring was evacuated while it was hot and then filled with N₂ gas 3 times. 500 mL of hexane was charged into the polymerization autoclave, then 6.5 mL of methylaluminoxane (MAO) (1.53 mol/l solution in toluene) was added, and 4.5 mg (2.5 μmol) of the complex Ni₁₀ was added. The reaction was vigorously stirred at 60° C. for 30 minutes, with ethylene pressure being maintained at 10 atm. The reaction mixture was neutralized with an ethanol solution acidified with 10 wt % hydrochloric acid to obtain a polyethylene. The results are shown in Table 2 below.

Comparative Example 4

After having been continuously dried at 130° C. for 6 hrs, a 1 L stainless steel polymerization autoclave equipped with mechanical stirring was evacuated while it was hot and then filled with N₂ gas 3 times. 500 mL of hexane was charged into the polymerization autoclave, then 6.5 mL of methylaluminoxane (MAO) (1.53 mol/l solution in toluene) was added, and 4.6 mg (7.5 μmol) of Catalyst Compound B was added. The reaction was vigorously stirred at 60° C. for 30 minutes, with ethylene pressure being maintained at 10 atm. The reaction mixture was neutralized with an ethanol solution acidified with 10 wt % hydrochloric acid to obtain a polyethylene. The results are shown in Table 2 below.

Catalyst Compound B

Comparative Example 5

After having been continuously dried at 130° C. for 6 hrs, a 1 L stainless steel polymerization autoclave equipped with mechanical stirring was evacuated while it was hot and then filled with N₂ gas 3 times. 500 mL of hexane was charged into the polymerization autoclave, then 6.5 mL of methylaluminoxane (MAO) (1.53 mol/l solution in toluene) was added, and 4.6 mg (7.5 μmol) of Catalyst Compound B was added. The reaction was vigorously stirred at 80° C. for 30 minutes, with ethylene pressure being maintained at 10 atm. The reaction mixture was neutralized with an ethanol solution acidified with 10 wt % hydrochloric acid to obtain a polyethylene. The results are shown in Table 2 below.

Comparative Example 6

After having been continuously dried at 130° C. for 6 hrs, a 1 L stainless steel polymerization autoclave equipped with mechanical stirring was evacuated while it was hot and then filled with N₂ gas 3 times. 500 mL of hexane and 10 mL of 1-hexene were charged into the polymerization autoclave, then 6.5 mL of methylaluminoxane (MAO) (1.53 mol/l solution in toluene) was added, and 4.6 mg (7.5 μmol) of Catalyst Compound B was added. The reaction was vigorously stirred at 80° C. for 30 minutes, with ethylene pressure being maintained at 10 atm. The reaction mixture was neutralized with an ethanol solution acidified with 10 wt % hydrochloric acid to obtain a polyethylene. The results are shown in Table 2 below.

TABLE 2

| Example | Complex | Activity ($10^6$ g/molcat · h) | Mw × $10^{-4}$ | Mw/Mn |
|---|---|---|---|---|
| Example 13 | Ni₅ | 11.4 | 10.3 | 2.08 |
| Example 14 | Ni₅ | 4.2 | 6.7 | 2.09 |
| Example 15 | Ni₅ | 5.1 | 6.9 | 2.06 |
| Example 16 | Ni₅ | 10.6 | 10.4 | 2.12 |
| Example 17 | Ni₅ | 10.2 | 9.3 | 2.16 |
| Example 18 | Ni₆ | 22.9 | 41.2 | 2.03 |
| Example 19 | Ni₆ | 13.6 | 22.7 | 2.04 |
| Example 20 | Ni₆ | 14.4 | 21.9 | 2.04 |
| Example 21 | Ni₆ | 16.3 | 33.8 | 2.10 |
| Example 22 | Ni₆ | 15.2 | 31.2 | 2.16 |
| Example 23 | Ni₇ | 18.1 | 40.4 | 2.02 |
| Example 24 | Ni₈ | 10.3 | 14.8 | 2.07 |
| Example 25 | Ni₉ | 13.6 | 8.6 | 2.03 |
| Example 26 | Ni₁₀ | 19.4 | 37.2 | 2.06 |
| Comp. Ex. 4 | B | 9.6 | 9.3 | 2.40 |
| Comp. Ex. 5 | B | 3.7 | 6.0 | 2.32 |
| Comp. Ex. 6 | B | 4.3 | 6.2 | 2.37 |

It can be seen from Table 2 that, compared with the complex of the comparative examples, when the metal complexes of the present invention are used as the main catalyst, the polymerization activity under high temperature polymerization conditions is much higher, and the molecular weight distribution of the obtained polymer is significantly lower than that of the polymers obtained in the comparative examples.

The structural formula of the complexes involved in the following Examples 27-40 is as follows:

Formula IIIb

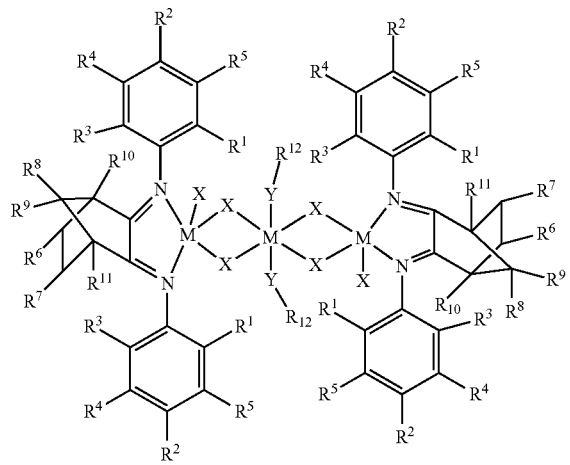

Example 27—Preparation of Complex $Ni_{11}$
(Represented by Structural Formula IIIb, wherein $R^1$, $R^3$ are Ethyl; $R^2$, $R^4$-$R^7$, $R^{10}$ are Hydrogen; $R^8$, $R^9$ and $R^{11}$ are Methyl; $R_{12}$ is Ethyl; M is Nickel, Y is O, and X is Br)

Under nitrogen atmosphere, 2,6-diethylaniline (2.0 ml, 12 mmol) was dissolved in 20 ml of toluene, and 12 ml of trimethylaluminum (1.0M, 12 mmol) was added dropwise at room temperature. The reaction was refluxed for 2 hours, and the system was then cooled to room temperature. Camphorquinone (0.831 g, 5 mmol) was added, and the system was refluxed for 6 h. The reaction product was neutralized with aqueous sodium hydroxide solution, extracted with dichloromethane, and dried, and then subjected to a column chromatography to afford yellow ligand $L_{10}$. Yield: 69.2%. $^1$H-NMR (CDCl$_3$): δ 6.94-6.92 (m, 6H, $C_{Ar}$—CH$_3$), 2.56-2.51 (m, 4H, $C_{Ar}$—CH$_3$), 2.36-2.31 (m, 4H, $C_{Ar}$—CH$_3$), 1.82-1.78 (m, 4H, CH$_2$), 1.54 (m, 1H), 1.24-1.18 (m, 12H), 1.09 (s, 3H, CH$_3$), 0.94 (m, 6H, CH$_3$).

A solution of 0.277 g (0.9 mmol) of (DME)NiBr$_2$ in ethanol (10 mL) was added slowly dropwise to a solution of 0.258 g (0.6 mmol) of ligand $L_{10}$ in dichloromethane (10 mL). The color of the solution immediately changed to deep red, and a large quantity of precipitants was formed. The reaction was stirred at room temperature for 6 h, and then anhydrous diethyl ether was added to perform precipitation. A filtration was performed to afford a filter cake, and the filter cake was washed with anhydrous diethyl ether and dried in vacuum to afford $Ni_{11}$ as brownish-red powdery solids. Yield: 78.2%. Elemental analysis (calculated for $C_{64}H_{90}Br_6N_4Ni_3O_2$): C, 47.96; H, 5.66; N, 3.50; experimental value (%): C, 47.48; H, 6.00; N, 3.26.

Ethylene Polymerization:

After having been continuously dried at 130° C. for 6 hrs, a 1 L stainless steel polymerization autoclave equipped with mechanical stirring was evacuated while it was hot and then filled with N$_2$ gas 3 times. 500 mL of hexane was charged into the polymerization autoclave, then 5.0 mL of methylaluminoxane (MAO) (1.53 mol/l solution in toluene) was added, and 4.0 mg (2.5 μmol) of the complex $Ni_{11}$ was added. The reaction was vigorously stirred at 60° C. for 30 minutes, with ethylene pressure being maintained at 10 atm. The reaction mixture was neutralized with an ethanol solution acidified with 10 wt % hydrochloric acid to obtain a polyethylene. The results are shown in Table 3 below.

Example 28

After having been continuously dried at 130° C. for 6 hrs, a 1 L stainless steel polymerization autoclave equipped with mechanical stirring was evacuated while it was hot and then filled with N$_2$ gas 3 times. 500 mL of hexane was charged into the polymerization autoclave, then 5.0 mL of methylaluminoxane (MAO) (1.53 mol/l solution in toluene) was added, and 4.0 mg (2.5 μmol) of the complex $Ni_{11}$ was added. The reaction was vigorously stirred at 100° C. for 30 minutes, with ethylene pressure being maintained at 10 atm. The reaction mixture was neutralized with an ethanol solution acidified with 10 wt % hydrochloric acid to obtain a polyethylene. The results are shown in Table 3 below.

Example 3

After having been continuously dried at 130° C. for 6 hrs, a 1 L stainless steel polymerization autoclave equipped with mechanical stirring was evacuated while it was hot and then filled with N$_2$ gas 3 times. 500 mL of hexane and 10 mL of 1-hexene were charged into the polymerization autoclave, then 5.0 mL of methylaluminoxane (MAO) (1.53 mol/l solution in toluene) was added, and 4.0 mg (2.5 μmol) of the complex $Ni_{11}$ was added. The reaction was vigorously stirred at 100° C. for 30 minutes, with ethylene pressure being maintained at 10 atm. The reaction mixture was neutralized with an ethanol solution acidified with 10 wt % hydrochloric acid to obtain a polyethylene. The results are shown in Table 3 below.

Example 29

After having been continuously dried at 130° C. for 6 hrs, a 1 L stainless steel polymerization autoclave equipped with mechanical stirring was evacuated while it was hot and then filled with N$_2$ gas 3 times. 500 mL of hexane was charged into the polymerization autoclave, and at the same time 4.0 mg (2.5 μmol) of the complex $Ni_{11}$, 6 mL of 10-undecen-1-ol, 30 mL of AlEt$_3$ (1.0 mol/L solution in hexane), and 5.0 mL of MAO (1.53 mol/l solution in toluene) were added thereto. The reaction was stirred at 60° C. for 30 minutes, with ethylene pressure being maintained at 10 atm. The reaction mixture was finally neutralized with an ethanol solution acidified with 10 wt % hydrochloric acid to obtain a polymer. The polymerization activity and polymer performance parameters are shown in Table 3 below.

Example 30

After having been continuously dried at 130° C. for 6 hrs, a 1 L stainless steel polymerization autoclave equipped with mechanical stirring was evacuated while it was hot and then filled with N$_2$ gas 3 times. 500 mL of hexane was charged into the polymerization autoclave, and at the same time 4.0 mg (2.5 μmol) of the complex $Ni_{11}$, 5.52 g of 10-undecenoic acid, 30 mL of AlEt$_3$ (1.0 mol/L solution in hexane), and 5.0 mL of MAO (1.53 mol/A solution in toluene) were added thereto. The reaction was stirred at 60° C. for 30 minutes, with ethylene pressure being maintained at 10 atm. The reaction mixture was finally neutralized with an ethanol solution acidified with 10 wt % hydrochloric acid to obtain a polymer. The polymerization activity and polymer performance parameters are shown in Table 3 below.

Example 31—Preparation of Complex Ni$_{12}$
(Represented by Structural Formula IIIb, wherein R$^1$, R$^3$ are Isopropyl; R$^2$, R$^4$-R$^7$, R$^{10}$ are Hydrogen; R$^8$, R$^9$ and R$^{11}$ are Methyl; Rn is Ethyl; M is Nickel, Y is O, and X is Br)

Under nitrogen atmosphere, 2,6-diisopropylaniline (2.4 ml, 12 mmol) was dissolved in 20 ml of toluene, and 12 ml of trimethylaluminum (1.0M, 12 mmol) was added dropwise at room temperature. The reaction was refluxed for 2 hours, and the system was then cooled to room temperature. Camphorquinone (0.831 g, 5 mmol) was added, and the system was refluxed for 6 h. The reaction product was neutralized with aqueous sodium hydroxide solution, extracted with dichloromethane, and dried, and then subjected to a column chromatography to afford yellow ligand L$_{11}$. Yield: 41.3%. $^1$H NMR (300 MHz, CDCl3), δ (ppm): 7.06-6.81 (m, 6H, Ar—H), 2.88 (m, 4H, CH(CH$_3$)$_2$), 2.36 (m, 1H), 1.86 (m, 4H, CH$_2$), 1.24 (d, 24H, CH(CH$_3$)$_2$), 0.96 (s, 6H, CH$_3$ at camphyl), 0.77 (s, 3H, CH$_3$).

A solution of 0.277 g (0.9 mmol) of (DME)NiBr$_2$ in ethanol (10 mL) was added slowly dropwise to a solution of 0.291 g (0.6 mmol) of ligand Li in dichloromethane (10 mL). The color of the solution immediately changed to deep red, and a large quantity of precipitants was formed. The reaction was stirred at room temperature for 6 h, and then anhydrous diethyl ether was added to perform precipitation. A filtration was performed to afford a filter cake, and the filter cake was washed with anhydrous diethyl ether and dried in vacuum to afford Ni$_{12}$ as brownish-red powdery solids. Yield: 74.0%. Elemental analysis (calculated for C$_{72}$H$_{106}$Br$_6$N$_4$Ni$_3$O$_2$): C, 50.42; H, 6.23; N, 3.27; experimental value (%): C, 50.28; H, 6.42; N, 3.18.

After having been continuously dried at 130° C. for 6 hrs, a 1 L stainless steel polymerization autoclave equipped with mechanical stirring was evacuated while it was hot and then filled with N$_2$ gas 3 times. 500 mL of hexane was charged into the polymerization autoclave, then 5.0 mL of methylaluminoxane (MAO) (1.53 mol/l solution in toluene) was added, and 4.3 mg (2.5 µmol) of the complex Ni$_{12}$ was added. The reaction was vigorously stirred at 60° C. for 30 minutes, with ethylene pressure being maintained at 10 atm. The reaction mixture was neutralized with an ethanol solution acidified with 10 wt % hydrochloric acid to obtain a polyethylene. The results are shown in Table 3 below.

Example 32

After having been continuously dried at 130° C. for 6 hrs, a 1 L stainless steel polymerization autoclave equipped with mechanical stirring was evacuated while it was hot and then filled with N$_2$ gas 3 times. 500 mL of hexane was charged into the polymerization autoclave, then 5.0 mL of methylaluminoxane (MAO) (1.53 mol/l solution in toluene) was added, and 4.3 mg (2.5 µmol) of the complex Ni$_{12}$ was added. The reaction was vigorously stirred at 100° C. for 30 minutes, with ethylene pressure being maintained at 10 atm. The reaction mixture was neutralized with an ethanol solution acidified with 10 wt % hydrochloric acid to obtain a polyethylene. The results are shown in Table 3 below.

Example 33

After having been continuously dried at 130° C. for 6 hrs, a 1 L stainless steel polymerization autoclave equipped with mechanical stirring was evacuated while it was hot and then filled with N$_2$ gas 3 times. 500 mL of hexane and 10 mL of 1-hexene were charged into the polymerization autoclave, then 5.0 mL of methylaluminoxane (MAO) (1.53 mol/l solution in toluene) was added, and 4.3 mg (2.5 µmol) of the complex Ni$_{12}$ was added. The reaction was vigorously stirred at 100° C. for 30 minutes, with ethylene pressure being maintained at 10 atm. The reaction mixture was neutralized with an ethanol solution acidified with 10 wt % hydrochloric acid to obtain a polymer. The results are shown in Table 3 below.

Example 34

After having been continuously dried at 130° C. for 6 hrs, a 1 L stainless steel polymerization autoclave equipped with mechanical stirring was evacuated while it was hot and then filled with N$_2$ gas 3 times. 500 mL of hexane was charged into the polymerization autoclave, and at the same time 4.3 mg (2.5 µmol) of the complex Ni$_{12}$, 6 mL of 10-undecen-1-ol, 30 mL of AlEt$_3$ (1.0 mol/L solution in hexane), and 5.0 mL of MAO (1.53 mol/l solution in toluene) were added thereto. The reaction was stirred at 60° C. for 30 minutes, with ethylene pressure being maintained at 10 atm. The reaction mixture was finally neutralized with an ethanol solution acidified with 10 wt % hydrochloric acid to obtain a polymer. The polymerization activity and polymer performance parameters are shown in Table 3 below.

Example 35

After having been continuously dried at 130° C. for 6 hrs, a 1 L stainless steel polymerization autoclave equipped with mechanical stirring was evacuated while it was hot and then filled with N$_2$ gas 3 times. 500 mL of hexane was charged into the polymerization autoclave, and at the same time 4.3 mg (2.5 µmol) of the complex Ni$_{12}$, 5.52 g of 10-undecenoic acid, 30 mL of AlEt$_3$ (1.0 mol/L solution in hexane), and 5.0 mL of MAO (1.53 mol/l solution in toluene) were added thereto. The reaction was stirred at 60° C. for 30 minutes, with ethylene pressure being maintained at 10 atm. The reaction mixture was finally neutralized with an ethanol solution acidified with 10 wt % hydrochloric acid to obtain a polymer. The polymerization activity and polymer performance parameters are shown in Table 3 below.

Example 36—Preparation of Complex Ni$_{13}$
(Represented by Structural Formula IIIb, wherein R$^1$, R$^3$ are Isopropyl; R$^2$, R$^4$-R$^7$, R$^{10}$ are Hydrogen; R$^8$, R$^9$ and R$^{11}$ are Methyl; R$_{12}$ is Isobutyl; M is Nickel, Y is O, and X is Br)

A solution of 0.277 g (0.9 mmol) of (DME)NiBr$_2$ in 2-methyl-1-propanol (10 mL) was added slowly dropwise to a solution of 0.291 g (0.6 mmol) of ligand L$_{11}$ in dichloromethane (10 mL). The color of the solution immediately changed to deep red, and a large quantity of precipitants was formed. The reaction was stirred at room temperature for 6 h, and then anhydrous diethyl ether was added to perform precipitation. A filtration was performed to afford a filter cake, and the filter cake was washed with anhydrous diethyl ether and dried in vacuum to afford $Ni_{13}$ as brownish-red powdery solids. Yield: 74.0%. Elemental analysis (calculated for $C_{76}H_{114}Br_6N_4Ni_3O_2$): C, 51.54; H, 6.49; N, 3.16; experimental value (%): C, 51.28; H, 6.82; N, 3.19.

Ethylene Polymerization: After having been continuously dried at 130° C. for 6 hrs, a 1 L stainless steel polymerization autoclave equipped with mechanical stirring was evacuated while it was hot and then filled with $N_2$ gas 3 times. 500 mL of hexane was charged into the polymerization autoclave, then 5.0 mL of methylaluminoxane (MAO) (1.53 mol/l solution in toluene) was added, and 4.4 mg (2.5 μmol) of the complex $Ni_{13}$ was added. The reaction was vigorously stirred at 100° C. for 30 minutes, with ethylene pressure being maintained at 10 atm. The reaction mixture was neutralized with an ethanol solution acidified with 10 wt % hydrochloric acid to obtain a polyethylene. The results are shown in Table 3 below.

Example 37—Preparation of Complex $Ni_{14}$
(Represented by Structural Formula IIIb, wherein $R^1$, $R^3$ are Fluorine; $R^2$, $R^4$-$R^7$, $R^{10}$ are Hydrogen; $R^8$, $R^9$ and $R^{11}$ are Methyl; $R_{12}$ is Ethyl; M is Nickel, Y is O, and X is Br)

Under nitrogen atmosphere, 2,6-difluoro-aniline (1.3 ml, 12 mmol) was dissolved in 20 ml of toluene, and 12 ml of trimethylaluminum (1.0M, 12 mmol) was added dropwise at room temperature. The reaction was refluxed for 2 hours, and the system was then cooled to room temperature. Camphorquinone (0.831 g, 5 mmol) was added, and the system was refluxed for 6 h. The reaction product was neutralized with aqueous sodium hydroxide solution, extracted with dichloromethane, and dried, and then subjected to a column chromatography to afford yellow ligand $L_{12}$. Yield: 50.3%. $^1$HNMR ($CDCl_3$): δ [with an isomer ratio of 1.2:1]: major isomer: 6.83-6.74 (m, 6H, $C_{Ar}$—$CH_3$), 1.93-1.90 (m, 4H, $CH_2$), 1.55 (m, 1H), 1.26 (s, 3H, $CH_3$), 1.06 (s, 6H, $CH_3$), minor isomer: 6.91-6.84 (m, 6H, $C_{Ar}$—$CH_3$), 1.96-1.94 (m, 4H, $CH_2$), 1.55 (m, 1H), 1.26 (s, 3H, $CH_3$), 1.02 (s, 6H, $CH_3$).

A solution of 0.277 g (0.9 mmol) of (DME)$NiBr_2$ in ethanol (10 mL) was added slowly dropwise to a solution of 0.233 g (0.6 mmol) of ligand $L_{12}$ in dichloromethane (10 mL). The color of the solution immediately changed to deep red, and a large quantity of precipitants was formed. The reaction was stirred at room temperature for 6 h, and then anhydrous diethyl ether was added to perform precipitation. A filtration was performed to afford a filter cake, and the filter cake was washed with anhydrous diethyl ether and dried in vacuum to afford $Ni_{14}$ as brownish-red powdery solids. Yield: 74.3%. Elemental analysis (calculated for $C_{48}H_{50}Br_6F_8N_4Ni_3O_2$): C, 37.87; H, 3.31; N, 3.68; experimental value (%): C, 37.78; H, 3.62; N, 3.28.

Ethylene Polymerization: After having been continuously dried at 130° C. for 6 hrs, a 1 L stainless steel polymerization autoclave equipped with mechanical stirring was evacuated while it was hot and then filled with $N_2$ gas 3 times. 500 mL of hexane was charged into the polymerization autoclave, then 5.0 mL of methylaluminoxane (MAO) (1.53 mol/l solution in toluene) was added, and 3.8 mg (2.5 μmol) of the complex $Ni_{14}$ was added. The reaction was vigorously stirred at 60° C. for 30 minutes, with ethylene pressure being maintained at 10 atm. The reaction mixture was neutralized with an ethanol solution acidified with 10 wt %4 hydrochloric acid to obtain a polyethylene. The results are shown in Table 3 below.

Example 38—Preparation of Complex $Ni_{15}$
(Represented by the Structural Formula IIIb, wherein $R^1$-$R^3$ are Methyl, $R^4$-$R^7$ and $R^{10}$ are Hydrogen, $R^8$, $R^9$ and $R^{11}$ are Methyl, $R_{12}$ is Ethyl, M is Nickel, Y is O, and X is Br)

Under nitrogen atmosphere, 2,4,6-trimethyl-aniline (1.7 ml, 12 mmol) was dissolved in 20 ml of toluene, and 12 ml of trimethylaluminum (1.0M, 12 mmol) was added dropwise at room temperature. The reaction was refluxed for 2 hours, and the system was then cooled to room temperature. Camphorquinone (0.831 g, 5 mmol) was added, and the system was refluxed for 6 h. The reaction product was neutralized with aqueous sodium hydroxide solution, extracted with dichloromethane, and dried, and then subjected to a column chromatography to afford yellow ligand $L_{13}$. Yield: 62.5%. $^1$HNMR (300 MHz, $CDCl_3$), δ (ppm) [with an isomer ratio of 1.2:1]: major isomer: 6.72 (s, 4H, Ar—H), 2.26-2.13 (m, 12H, $C_{Ar}$—$CH_3$), 1.87 (s, 6H, $C_{Ar}$—$CH_3$), 1.79 (m, 4H, $CH_2$), 1.42 (m, 1H), 1.26 (s, 3H, $CH_3$), 1.07 (s, 6H, $CH_3$); minor isomer: 6.67 (s, 4H, Ar—H), 2.09-2.01 (m, 12H, $C_{Ar}$—$CH_3$), 1.85 (s, 6H, $C_{Ar}$—$CH_3$), 1.79 (m, 4H, $CH_2$), 1.40 (m, 1H), 1.26 (s, 3H, $CH_3$), 0.94 (s, 6H, $CH_3$).

A solution of 0.277 g (0.9 mmol) of (DME)$NiBr_2$ in ethanol (10 mL) was added slowly dropwise to a solution of 0.240 g (0.6 mmol) of ligand $L_{13}$ in dichloromethane (10 mL). The color of the solution immediately changed to deep red, and a large quantity of precipitants was formed. The reaction was stirred at room temperature for 6 h, and then anhydrous diethyl ether was added to perform precipitation. A filtration was performed to afford a filter cake, and the filter cake was washed with anhydrous diethyl ether and dried in vacuum to afford $Ni_{15}$ as brownish-red powdery solids. Yield: 78.6%. Elemental analysis (calculated for $C_{60}H_{82}Br_6N_4Ni_3O_2$): C, 46.59; H, 5.34; N, 3.62; experimental value (%): C, 46.24; H, 5.67; N, 3.21.

Ethylene Polymerization: After having been continuously dried at 130° C. for 6 hrs, a 1 L stainless steel polymerization autoclave equipped with mechanical stirring was evacuated while it was hot and then filled with $N_2$ gas 3 times. 500 mL of hexane was charged into the polymerization autoclave, then 5.0 mL of methylaluminoxane (MAO) (1.53 mol/l solution in toluene) was added, and 3.9 mg (2.5 μmol) of the complex Nit, was added. The reaction was vigorously stirred at 60° C. for 30 minutes, with ethylene pressure being maintained at 10 atm. The reaction mixture was neutralized with an ethanol solution acidified with 10 wt %4 hydrochloric acid to obtain a polyethylene. The results are shown in Table 3 below.

Example 39—Preparation of Complex $Ni_{16}$
(Represented by the Structural Formula IIIb, wherein $R^1$ and $R^3$ are Methyl, $R^2$ is Bromine, $R^4$-$R^7$ and $R^{10}$ are Hydrogen, $R^8$, $R^9$ and $R^{11}$ are Methyl, $R_{12}$ is Ethyl, M is Nickel, Y is O, and X is Br)

Under nitrogen atmosphere, 2,6-dimethyl-4-bromo-aniline (2.45 g, 12 mmol) was dissolved in ml of toluene, and 12 ml of trimethylaluminum (LOM, 12 mmol) was added dropwise at room temperature. The reaction was refluxed for 2 hours, and the system was then cooled to room temperature. Camphorquinone (0.831 g, 5 mmol) was added, and the system was refluxed for 6 h. The reaction product was neutralized with aqueous sodium hydroxide solution, extracted with dichloromethane, and dried, and then subjected to a column chromatography to afford yellow ligand $L_{14}$. Yield: 60.7%. $^1$HNMR (300 MHz, CDCl$_3$), δ (ppm) [with an isomer ratio of 1.1:1]: major isomer: 7.05 (s, 4H, Ar—H), 2.18 (m, 12H, $C_{Ar}$—CH$_3$), 1.85 (m, 4H, CH$_2$), 1.37 (m, 1H), 1.26 (s, 3H, CH$_3$), 1.06 (s, 6H, CH$_3$); minor isomer: 7.02 (s, 4H, Ar—H), 2.04 (m, 12H, $C_{Ar}$—CH$_3$), 1.85 (m, 4H, CH$_2$), 1.37 (m, 1H), 1.26 (s, 3H, CH$_3$), 0.96 (s, 6H, CH$_3$).

A solution of 0.278 g (0.9 mmol) of (DME)NiBr$_2$ in ethanol (10 mL) was added slowly dropwise to a solution of 0.318 g (0.6 mmol) of ligand $L_{14}$ in dichloromethane (10 mL). The color of the solution immediately changed to deep red, and a large quantity of precipitants was formed.

The reaction was stirred at room temperature for 6 h, and then anhydrous diethyl ether was added to perform precipitation. A filtration was performed to afford a filter cake, and the filter cake was washed with anhydrous diethyl ether and dried in vacuum to afford Ni$_{16}$ as brownish-red powdery solids. Yield: 74.1%. Elemental analysis (calculated for C$_{56}$H$_{70}$Br$_{10}$N$_4$Ni$_3$O$_2$): C, 37.24; H, 3.91; N, 3.10; experimental value (%): C, 37.38; H, 4.30; N, 3.03.

Ethylene Polymerization: After having been continuously dried at 130° C. for 6 hrs, a 1 L stainless steel polymerization autoclave equipped with mechanical stirring was evacuated while it was hot and then filled with N$_2$ gas 3 times. 500 mL of hexane was charged into the polymerization autoclave, then 5.0 mL of methylaluminoxane (MAO) (1.53 mol/l solution in toluene) was added, and 4.5 mg (2.5 μmol) of the complex Ni$_{16}$ was added. The reaction was vigorously stirred at 60° C. for 30 minutes, with ethylene pressure being maintained at 10 atm. The reaction mixture was neutralized with an ethanol solution acidified with 10 wt % hydrochloric acid to obtain a polyethylene. The results are shown in Table 3 below.

Example 40—Preparation of Complex Ni$_{17}$
(Represented by the Structural Formula IIIb, wherein $R^1$ and $R^3$ are Isopropyl, $R^2$, $R^4$-$R^7$ and $R^{10}$ are Hydrogen, $R^8$ and $R^9$ are Methyl, $R^{11}$ is CH$_2$Br, and $R_{12}$ is Ethyl)

Under nitrogen atmosphere, 2,6-diisopropyl-aniline (2.30 ml, 12 mmol) was dissolved in 20 ml of toluene, and 12 ml of trimethylaluminum (1.0M, 12 mmol) was added dropwise at room temperature. The reaction was refluxed for 2 hours, and the system was then cooled to room temperature. Dione

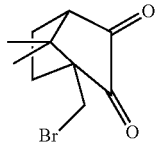

(1.225 g, 5 mmol) was added, and the system was refluxed for 6 h. The reaction product was neutralized with aqueous sodium hydroxide solution, extracted with dichloromethane, and dried, and then subjected to a column chromatography to afford yellow ligand $L_{15}$. Yield: 62.7%. $^1$H NMR (300 MHz, CDCl$_3$), δ (ppm): 7.05-6.83 (m, 6H, Ar—H), 3.30 (m, 2H, CH$_2$), 2.80 (m, 4H, CH(CH$_3$)$_2$), 1.55 (m, 1H), 1.83 (m, 4H, CH$_2$), 1.26 (d, 24H, CH(CH$_3$)$_2$), 0.99 (s, 6H, CH$_3$).

A solution of 0.277 g (0.9 mmol) of (DME)NiBr$_2$ in ethanol (10 mL) was added slowly dropwise to a solution of 0.338 g (0.6 mmol) of ligand $L_{15}$ in dichloromethane (10 mL). The color of the solution immediately changed to deep red, and a large quantity of precipitants was formed. The reaction was stirred at room temperature for 6 h, and then anhydrous diethyl ether was added to perform precipitation. A filtration was performed to afford a filter cake, and the filter cake was washed with anhydrous diethyl ether and dried in vacuum to afford Ni$_{17}$ as brownish-red powdery solids. Yield: 80.2%. Elemental analysis (calculated for C$_{72}$H$_{104}$Br$_8$N$_4$Ni$_3$O$_2$): C, 46.17; H, 5.60; N, 2.99; experimental value (%): C, 46.24; H, 5.80; N, 3.13.

Ethylene Polymerization: After having been continuously dried at 130° C. for 6 hrs, a 1 L stainless steel polymerization autoclave equipped with mechanical stirring was evacuated while it was hot and then filled with N$_2$ gas 3 times. 500 mL of hexane was charged into the polymerization autoclave, then 5.0 mL of methylaluminoxane (MAO) (1.53 mol/l solution in toluene) was added, and 4.7 mg (2.5 μmol) of the complex Ni$_{17}$ was added. The reaction was vigorously stirred at 60° C. for 30 minutes, with ethylene pressure being maintained at 10 atm. The reaction mixture was neutralized with an ethanol solution acidified with 10 wt %4 hydrochloric acid to obtain a polyethylene. The results are shown in Table 3 below.

Comparative Example 7

After having been continuously dried at 130° C. for 6 hrs, a 1 L stainless steel polymerization autoclave equipped with mechanical stirring was evacuated while it was hot and then filled with N$_2$ gas 3 times. 500 mL of hexane was charged into the polymerization autoclave, then 5.0 mL of methylaluminoxane (MAO) (1.53 mol/l solution in toluene) was added, and 4.8 mg (7.5 μmol) of Catalyst Compound C was added. The reaction was vigorously stirred at 60° C. for 30 minutes, with ethylene pressure being maintained at 10 atm. The reaction mixture was neutralized with an ethanol solution acidified with 10 wt % hydrochloric acid to obtain a polyethylene. The results are shown in Table 3 below.

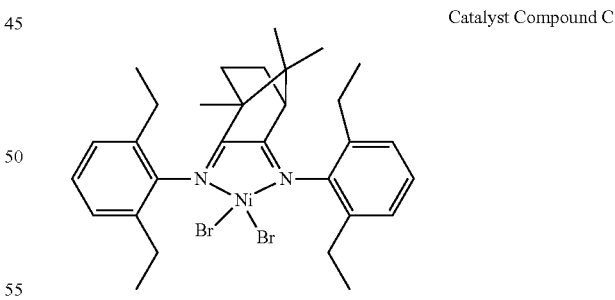

Catalyst Compound C

Comparative Example 8

After having been continuously dried at 130° C. for 6 hrs, a 1 L stainless steel polymerization autoclave equipped with mechanical stirring was evacuated while it was hot and then filled with N$_2$ gas 3 times. 500 mL of hexane was charged into the polymerization autoclave, then 5.0 mL of methylaluminoxane (MAO) (1.53 mol/l solution in toluene) was added, and 4.8 mg (7.5 μmol) of Catalyst Compound C was added. The reaction was vigorously stirred at 100° C. for 30 minutes, with ethylene pressure being maintained at 10 atm. The reaction mixture was neutralized with an ethanol solution acidified with 10 wt % hydrochloric acid to obtain a polyethylene. The results are shown in Table 3 below.

Comparative Example 9

After having been continuously dried at 130° C. for 6 hrs, a 1 L stainless steel polymerization autoclave equipped with mechanical stirring was evacuated while it was hot and then filled with $N_2$ gas 3 times. 500 mL of hexane and 10 ml of 1-hexene were charged into the polymerization autoclave, then 5.0 mL of methylaluminoxane (MAO) (1.53 mol/l solution in toluene) was added, and 4.8 mg (7.5 μmol) of Catalyst Compound C was added. The reaction was vigorously stirred at 100° C. for 30 minutes, with ethylene pressure being maintained at 10 atm. The reaction mixture was neutralized with an ethanol solution acidified with 10 wt % hydrochloric acid to obtain a polymer. The results are shown in Table 3 below.

Comparative Example 10

After having been continuously dried at 130° C. for 6 hrs, a 1 L stainless steel polymerization autoclave equipped with mechanical stirring was evacuated while it was hot and then filled with $N_2$ gas 3 times. 500 mL of hexane was charged into the polymerization autoclave, then 5.0 mL of methylaluminoxane (MAO) (1.53 mol/l solution in toluene) was added, and 4.7 mg (7.5 μmol) of Catalyst Compound D was added. The reaction was vigorously stirred at 90° C. for 30 minutes, with ethylene pressure being maintained at 10 atm. The reaction mixture was neutralized with an ethanol solution acidified with 10 wt % hydrochloric acid to obtain a polyethylene. Polymerization activity was found to be 0.02× $10^6$ g mol$^{-1}$(Ni)·h$^{-1}$, and the results are shown in Table 3 below.

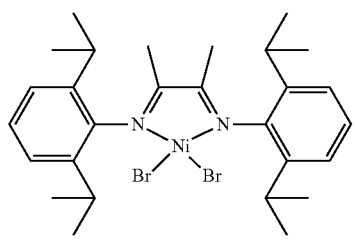

Catalyst Compound D

TABLE 3

| Example | Complex | Activity ($10^6$ g/molNi · h) | Mw × $10^{-4}$ | Mw/Mn |
|---|---|---|---|---|
| Example 27 | $Ni_{11}$ | 11.76 | 9.38 | 2.25 |
| Example 28 | $Ni_{11}$ | 4.14 | 4.32 | 2.21 |
| Example 29 | $Ni_{11}$ | 6.32 | 5.37 | 2.12 |
| Example 30 | $Ni_{11}$ | 17.42 | 12.4 | 2.08 |
| Example 31 | $Ni_{11}$ | 13.28 | 10.2 | 2.03 |
| Example 32 | $Ni_{12}$ | 18.32 | 73.4 | 2.02 |
| Example 33 | $Ni_{12}$ | 8.30 | 31.3 | 2.06 |

TABLE 3-continued

| Example | Complex | Activity ($10^6$ g/molNi · h) | Mw × $10^{-4}$ | Mw/Mn |
|---|---|---|---|---|
| Example 34 | $Ni_{12}$ | 9.20 | 32.7 | 2.01 |
| Example 35 | $Ni_{12}$ | 18.41 | 31.3 | 2.01 |
| Example 36 | $Ni_{12}$ | 15.42 | 18.7 | 2.04 |
| Example 37 | $Ni_{13}$ | 9 21 | 33.6 | 2.03 |
| Example 38 | $Ni_{14}$ | 5.44 | 3.2 | 2.01 |
| Example 39 | $Ni_{15}$ | 13.21 | 16.24 | 2.18 |
| Example 40 | $Ni_{16}$ | 6.03 | 8.96 | 2.09 |
| Example 41 | $Ni_{17}$ | 17.6 | 63.2 | 2.03 |
| Comp. Ex. 7 | C | 8.49 | 8.02 | 2.62 |
| Comp. Ex. 8 | C | 1.21 | 1.33 | 2.70 |
| Comp. Ex. 9 | C | 1.25 | 1.35 | 2.82 |
| Comp. Ex. 10 | D | Trace amount | | |

It can be seen from Table 3 that when used as the main catalyst, the metal complexes of the present invention have much higher polymerization activities under high temperature polymerization conditions, compared with the complexes of Comparative Examples 7 and 8, and the obtained polymers have a significantly higher molecular weight and a narrower molecular weight distribution than that of the polymers obtained in the comparative examples.

Example 41

1) Ligand $L_{16}$ (Represented by the Structural Formula B, wherein $R^1$, $R^3$, $R^4$, and $R^6$ are Isopropyl, $R^2$, $R^5$, $R^7$-$R^{10}$, $R_{21}$, and $R_{22}$ are Hydrogen) was Prepared by Following the Literature Organometallics, 2013, 32, 2291-2299.

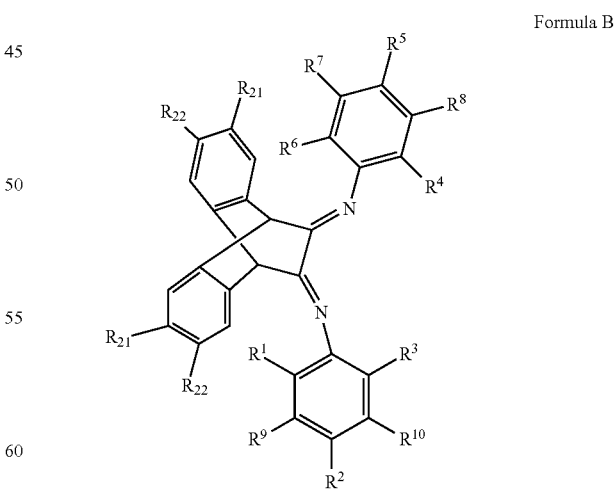

Formula B

2) Preparation of Complex $Ni_{18}$ (Represented by the Structural Formula IIIc, wherein $R^1$, $R^3$, $R^4$, and $R^6$ are Isopropyl, $R^2$, $R^5$, $R^7$-$R^{10}$, $R_{21}$, and $R_{22}$ are Hydrogen, $R_{11}$ is Ethyl, M is Nickel, Y is O, and X is Br):

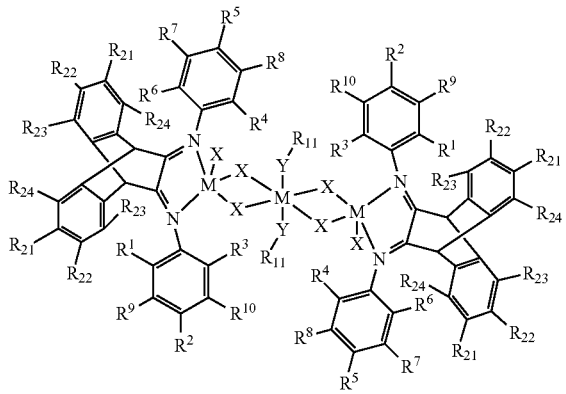

Formula IIIc

A solution of 0.277 g (0.9 mmol) of (DME)NiBr$_2$ in ethanol (10 mL) was added slowly dropwise to a solution of 0.332 g (0.6 mmol) of ligand L$_{16}$ in dichloromethane (10 mL). The color of the solution immediately changed to deep red, and a large quantity of precipitants was formed. The reaction was stirred at room temperature for 6 h, and then anhydrous diethyl ether was added to perform precipitation. A filtration was performed to afford a filter cake, and the filter cake was washed with anhydrous diethyl ether and dried in vacuum to afford Ni$_{18}$ as red powdery solids. Yield: 78.2%. Elemental analysis (calculated for C$_{84}$H$_{98}$Br$_6$N$_4$Ni$_3$O$_2$): C, 54.50; H, 5.34; N, 3.03; experimental value (%): C, 54.38; H, 5.72; N, 3.16.

3) Ethylene Polymerization:

After having been continuously dried at 130° C. for 6 hrs, a 1 L stainless steel polymerization autoclave equipped with mechanical stirring was evacuated while it was hot and then filled with N$_2$ gas 3 times. 500 mL of hexane was charged into the polymerization autoclave, then 5.0 mL of methylaluminoxane (MAO) (1.53 mol/l solution in toluene) was added, and 4.6 mg (2.5 µmol) of the complex Ni$_{18}$ was added. The reaction was vigorously stirred at 60° C. for 30 minutes, with ethylene pressure being maintained at 10 atm. The reaction mixture was neutralized with an ethanol solution acidified with 10 wt % hydrochloric acid to obtain a polyethylene. The results are shown in Table 4 below.

Example 42

Ethylene polymerization was carried out according to the procedure for ethylene polymerization described in Example 41, except that the temperature for ethylene polymerization was 100° C. The results are shown in Table 4 below.

Example 43

After having been continuously dried at 130° C. for 6 hrs, a 1 L stainless steel polymerization autoclave equipped with mechanical stirring was evacuated while it was hot and then filled with N$_2$ gas 3 times. 500 mL of hexane and 10 mL of 1-hexene were charged into the polymerization autoclave, then 5.0 mL of methylaluminoxane (MAO) (1.53 mol/ solution in toluene) was added, and 4.6 mg (2.5 µmol) of the complex Ni$_{18}$ was added. The reaction was vigorously stirred at 100° C. for 30 minutes, with ethylene pressure being maintained at 10 atm. The reaction mixture was neutralized with an ethanol solution acidified with 10 wt % hydrochloric acid to obtain a polymer. The results are shown in Table 4 below.

Example 44

After having been continuously dried at 130° C. for 6 hrs, a 1 L stainless steel polymerization autoclave equipped with mechanical stirring was evacuated while it was hot and then filled with N$_2$ gas 3 times. 500 mL of hexane was charged into the polymerization autoclave, and at the same time 4.6 mg (2.5 µmol) of the complex Ni$_{18}$, 6 mL of 10-undecen-1-ol, 30 mL of AlEt$_3$ (1.0 mol/L solution in hexane), and 5.0 mL of MAO (1.53 mol/l solution in toluene) were added thereto. The reaction was stirred at 60° C. for 30 minutes, with ethylene pressure being maintained at 10 atm. The reaction mixture was finally neutralized with an ethanol solution acidified with 10 wt % hydrochloric acid to obtain a polymer. The results are shown in Table 4 below.

Example 44A

Copolymerization of ethylene and 10-undecen-1-ol was carried out according to the polymerization procedure described in Example 44, except that the polymerization temperature was 100° C. The results are shown in Table 4 below.

Example 45

After having been continuously dried at 130° C. for 6 hrs, a 1 L stainless steel polymerization autoclave equipped with mechanical stirring was evacuated while it was hot and then filled with N$_2$ gas 3 times. 500 mL of hexane was charged into the polymerization autoclave, and at the same time 4.6 mg (2.5 µmol) of the complex Ni$_{18}$, 5.52 g of 10-undecenoic acid, 30 mL of AlEt$_3$ (1.0 mol/L solution in hexane), and 5.0 mL of MAO (1.53 mol/l solution in toluene) were added thereto. The reaction was stirred at 60° C. for 30 minutes, with ethylene pressure being maintained at 10 atm. The reaction mixture was finally neutralized with an ethanol solution acidified with 10 wt % hydrochloric acid to obtain a polymer. The results are shown in Table 4 below.

Example 45A

Copolymerization of ethylene and 10-undecenoic acid was carried out according to the polymerization procedure described in Example 45, except that the polymerization temperature was 100° C. The results are shown in Table 4 below.

Example 46

1) Ligand L$_{17}$ (represented by the structural Formula B, wherein R$^1$, R$^3$, R$^4$ and R$^6$ are ethyl, R$^2$, R$^5$, R$^7$-R$^{10}$ and R$_{22}$ are hydrogen, and R$_{21}$ is tert-butyl) was prepared by following the Patent CN106397264.
2) Preparation of complex Ni$_{19}$ (represented by the structural Formula IIIc, wherein R$^1$, R$^3$, R$^4$ and R$^5$ are ethyl, R$^2$, R$^5$, R$^7$-R$^{10}$ and R$_{22}$ are hydrogen, R$_{21}$ is tert-butyl, R$_{11}$ is ethyl, M is nickel, Y is O, and X is Br):

A solution of 0.277 g (0.9 mmol) of (DME)NiBr$_2$ in ethanol (10 mL) was added slowly dropwise to a solution of 0.365 g (0.6 mmol) of ligand L$_{17}$ in dichloromethane (10 mL). The color of the solution immediately changed to deep red, and a large quantity of precipitants was formed. The reaction was stirred at room temperature for 6 h, and then anhydrous diethyl ether was added to perform precipitation. A filtration was performed to afford a filter cake, and the filter cake was washed with anhydrous diethyl ether and dried in vacuum to afford $Ni_{19}$ as brownish-red powdery solids. Yield: 82.0%. Elemental analysis (calculated for $C_{92}H_{114}Br_6N_4Ni_3O_2$): C, 56.28; H, 5.85; N, 2.85; experimental value (%): C, 56.43; H, 6.12; N, 3.08.

3) Ethylene Polymerization:

After having been continuously dried at 130° C. for 6 hrs, a 1 L stainless steel polymerization autoclave equipped with mechanical stirring was evacuated while it was hot and then filled with $N_2$ gas 3 times. 500 mL of hexane was charged into the polymerization autoclave, then 5.0 mL of methylaluminoxane (MAO) (1.53 mol/l solution in toluene) was added, and 4.9 mg (2.5 µmol) of the complex $Ni_{19}$ was added. The reaction was vigorously stirred at 60° C. for 30 minutes, with ethylene pressure being maintained at 10 atm. The reaction mixture was neutralized with an ethanol solution acidified with 10 wt % hydrochloric acid to obtain a polyethylene. The results are shown in Table 4 below.

Example 47

Ethylene polymerization was carried out according to the procedure for ethylene polymerization described in Example 46, except that the temperature for ethylene polymerization was 100° C. The results are shown in Table 4 below.

Example 48

After having been continuously dried at 130° C. for 6 hrs, a 1 L stainless steel polymerization autoclave equipped with mechanical stirring was evacuated while it was hot and then filled with $N_2$ gas 3 times. 500 mL of hexane and 10 mL of 1-hexene were charged into the polymerization autoclave, then 5.0 mL of methylaluminoxane (MAO) (1.53 mol/l solution in toluene) was added, and 4.9 mg (2.5 µmol) of the complex $Ni_{19}$ was added. The reaction was vigorously stirred at 100° C. for 30 minutes, with ethylene pressure being maintained at 10 atm. The reaction mixture was neutralized with an ethanol solution acidified with 10 wt % hydrochloric acid to obtain a polymer. The results are shown in Table 4 below.

Example 49

After having been continuously dried at 130° C. for 6 hrs, a 1 L stainless steel polymerization autoclave equipped with mechanical stirring was evacuated while it was hot and then filled with $N_2$ gas 3 times. 500 mL of hexane was charged into the polymerization autoclave, and at the same time 4.9 mg (2.5 µmol) of the complex $Ni_{19}$, 6 mL of 10-undecen-1-ol, 30 mL of $AlEt_3$ (1.0 mol/L solution in hexane), and 5.0 mL of MAO (1.53 mol/l solution in toluene) were added thereto. The reaction was stirred at 60° C. for 30 minutes, with ethylene pressure being maintained at 10 atm. The reaction mixture was finally neutralized with an ethanol solution acidified with 10 wt % hydrochloric acid to obtain a polymer. The results are shown in Table 4 below.

Example 49A

Copolymerization of ethylene and 10-undecen-1-ol was carried out according to the polymerization procedure described in Example 49, except that the polymerization temperature was 100° C. The results are shown in Table 4 below.

Example 50

After having been continuously dried at 130° C. for 6 hrs, a 1 L stainless steel polymerization autoclave equipped with mechanical stirring was evacuated while it was hot and then filled with $N_2$ gas 3 times. 500 mL of hexane was charged into the polymerization autoclave, and at the same time 4.9 mg (2.5 µmol) of the complex $Ni_{19}$, 5.52 g of 10-undecenoic acid, 30 mL of $AlEt_3$ (1.0 mol/L solution in hexane), and 5.0 mL of MAO (1.53 mol/l solution in toluene) were added thereto. The reaction was stirred at 60° C. for 30 minutes, with ethylene pressure being maintained at 10 atm. The reaction mixture was finally neutralized with an ethanol solution acidified with 10 wt % hydrochloric acid to obtain a polymer. The results are shown in Table 4 below.

Example 50A

Copolymerization of ethylene and 10-undecenoic acid was carried out according to the polymerization procedure described in Example 50, except that the polymerization temperature was 100° C. The results are shown in Table 4 below.

Example 51

1) Preparation of Ligand $L_{18}$:
Compound A:

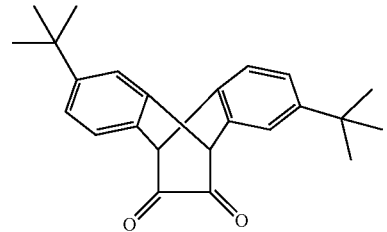 [SMILES: CC(C)(C)c1ccc2c(c1)C1C(=O)C(=O)C2c2ccc(C(C)(C)C)cc21]

(1.77 g, 5.1 mmol) and 2,6-dimethyl-4-bromo-aniline (2.3 g, 11.3 mmol) were refluxed, in the presence of p-toluenesulfonic acid (0.02 g) as a catalyst, in 100 mL of toluene for 1 day. The solvent was removed by filtration, and the residue was dissolved in dichloromethane and separated by column chromatography with petroleum ether/ethyl acetate as an eluant, to afford yellow solids. Yield: 78%. $^1H$ NMR ($CDCl_3$, S, ppm): 1.84 (s, 12H), 1.19 ppm (s, 18H), 4.70 (s, 2H), 7.04 (8H), 7.12 (s, 2H).

2) Preparation of Complex $Ni_{20}$ (Represented by the structural Formula IIIc, wherein $R^1$, $R^3$, $R^4$ and $R^6$ are methyl, $R^2$ and $R^5$ are bromine, $R^7$-$R^{10}$ and $R_{22}$ are hydrogen, $R_{21}$ is tert-Butyl, $R_{11}$ is Ethyl, M is Nickel, Y is O, and X is Br):

A solution of 0.277 g (0.9 mmol) of $(DME)NiBr_2$ in ethanol (10 mL) was added slowly dropwise to a solution of 0.426 g (0.6 mmol) of ligand $L_{18}$ in dichloromethane (10 mL). The color of the solution immediately changed to deep red, and a large quantity of precipitants was formed. The reaction was stirred at room temperature for 6 h, and then anhydrous diethyl ether was added to perform precipitation. A filtration was performed to afford a filter cake, and the filter cake was washed with anhydrous diethyl ether and dried in vacuum to afford $Ni_{20}$ as brownish-red powdery solids. Yield: 82.0%. Elemental analysis (calculated for $C_{84}H_{94}Br_{10}N_4Ni_3O_2$): C, 46.56; H, 4.37; N, 2.59; experimental value (%): C, 46.43; H, 4.72; N, 2.98.

3) Ethylene Polymerization:

After having been continuously dried at 130° C. for 6 hrs, a 1 L stainless steel polymerization autoclave equipped with mechanical stirring was evacuated while it was hot and then filled with $N_2$ gas 3 times. 500 mL of hexane was charged into the polymerization autoclave, then 5.0 mL of methylaluminoxane (MAO) (1.53 mol/l solution in toluene) was added, and 5.4 mg (2.5 μmol) of the complex $Ni_{20}$ was added. The reaction was vigorously stirred at 100° C. for 30 minutes, with ethylene pressure being maintained at 10 atm. The reaction mixture was neutralized with an ethanol solution acidified with 10 wt % hydrochloric acid to obtain a polyethylene. The results are shown in Table 4 below.

Example 52

1) Preparation of Complex $Ni_2n$ (Represented by the Structural Formula IIIc, wherein $R^1$, $R^3$, $R^4$ and $R^6$ are Ethyl, $R^2$, $R^5$, $R^7$-$R^{10}$ and $R_{22}$ are Hydrogen, $R_{21}$ is Tert-Butyl, $R_{11}$ is Isobutyl, M is Nickel, Y is O, and X is Br):

A solution of 0.277 g (0.9 mmol) of (DME)NiBr$_2$ in 2-methyl-1-propanol (10 mL) was added slowly dropwise to a solution of 0.365 g (0.6 mmol) of ligand $L_{17}$ in dichloromethane (10 mL). The color of the solution immediately changed to deep red, and a large quantity of precipitants was formed. The reaction was stirred at room temperature for 6 h, and then anhydrous diethyl ether was added to perform precipitation. A filtration was performed to afford a filter cake, and the filter cake was washed with anhydrous diethyl ether and dried in vacuum to afford $Ni_{21}$ as brownish-red powdery solids. Yield: 83.0%. Elemental analysis (calculated for $C_{96}H_{122}Br_6N_4Ni_3O_2$): C, 57.09; H, 6.09; N, 2.77; experimental value (%): C, 57.24; H, 6.32; N, 3.04.

3) Ethylene Polymerization:

After having been continuously dried at 130° C. for 6 hrs, a 1 L stainless steel polymerization autoclave equipped with mechanical stirring was evacuated while it was hot and then filled with $N_2$ gas 3 times. 500 mL of hexane was charged into the polymerization autoclave, then 5.0 mL of methylaluminoxane (MAO) (1.53 mol/l solution in toluene) was added, and 5.0 mg (2.5 μmol) of the complex $Ni_{21}$ was added. The reaction was vigorously stirred at 60° C. for 30 minutes, with ethylene pressure being maintained at 10 atm. The reaction mixture was neutralized with an ethanol solution acidified with 10 wt % hydrochloric acid to obtain a polyethylene. The results are shown in Table 4 below.

Example 53

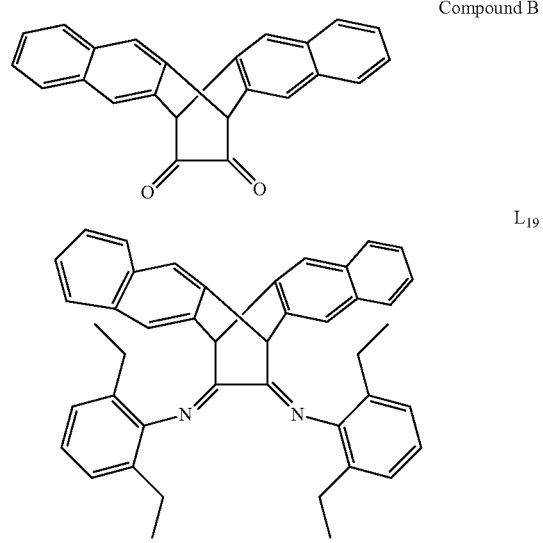

1) Ligand $L_{19}$ was prepared by following the method disclosed in patent application CN201510462932.2 and by using the compound B as a raw material.

2) Preparation of Complex $Ni_{22}$ (Represented by Formula IIIc', wherein $R^1$=$R^3$=$R^4$=$R^6$=Et, $R^2$=$R^5$=$R^7$-$R^{10}$=$R_{31}$=$R_{32}$=H, $R_{11}$=Et, M=Ni, Y=O, and X=Br):

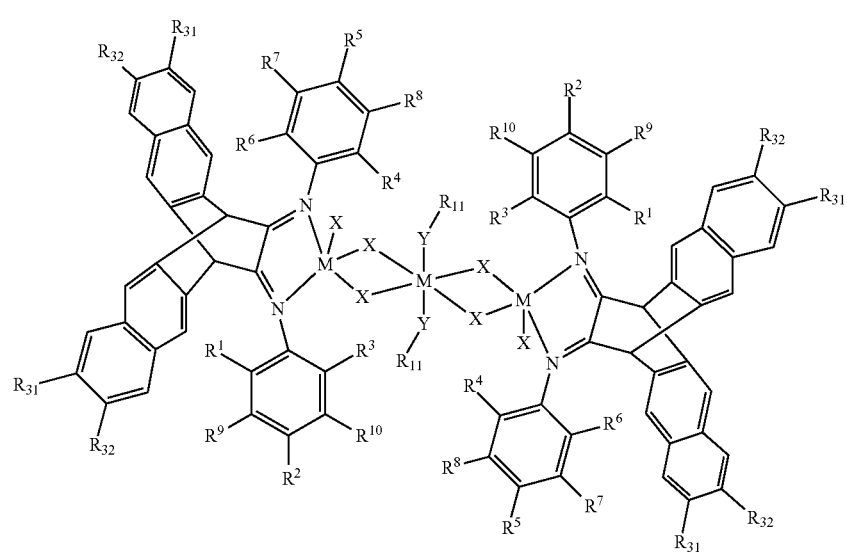

A solution of 0.277 g (0.9 mmol) of (DME)NiBr$_2$ in ethanol (10 mL) was added slowly dropwise to a solution of 0.358 g (0.6 mmol) of ligand Lie in dichloromethane (10 mL). The color of the solution immediately changed to deep red, and a large quantity of precipitants was formed. The reaction was stirred at room temperature for 6 h, and then anhydrous diethyl ether was added to perform precipitation. A filtration was performed to afford a filter cake, and the filter cake was washed with anhydrous diethyl ether and dried in vacuum to afford Ni$_{22}$ as brownish-red powdery solids. Yield: 84.3%. Elemental analysis (calculated for C$_{92}$H$_{90}$Br$_6$N$_4$Ni$_3$O$_2$): C, 56.98; H, 4.68; N, 2.89; experimental value (%): C, 56.78; H, 4.62; N, 3.18.

3) Ethylene Polymerization:

After having been continuously dried at 130° C. for 6 hrs, a 1 L stainless steel polymerization autoclave equipped with mechanical stirring was evacuated while it was hot and then filled with N$_2$ gas 3 times. 500 mL of hexane was charged into the polymerization autoclave, then 5.0 mL of methylaluminoxane (MAO) (1.53 mol/l solution in toluene) was added, and 4.8 mg (2.5 µmol) of the complex Ni$_{22}$ was added. The reaction was vigorously stirred at 60° C. for 30 minutes, with ethylene pressure being maintained at 10 atm. The reaction mixture was neutralized with an ethanol solution acidified with 10 wt % hydrochloric acid to obtain a polyethylene. The results are shown in Table 4 below.

Example 54

Ethylene polymerization was carried out according to the procedure for ethylene polymerization described in Example 53, except that the temperature for ethylene polymerization was 100° C. The results are shown in Table 4 below.

Comparative Example 11

Comparative catalyst E was prepared by following the literature Organometallics, 2013, 32, 2291-2299.

Ethylene Polymerization: After having been continuously dried at 130° C. for 6 hrs, a 1 L stainless steel polymerization autoclave equipped with mechanical stirring was evacuated while it was hot and then filled with N$_2$ gas 3 times. 500 mL of hexane was charged into the polymerization autoclave, then 5.0 mL of methylaluminoxane (MAO) (1.53 mol/l solution in toluene) was added, and 5.8 mg (7.5 µmol) of Comparative catalyst A was added. The reaction was vigorously stirred at 60° C. for 30 minutes, with ethylene pressure being maintained at 10 atm. The reaction mixture was neutralized with an ethanol solution acidified with 10 wt % hydrochloric acid to obtain a polyethylene. The results are shown in Table 4 below.

Comparative Example 12

Ethylene polymerization was carried out according to the procedure for ethylene polymerization described in Comparative Example 11, except that the temperature for ethylene polymerization was 100° C. The results are shown in Table 4 below.

Comparative Example 13

After having been continuously dried at 130° C. for 6 hrs, a 1 L stainless steel polymerization autoclave equipped with mechanical stirring was evacuated while it was hot and then filled with N$_2$ gas 3 times. 500 mL of hexane and 10 mL of 1-hexene were charged into the polymerization autoclave, then 5.0 mL of methylaluminoxane (MAO) (1.53 mol/l solution in toluene) was added, and 5.8 mg (7.5 µmol) of Comparative catalyst E was added. The reaction was vigorously stirred at 100° C. for 30 minutes, with ethylene pressure being maintained at 10 atm. The reaction mixture was neutralized with an ethanol solution acidified with 10 wt % hydrochloric acid to obtain a polymer. The results are shown in Table 4 below.

Comparative Example 4

Comparative catalyst F was prepared by following the literature J. Am. Chem. Soc, 1995, 117, 6414-6415.

After having been continuously dried at 130° C. for 6 hrs, a 1 L stainless steel polymerization autoclave equipped with mechanical stirring was evacuated while it was hot and then filled with N$_2$ gas 3 times. 500 mL of hexane was charged into the polymerization autoclave, then 5.0 mL of methylaluminoxane (MAO) (1.53 mol/l solution in toluene) was added, and 4.7 mg (7.5 µmol) of Comparative catalyst F was added. The reaction was vigorously stirred at 90° C. for 30 minutes, with ethylene pressure being maintained at 10 atm. The reaction mixture was neutralized with an ethanol solution acidified with 10 wt % hydrochloric acid to obtain a polyethylene. The results are shown in Table 4 below.

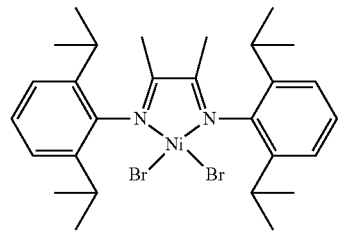

Comparative catalyst F

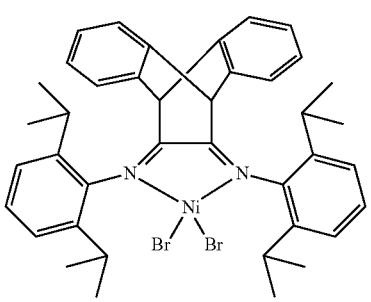

Comparative catalyst E

TABLE 4

| Example | Complex | Activity (10$^6$ g/molNi · h) | Mw × 10$^{-4}$ | Mw/Mn |
|---|---|---|---|---|
| Example 41 | Ni$_{18}$ | 2.12 | 128.0 | 2.31 |
| Example 42 | Ni$_{18}$ | 4.24 | 69.1 | 2.51 |
| Example 43 | Ni$_{18}$ | 4.84 | 70.2 | 2.32 |
| Example 44 | Ni$_{18}$ | 5.73 | 46.2 | 2.02 |
| Example 44A | Ni$_{18}$ | 1.27 | 13.22 | 2.01 |
| Example 45 | Ni$_{18}$ | 4.64 | 27.60 | 2.01 |
| Example 45A | Ni$_{18}$ | 1.04 | 12.17 | 2.01 |
| Example 46 | Ni$_{19}$ | 2.03 | 72.4 | 2.56 |
| Example 47 | Ni$_{19}$ | 3.26 | 28.4 | 2.86 |
| Example 48 | Ni$_{19}$ | 3.72 | 29.1 | 2.71 |

TABLE 4-continued

| Example | Complex | Activity (10⁶ g/molNi·h) | Mw × 10⁻⁴ | Mw/Mn |
|---|---|---|---|---|
| Example 49 | Ni₁₉ | 2.52 | 22.7 | 2.16 |
| Example 49A | Ni₁₉ | 1.02 | 10.4 | 2.13 |
| Example 50 | Ni₁₉ | 3.26 | 8.7 | 2.14 |
| Example 50A | Ni₁₉ | 1.13 | 5.3 | 2.13 |
| Example 51 | Ni₂₀ | 2.53 | 4.64 | 2.87 |
| Example 52 | Ni₂₁ | 1.96 | 53.2 | 2.63 |
| Example 53 | Ni₂₂ | 2.58 | 10.37 | 2.42 |
| Example 54 | Ni₂₂ | 4.17 | 5.26 | 2.20 |
| Comp. Ex. 11 | E | 1.58 | 110 | 2.81 |
| Comp. Ex. 12 | E | 3.45 | 54.5 | 2.79 |
| Comp. Ex. 13 | E | 3.62 | 60.8 | 2.58 |
| Comp. Ex. 14 | F | 0.02 | 0.68 | 2.14 |

It can be seen from Table 4 that when used as the main catalyst, the metal complexes of the present invention have higher polymerization activities under high temperature polymerization conditions, compared with the Comparative catalysts E and F, and the obtained polymers have a higher molecular weight and a narrower molecular weight distribution than that of the polymers obtained in the comparative examples.

The foregoing are only the preferred embodiments of the present invention and are not intended to limit the present invention. All modifications, equivalent replacements, changes, and the like made within the spirit and principle of the present invention shall be included in the protection of the present invention.

What is claimed is:

1. A diimine-metal complex represented by Formula I:

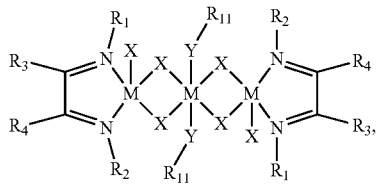

Formula I wherein, $R_1$ and $R_2$ are each independently a C1-C30 hydrocarbyl with or without a substituent Q;

$R_3$ and $R_4$ are each independently selected from the group consisting of hydrogen, halogen, hydroxy, C1-C20 hydrocarbyl with or without the substituent Q, C1-C20 alkoxy with or without the substituent Q, C2-C20 alkenoxy with or without the substituent Q, C2-C20 alkynoxy with or without the substituent Q, C6-C20 aryloxy with or without the substituent Q, C7-C20 aralkoxy with or without the substituent Q, and C7-C20 alkaryloxy with or without the substituent Q, and adjacent $R_3$ and $R_4$ groups are optionally joined to form a ring or ring system;

each $R_{11}$ is independently a C1-C20 hydrocarbyl with or without the substituent Q;

each Y is independently a Group VIA non-metal atom;

each M is independently a Group VIII metal; and each X is independently selected from the group consisting of halogen, C1-C10 hydrocarbyl with or without the substituent Q, and C1-C10 hydrocarbyloxy with or without the substituent Q, wherein each substituent Q is independently selected from the group consisting of halogen, hydroxy, C1-C10 alkyl, halogenated C1-C10 alkyl, C1-C10 alkoxy, and halogenated C1-C10 alkoxy;

$R_3$ and $R_4$ are each independently selected from the group consisting of hydrogen, halogen, hydroxy, C1-C10 alkyl with or without the substituent Q, C2-C10 alkenyl with or without the substituent Q, C2-C10 alkynyl with or without the substituent Q, C3-C10 cycloalkyl with or without the substituent Q, C1-C10 alkoxy with or without the substituent Q, C2-C10 alkenoxy with or without the substituent Q, C2-C10 alkynoxy with or without the substituent Q, C3-C10 cycloalkoxy with or without the substituent Q, C6-C15 aryl with or without the substituent Q, C6-C15 aryloxy with or without the substituent Q, C7-C15 aralkyl with or without the substituent Q, C7-C15 aralkoxy with or without the substituent Q, C7-C15 alkaryl with or without the substituent Q, and C7-C15 alkaryloxy with or without the substituent Q.

2. The diimine-metal complex as claimed in claim 1, wherein each substituent Q is independently selected from the group consisting of halogen, hydroxy, C1-C6 alkyl, halogenated C1-C6 alkyl, C1-C6 alkoxy, and halogenated C1-C6 alkoxy, and wherein $R_1$ and $R_2$ are independently selected from the group consisting of C1-C20 alkyl with or without the substituent Q and C6-C20 aryl with or without the substituent Q; and/or each M is independently selected from the group consisting of nickel and palladium; and/or each Y is independently selected from the group consisting of O and S; and/or each X is independently selected from the group consisting of halogen, C1-C10 alkyl with or without the substituent Q and C1-C10 alkoxy with or without the substituent Q; and/or each $R_{11}$ is independently a C1-C20 alkyl with or without the substituent Q; and/or $R_3$ and $R_4$ are each independently selected from the group consisting of hydrogen, halogen, hydroxy, C1-C20 alkyl with or without the substituent Q, C2-C20 alkenyl with or without the substituent Q, C2-C20 alkynyl with or without the substituent Q, C1-C20 alkoxy with or without the substituent Q, C2-C20 alkenoxy with or without the substituent Q, C2-C20 alkynoxy with or without the substituent Q, C6-C20 aryl with or without the substituent Q, C6-C20 aryloxy with or without the substituent Q, C7-C20 aralkyl with or without the substituent Q, C7-C20 aralkoxy with or without the substituent Q, C7-C20 alkaryl with or without the substituent Q, and C7-C20 alkaryloxy with or without the substituent Q.

3. The diimine-metal complex as claimed in claim 1, which is represented by Formula III:

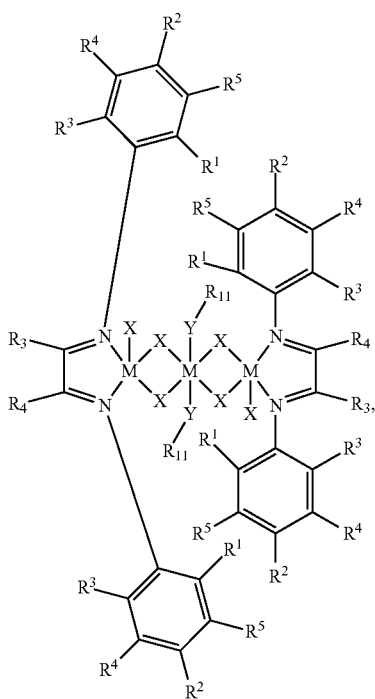

Formula III wherein, $R^1$-$R^5$ are each independently selected from the group consisting of hydrogen, halogen, hydroxy, C1-C10 alkyl with or without the substituent Q, C3-C10 cycloalkyl with or without the substituent Q, C1-C10 alkoxy with or without the substituent Q, C3-C10 cycloalkoxy with or without the substituent Q, C6-C15 aryl with or without the substituent Q, C7-C15 aralkyl with or without the substituent Q, and C7-C15 alkaryl with or without the substituent Q;

$R_3$ and $R_4$ are each independently selected from the group consisting of hydrogen, C1-C10 alkyl, halogenated C1-C10 alkyl, C1-C10 alkoxy, halogenated C1-C10 alkoxy and halogen;

each M is nickel;

each Y is O;

each X is independently selected from the group consisting of fluorine, chlorine and bromine; and each $R_{11}$ is independently a C1-C20 alkyl with or without the substituent Q.

4. The diimine-metal complex as claimed in claim 3, wherein in the Formula III, $R^1$-$R^5$ are each independently selected from the group consisting of hydrogen, halogen, hydroxy, C1-C10 alkyl with or without the substituent Q, C3-C10 cycloalkyl with or without the substituent Q, C1-C10 alkoxy with or without the substituent Q, C3-C10 cycloalkoxy with or without the substituent Q, C6-C15 aryl with or without the substituent Q, C7-C15 aralkyl with or without the substituent Q, and C7-C15 alkaryl with or without the substituent Q;

$R_3$ and $R_4$ are each independently selected the group consisting of hydrogen, C1-C6 alkyl, halogenated C1-C6 alkyl, C1-C6 alkoxy, halogenated C1-C6 alkoxy, and halogen;

each M is nickel;

each Y is O;

each X is independently selected from the group consisting of fluorine, chlorine, and bromine;

each $R_{11}$ is independently C1-C10 alkyl with or without the substituent Q; and each substituent Q is independently selected from the group consisting of halogen, hydroxy, C1-C6 alkyl, halogenated C1-C6 alkyl, C1-C6 alkoxy, and halogenated C1-C6 alkoxy.

5. The diimine-metal complex as claimed in claim 1, which is represented by Formula Ia:

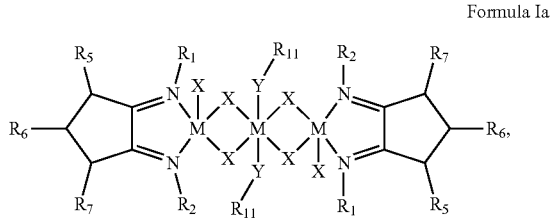

Formula Ia wherein, $R_5$-$R_7$ are each independently selected from the group consisting of hydrogen, halogen, hydroxy, C1-C20 hydrocarbyl with or without the substituent Q, C1-C10 alkoxy with or without the substituent Q, C2-C10 alkenoxy with or without the substituent Q, C2-C10 alkynoxy with or without the substituent Q, C3-C10 cycloalkoxy with or without the substituent Q, C6-C15 aryloxy with or without the substituent Q, C7-C15 aralkoxy with or without the substituent Q, and C7-C15 alkaryloxy with or without the substituent Q, and $R_5$-$R_7$ are optionally joined to form a ring or ring system; and $R_1$, $R_2$, $R_{11}$, Y, M and X are as defined for the Formula I.

6. The diimine-metal complex as claimed in claim 5, having at least one of the following features:

$R_1$ and $R_2$ are independently selected from the group consisting of C1-C20 alkyl with or without the substituent Q and C6-C20 aryl with or without the substituent Q;

each M is independently selected from the group consisting of nickel and palladium;

each Y is independently selected from the group consisting of O and S;

each X is independently selected from the group consisting of halogen, C1-C10 alkyl with or without the substituent Q and C1-C10 alkoxy with or without the substituent Q;

each $R_{11}$ is independently a C1-C20 alkyl with or without the substituent Q; and each substituent Q is independently selected from the group consisting of halogen, hydroxy, C1-C10 alkyl, halogenated C1-C10 alkyl, C1-C10 alkoxy, and halogenated C1-C10 alkoxy.

7. The diimine-metal complex as claimed in claim 5, which is represented by Formula IIa:

Formula IIa

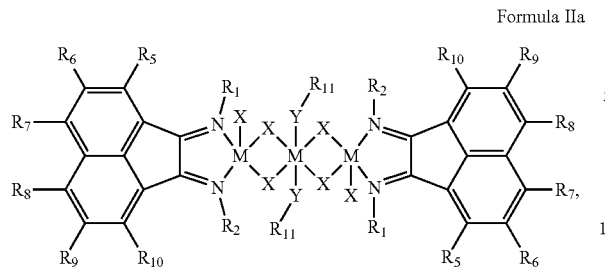

wherein, $R_5$-$R_{10}$ are each independently selected from the group consisting of hydrogen, halogen, hydroxy, C1-C20 alkyl with or without the substituent Q, C2-C20 alkenyl with or without the substituent Q, C2-C20 alkynyl with or without the substituent Q, C1-C20 alkoxy with or without the substituent Q, C2-C20 alkenoxy with or without the substituent Q, C2-C20 alkynoxy with or without the substituent Q, C6-C20 aryl with or without the substituent Q, C6-C20 aryloxy with or without the substituent Q, C7-C20 aralkyl with or without the substituent Q, C7-C20 aralkoxy with or without the substituent Q, C7-C20 alkaryl with or without the substituent Q and C7-C20 alkaryloxy with or without the substituent Q, and $R_1$, $R_2$, M, X, Y and $R_{11}$ are as defined for the Formula Ia.

8. The diimine-metal complex as claimed in claim 7, wherein the $R_5$-$R_{10}$ in Formula IIa are each independently selected from the group consisting of hydrogen, halogen, hydroxy, C1-C10 alkyl with or without the substituent Q, C2-C10 alkenyl with or without the substituent Q, C2-C10 alkynyl with or without the substituent Q, C3-C10 cycloalkyl with or without the substituent Q, C1-C10 alkoxy with or without the substituent Q, C2-C10 alkenoxy with or without the substituent Q, C2-C10 alkynoxy with or without the substituent Q, C3-C10 cycloalkoxy with or without the substituent Q, C6-C15 aryl with or without the substituent Q, C6-C15 aryloxy with or without the substituent Q, C7-C15 aralkyl with or without the substituent Q, C7-C15 aralkoxy with or without the substituent Q, C7-C15 alkaryl with or without the substituent Q, and C7-C15 alkaryloxy with or without the substituent Q.

9. The diimine-metal complex as claimed in claim 5, wherein the $R_5$-$R_7$ in Formula Ia are each independently selected from the group consisting of hydrogen, halogen, hydroxy, C1-C10 alkyl with or without the substituent Q, C2-C10 alkenyl with or without the substituent Q, C2-C10 alkynyl with or without the substituent Q, C3-C10 cycloalkyl with or without the substituent Q, C1-C10 alkoxy with or without the substituent Q, C2-C10 alkenoxy with or without the substituent Q, C2-C10 alkynoxy with or without the substituent Q, C3-C10 cycloalkoxy with or without the substituent Q, C6-C15 aryl with or without the substituent Q, C6-C15 aryloxy with or without the substituent Q, C7-C15 aralkyl with or without the substituent Q, C7-C15 aralkoxy with or without the substituent Q, C7-C15 alkaryl with or without the substituent Q, and C7-C15 alkaryloxy with or without the substituent Q.

10. The diimine-metal complex as claimed in claim 5, which is represented by Formula IIIa:

Formula IIIa

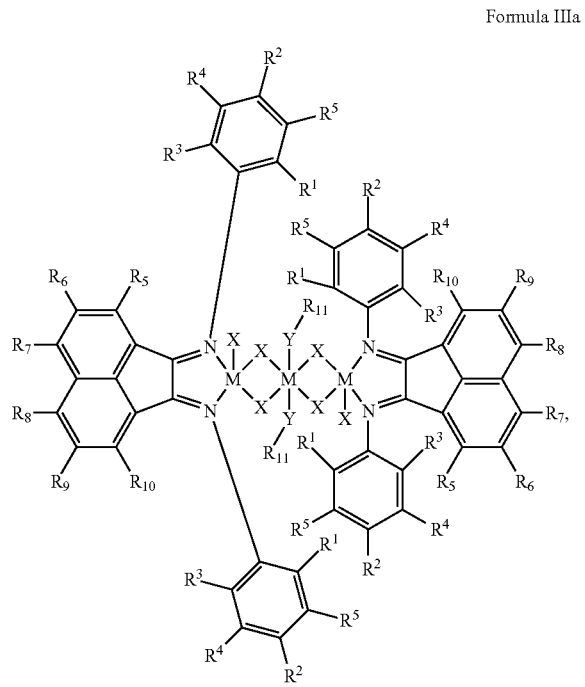

wherein, $R^1$-$R^5$ are each independently selected from the group consisting of hydrogen, halogen, C1-C6 alkyl with or without the substituent Q and C1-C6 alkoxy with or without the substituent Q; $R_5$-$R_{10}$ are each independently selected from the group consisting of hydrogen, halogen, C1-C6 alkyl and C1-C6 alkoxy; each M is nickel; each Y is O; each X is independently a halogen; and each $R_{11}$ is independently a C1-C6 alkyl with or without the substituent Q.

11. The diimine-metal complex as claimed in claim 10, wherein the diimine-metal complex is selected from the group consisting of 1) the complex represented by Formula IIIa, wherein $R^1=R^3=$isopropyl, $R^2=R^4=R^5=R_5$-$R_{10}=$H, $R_{11}=$methyl, M=Ni, Y=O, X=Br;
2) the complex represented by Formula IIIa, wherein $R^1=R^3=$ethyl, $R^2=R^4=R^5=R_5$-$R_{10}=$H, $R_{11}=$methyl, M=Ni, Y=O, X=Br;
3) the complex represented by Formula IIIa, wherein $R^1=R^3=$methyl, $R^2=R^4=R^5=R_5$-$R_{10}=$H, $R_{11}=$methyl, M=Ni, Y=O, X=Br;
4) the complex represented by Formula IIIa, wherein $R^1$-$R^3=$methyl, $R^4=R^5=R_5$-$R_{10}=$H, $R_{11}=$methyl, M=Ni, Y=O, X=Br;
5) the complex represented by Formula IIIa, wherein $R^1=R^3=$methyl, $R^2=$Br, $R_4=R^5=R_5$-$R_{10}=$H, $R_{11}=$methyl, M=Ni, Y=O, X=Br;
6) the complex represented by Formula IIIa, wherein $R_{11}=R_3=$Br, $R^2=R^4=R^5=R_5$-$R_{10}=$H, $R_{11}=$methyl, M=Ni, Y=O, X=Br;
7) the complex represented by Formula IIIa, wherein $R^1=R^3=$Cl, $R^2=R^4=R^5=R^5$-$R_{10}=$H, $R_{11}=$methyl, M=Ni, Y=O, X=Br;
8) the complex represented by Formula IIIa, wherein $R^1=R^3=$F, $R^2=R^4=R^5=R_5$-$R_{10}=$H, $R_{11}=$methyl, M=Ni, Y=O, X=Br;
9) the complex represented by Formula IIIa, wherein $R^1=R^3=$isopropyl, $R^2=R^4=R^5=R_5$-$R_{10}=$H, $R_{11}=$ethyl, M=Ni, Y=O, X=Br;

10) the complex represented by Formula IIIa, wherein $R^1=R^3$=ethyl, $R^2=R^4=R^5=R_5\text{-}R_{10}$=H, $R_{11}$=ethyl, M=Ni, Y=O, X=Br;
11) the complex represented by Formula IIIa, wherein $R^1=R^3$=methyl, $R^2=R^4=R^5=R_5\text{-}R_{10}$=H, $R_{11}$=ethyl, M=Ni, Y=O, X=Br;
12) the complex represented by Formula IIIa, wherein $R^1\text{-}R^3$=methyl, $R^4=R^5=R_5\text{-}R_{10}$=H, $R_{11}$=ethyl, M=Ni, Y=O, X=Br;
13) the complex represented by Formula IIIa, wherein $R^1=R^3$=methyl, $R^2$=Br, $R^4=R^5=R_5\text{-}R_{10}$=H, $R_{11}$=ethyl, M=Ni, Y=O, X=Br;
14) the complex represented by Formula IIIa, wherein $R^1=R^3$=Br, $R^2=R^4=R^5=R_5\text{-}R_{10}$=H, $R_{11}$=ethyl, M=Ni, Y=O, X=Br;
15) the complex represented by Formula IIIa, wherein $R^1=R^3$=Cl, $R^2=R^4=R^5=R_5\text{-}R_{10}$=H, $R_{11}$=ethyl, M=Ni, Y=O, X=Br;
16) the complex represented by Formula IIIa, wherein $R^1=R^3$=F, $R^2=R^4=R^5=R_5\text{-}R_{10}$=H, $R_{11}$=ethyl, M=Ni, Y=O, X=Br;
17) the complex represented by Formula IIIa, wherein $R^1=R^3$=isopropyl, $R^2=R^4=R^5=R_5\text{-}R_{10}$=H, $R_{11}$=isobutyl, M=Ni, Y=O, X=Br;
18) the complex represented by Formula IIIa, wherein $R^1=R^3$=ethyl, $R^2=R^4=R^5=R_5\text{-}R_{10}$=H, $R_{11}$=isobutyl, M=Ni, Y=O, X=Br;
19) the complex represented by Formula IIIa, wherein $R^1=R^3$=methyl, $R^2=R^4=R^5=R_5\text{-}R_{10}$=H, $R_{11}$=isobutyl, M=Ni, Y=O, X=Br;
20) the complex represented by Formula IIIa, wherein $R^1\text{-}R^3$=methyl, $R^4=R^5=R_5\text{-}R_{10}$=H, $R_{11}$=isobutyl, M=Ni, Y=O, X=Br;
21) the complex represented by Formula IIIa, wherein $R^1=R^3$=methyl, $R^2$=Br, $R^4=R^5=R_5\text{-}R_{10}$=H, $R_{11}$=isobutyl, M=Ni, Y=O, X=Br;
22) the complex represented by Formula IIIa, wherein $R^1=R^3$=Br, $R^2=R^4=R^5=R_5\text{-}R_{10}$=H, $R_{11}$=isobutyl, M=Ni, Y=O, X=Br;
23) the complex represented by Formula IIIa, wherein $R^1=R^3$=Cl, $R^2=R^4=R^5=R_5\text{-}R_{10}$=H, $R_{11}$=isobutyl, M=Ni, Y=O, X=Br;
24) the complex represented by Formula IIIa, wherein $R^1=R^3$=F, $R^2=R^4=R^5=R_5\text{-}R_{10}$=H, $R_{11}$=isobutyl, M=Ni, Y=O, X=Br;
25) the complex represented by Formula IIIa, wherein $R^1=R^3$=isopropyl, $R^2=R^4=R^5=R_5=R_6=R_9=R_{10}$=H, $R_7=R_8$=methyl, $R_{11}$=ethyl, M=Ni, Y=O, X=Br;
26) the complex represented by Formula IIIa, wherein $R^1=R^3$=ethyl, $R^2=R^4=R^5=R_5=R_6=R_9=R_{10}$=H, $R_7=R_8$=methyl, $R_{11}$=ethyl, M=Ni, Y=O, X=Br;
27) the complex represented by Formula IIIa, wherein $R^1=R^3$=methyl, $R^2=R^4=R^5=R_5=R_6=R_9=R_{10}$=H, $R_7=R_8$=methyl, $R_{11}$=ethyl, M=Ni, Y=O, X=Br;
28) the complex represented by Formula IIIa, wherein $R^1\text{-}R^3$=methyl, $R^4=R^5=R_5=R_6=R_9=R_{10}$=H, $R_7=R_8$=methyl, $R_{11}$=ethyl, M=Ni, Y=O, X=Br;
29) the complex represented by Formula IIIa, wherein $R^1=R^3$=methyl, $R^2$=Br, $R^4=R^5=R_5=R_6=R_9=R_{10}$=H, $R_7=R_8$=methyl, $R_{11}$=ethyl, M=Ni, Y=O, X=Br;
30) the complex represented by Formula IIIa, wherein $R^1=R^3$=Br, $R^2=R^4=R^5=R_5=R_6=R_9=R_{10}$=H, $R_7=R_8$=methyl, $R_{11}$=ethyl, M=Ni, Y=O, X=Br;
31) the complex represented by Formula IIIa, wherein $R^1=R^3$=Cl, $R^2=R^4=R^5=R_5=R_6=R_9=R_{10}$=H, $R_7=R_8$=methyl, $R_{11}$=ethyl, M=Ni, Y=O, X=Br; and
32) the complex represented by Formula IIIa, wherein $R^1=R^3$=F, $R^2=R^4=R^5=R_5=R_6=R_9=R_{10}$=H, $R_7=R_8$=methyl, $R_{11}$=ethyl, M=Ni, Y=O, X=Br.

12. The diimine-metal complex as claimed in claim 5, having at least one of the following features:

$R_1$ and $R_2$ are independently selected from the group consisting of C1-C20 alkyl with or without the substituent Q and C6-C20 aryl with or without the substituent Q, and at least one of $R_1$ and $R_2$ is a group represented by Formula A:

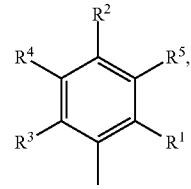

Formula A wherein, $R^1\text{-}R^5$ are each independently selected from the group consisting of hydrogen, halogen, hydroxy, C1-C20 alkyl with or without the substituent Q, C2-C20 alkenyl with or without the substituent Q, C2-C20 alkynyl with or without the substituent Q, C3-C20 cycloalkyl with or without the substituent Q, C1-C20 alkoxy with or without the substituent Q, C2-C20 alkenoxy with or without the substituent Q, C2-C20 alkynoxy with or without the substituent Q, C6-C20 aryl with or without the substituent Q, C6-C20 aryloxy with or without the substituent Q, C7-C20 aralkyl with or without the substituent Q, C7-C20 aralkoxy with or without the substituent Q, C7-C20 alkaryl with or without the substituent Q and C7-C20 alkaryloxy with or without the substituent Q, and $R^1\text{-}R^5$ are optionally joined to form a ring or ring system;

each M is independently selected from the group consisting of nickel and palladium;

each Y is independently selected from the group consisting of O and S;

each X is independently selected from the group consisting of halogen, C1-C6 alkyl with or without the substituent Q, and C1-C6 alkoxy with or without the substituent Q;

each $R_{11}$ is independently C1-C10 alkyl with or without the substituent Q; and each substituent Q is independently selected from the group consisting of halogen, hydroxy, C1-C6 alkyl, halogenated C1-C6 alkyl, C1-C6 alkoxy, and halogenated C1-C6 alkoxy.

13. The diimine-metal complex as claimed in claim 1, which is represented by Formula Ib:

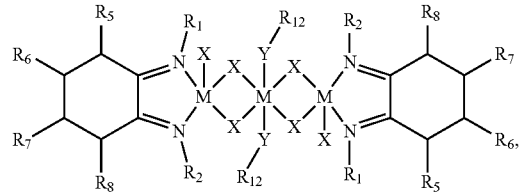

Formula Ib wherein, $R_1$ and $R_2$ are each independently a C1-C30 hydrocarbyl with or without the substituent Q; $R_5$-$R_8$ are each independently selected from the group consisting of hydrogen, halogen, hydroxy, C1-C20 hydrocarbyl with or without the substituent Q, and $R_5$-$R_8$ are optionally joined to form a ring or ring system; each $R_{12}$ is independently a C1-C20 hydrocarbyl with or without the substituent Q; each Y is independently a Group VIA nonmetal atom; each M is independently a Group VIII metal; and each X is independently selected from the group consisting of halogen, C1-C10 hydrocarbyl with or without the substituent Q, and C1-C10 hydrocarbyloxy with or without the substituent Q.

14. The diimine-metal complex as claimed in claim 13, having at least one of the following features:
$R_1$ and $R_2$ are independently selected from the group consisting of C1-C20 alkyl with or without the substituent Q and C6-C20 aryl with or without the substituent Q;
each M is independently selected from the group consisting of nickel and palladium;
each Y is independently selected from the group consisting of O and S;
each X is independently selected from the group consisting of halogen, C1-C10 alkyl with or without the substituent Q and C1-C10 alkoxy with or without the substituent Q;
each $R_{12}$ is independently a C1-C20 alkyl with or without the substituent Q; and
each substituent Q is independently selected from the group consisting of halogen, hydroxy, C1-C10 alkyl, halogenated C1-C10 alkyl, C1-C10 alkoxy, and halogenated C1-C10 alkoxy.

15. The diimine-metal complex as claimed in claim 13, which is represented by Formula IIIb:

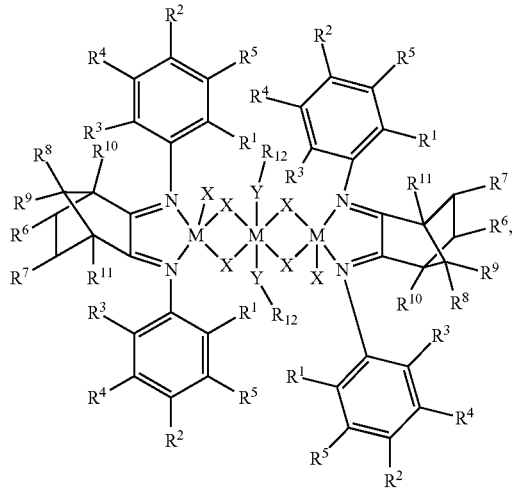

Formula IIIb wherein, $R^1$-$R^{11}$ are each independently selected from the group consisting of hydrogen, halogen, hydroxy, C1-C20 alkyl with or without the substituent Q, C2-C20 alkenyl with or without the substituent Q, C2-C20 alkynyl with or without the substituent Q, C1-C20 alkoxy with or without the substituent Q, C2-C20 alkenoxy with or without the substituent Q, C2-C20 alkynoxy with or without the substituent Q, C6-C20 aryl with or without the substituent Q, C6-C20 aryloxy with or without the substituent Q, C7-C20 aralkyl with or without the substituent Q, C7-C20 aralkoxy with or without the substituent Q, C7-C20 alkaryl with or without the substituent Q, and C7-C20 alkaryloxy with or without the substituent Q, and M, X, Y and $R_{12}$ are as defined for the Formula Ib.

16. The diimine-metal complex as claimed in claim 15, wherein $R^1$-$R^{11}$ are each independently selected from the group consisting of hydrogen, halogen, hydroxy, C1-C10 alkyl with or without the substituent Q, C2-C10 alkenyl with or without the substituent Q, C2-C10 alkynyl with or without the substituent Q, C3-C10 cycloalkyl with or without the substituent Q, C1-C10 alkoxy with or without the substituent Q, C2-C10 alkenoxy with or without the substituent Q, C2-C10 alkynoxy with or without the substituent Q, C3-C10 cycloalkoxy with or without the substituent Q, C6-C15 aryl with or without the substituent Q, C6-C15 aryloxy with or without the substituent Q, C7-C15 aralkyl with or without the substituent Q, C7-C15 aralkoxy with or without the substituent Q, C7-C15 alkaryl with or without the substituent Q, and C7-C15 alkaryloxy with or without the substituent Q.

17. The diimine-metal complex as claimed in claim 15, which is selected from the group consisting of
1) the diimine-metal complex represented by Formula IIIb, wherein $R^1$=$R^3$=methyl, $R^2$=$R^4$-$R^7$=$R^{10}$=H, $R^8$=$R^9$=$R^{11}$=$R_{12}$=methyl, M=Ni, Y=O, X=Br;
2) the diimine-metal complex represented by Formula IIIb, wherein $R^1$=$R^3$=ethyl, $R^2$=$R^4$-$R^7$=$R^{10}$=H, $R^8$=$R^9$=$R^{11}$=$R_{12}$=methyl, M=Ni, Y=O, X=Br;
3) the diimine-metal complex represented by Formula IIIb, wherein $R^1$=$R^3$=isopropyl, $R^2$=$R^4$-$R^7$=$R^{10}$=H, $R^8$=$R^9$=$R^{11}$=$R_{12}$=methyl, M=Ni, Y=O, X=Br;
4) the diimine-metal complex represented by Formula IIIb, wherein $R^1$-$R^3$=methyl, $R^4$-$R^7$=$R^{10}$=H, $R^8$=$R^9$=$R^{11}$=$R_{12}$=methyl, M=Ni, Y=O, X=Br;
5) the diimine-metal complex represented by Formula IIIb, wherein $R^1$=$R^3$=methyl, $R^2$=Br, $R^4$-$R^7$=$R^{10}$=H, $R^8$=$R^9$=$R^{11}$=$R_{12}$=methyl, M=Ni, Y=O, X=Br;
6) the diimine-metal complex represented by Formula IIIb, wherein $R^1$=$R^3$=F, $R^2$=$R^4$-$R^7$=$R^{10}$=H, $R^8$=$R^9$=$R^{11}$=$R_{12}$=methyl, M=Ni, Y=O, X=Br;
7) the diimine-metal complex represented by Formula IIIb, wherein $R^1$=$R^3$=Cl, $R^2$=$R^4$-$R^7$=$R^{10}$=H, $R^8$=$R^9$=$R^{11}$=$R_{12}$=methyl, M=Ni, Y=O, X=Br;
8) the diimine-metal complex represented by Formula IIIb, wherein $R^1$=$R^3$=Br, $R^2$=$R^4$-$R^7$=$R^{10}$=H, $R^8$=$R^9$=$R^{11}$=$R_{12}$=methyl, M=Ni, Y=O, X=Br;
9) the diimine-metal complex represented by Formula IIIb, wherein $R^1$=$R^3$=methyl, $R^2$=$R^4$-$R^7$=$R^{10}$=H, $R^8$=$R^9$=$R^{11}$=methyl, $R_{12}$=ethyl, M=Ni, Y=O, X=Br;
10) the diimine-metal complex represented by Formula IIIb, wherein $R^1$=$R^3$=ethyl, $R^2$=$R^4$-$R^7$=$R^{10}$=H, $R^8$=$R^9$=$R^{11}$=methyl, $R_{12}$=ethyl, M=Ni, Y=O, X=Br;
11) the diimine-metal complex represented by Formula IIIb, wherein $R^1$=$R^3$=isopropyl, $R^2$=$R^4$-$R^7$=$R^{10}$=H, $R^8$=$R^9$=$R^{11}$=methyl, $R_{12}$=ethyl, M=Ni, Y=O, X=Br;
12) the diimine-metal complex represented by Formula IIIb, wherein $R^1$-$R^3$=methyl, $R^4$-$R^7$=$R^{10}$=H, $R^8$=$R^9$=$R^{11}$=methyl, $R_{12}$=ethyl, M=Ni, Y=O, X=Br;
13) the diimine-metal complex represented by Formula IIIb, wherein $R^1$=$R^3$=methyl, $R^2$=Br, $R^4$-$R^7$=$R^{10}$=H, $R^8$=$R^9$=$R^{11}$=methyl, $R_{12}$=ethyl, M=Ni, Y=O, X=Br;
14) the diimine-metal complex represented by Formula IIIb, wherein $R^1$=$R^3$=F, $R^2$=$R^4$-$R^7$=$R^{10}$=H, $R^8$=$R^9$=$R^{11}$=methyl, $R_{12}$=ethyl, M=Ni, Y=O, X=Br;

15) the diimine-metal complex represented by Formula IIIb, wherein $R^1=R^3=Cl$, $R^2=R^4-R^7=R^{10}=H$, $R^8=R^9=R^{11}$=methyl, $R_{12}$=ethyl, M=Ni, Y=O, X=Br;
16) the diimine-metal complex represented by Formula IIIb, wherein $R^1=R^3=Br$, $R^2=R^4-R^7=R^{10}=H$, $R^8=R^9=R^{11}$=methyl, $R_{12}$=ethyl, M=Ni, Y=O, X=Br;
17) the diimine-metal complex represented by Formula IIIb, wherein $R^1=R^3$=methyl, $R^2=R^4-R^7=R^{10}=H$, $R^8=R^9=R^{11}$=methyl, $R_{12}$=isobutyl, M=Ni, Y=O, X=Br;
18) the diimine-metal complex represented by Formula IIIb, wherein $R^1=R^3$=ethyl, $R^2=R^4-R^7=R^{10}=H$, $R^8=R^9=R^{11}$=methyl, $R_{12}$=isobutyl, M=Ni, Y=O, X=Br;
19) the diimine-metal complex represented by Formula IIIb, wherein $R^1=R^3$=isopropyl, $R^2=R^4-R^7=R^{10}=H$, $R^8=R^9=R^{11}$=methyl, $R_{12}$=isobutyl, M=Ni, Y=O, X=Br;
20) the diimine-metal complex represented by Formula IIIb, wherein $R^1$-$R^3$=methyl, $R^4$-$R^7$=$R^{10}$=H, $R^8=R^9=R^{11}$=methyl, $R_{12}$=isobutyl, M=Ni, Y=O, X=Br;
21) the diimine-metal complex represented by Formula IIIb, wherein $R^1=R^3$=methyl, $R^2$=Br, $R^4$-$R^7$=$R^{10}$=H, $R^8=R^9=R^{11}$=methyl, $R_{12}$=isobutyl, M=Ni, Y=O, X=Br;
22) the diimine-metal complex represented by Formula IIIb, wherein $R^1=R^3=F$, $R^2=R^4-R^7=R^{10}=H$, $R^8=R^9=R^{11}$=methyl, $R_{12}$=isobutyl, M=Ni, Y=O, X=Br;
23) the diimine-metal complex represented by Formula IIIb, wherein $R^1=R^3=Cl$, $R^2=R^4-R^7=R^{10}=H$, $R^8=R^9=R^{11}$=methyl, $R_{12}$=isobutyl, M=Ni, Y=O, X=Br;
24) the diimine-metal complex represented by Formula IIIb, wherein $R^1=R^3=Br$, $R^2=R^4-R^7=R^{10}=H$, $R^8=R^9=R^{11}$=methyl, $R_{12}$=isobutyl, M=Ni, Y=O, X=Br;
25) the diimine-metal complex represented by Formula IIIb, wherein $R^1=R^3$=methyl, $R^2=R^4-R^7=R^{10}=H$, $R^8=R^9$=methyl, $R^{11}$=bromomethyl, $R_{12}$=ethyl, M=Ni, Y=O, X=Br;
26) the diimine-metal complex represented by Formula IIIb, wherein $R^1=R^3$=ethyl, $R^2=R^4-R^7=R^{10}=H$, $R^8=R^9$=methyl, $R^{11}$=bromomethyl, $R_{12}$=ethyl, M=Ni, Y=O, X=Br;
27) the diimine-metal complex represented by Formula IIIb, wherein $R^1=R^3$=isopropyl, $R^2=R^4-R^7=R^{10}=H$, $R^8=R^9$=methyl, $R^{11}$=bromomethyl, $R_{12}$=ethyl, M=Ni, Y=O, X=Br;
28) the diimine-metal complex represented by Formula IIIb, wherein $R^1$-$R^3$=methyl, $R^4$-$R^7$=$R^{10}$=H, $R^8=R^9$=methyl, $R^{11}$=bromomethyl, $R_{12}$=ethyl, M=Ni, Y=O, X=Br;
29) the diimine-metal complex represented by Formula IIIb, wherein $R^1=R^3$=methyl, $R^2$=Br, $R^4$-$R^7$=$R^{10}$=H, $R^8=R^9$=methyl, $R^{11}$=bromomethyl, $R_{12}$=ethyl, M=Ni, Y=O, X=Br;
30) the diimine-metal complex represented by Formula IIIb, wherein $R^1=R^3=F$, $R^2=R^4-R^7=R^{10}=H$, $R^8=R^9$=methyl, $R^{11}$=bromomethyl, $R_{12}$=ethyl, M=Ni, Y=O, X=Br;
31) the diimine-metal complex represented by Formula IIIb, wherein $R^1=R^3=Cl$, $R^2=R^4-R^7=R^{10}=H$, $R^8=R^9$=methyl, $R^{11}$=bromomethyl, $R_{12}$=ethyl, M=Ni, Y=O, X=Br; and
32) the diimine-metal complex represented by Formula IIIb, wherein $R^1=R^3=Br$, $R^2=R^4-R^7=R^{10}=H$, $R^8=R^9$=methyl, $R^{11}$=bromomethyl, $R_{12}$=ethyl, M=Ni, Y=O, X=Br.

18. The diimine-metal complex as claimed in claim 13, having at least one of the following features:

$R_1$ and $R_2$ are independently selected from the group consisting of C1-C20 alkyl with or without the substituent Q and C6-C20 aryl with or without the substituent Q, and at least one of $R_1$ and $R_2$ is a group represented by Formula A:

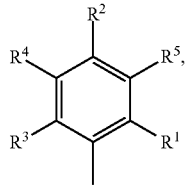

Formula A wherein, $R^1$-$R^5$ are each independently selected from the group consisting of hydrogen, halogen, hydroxy, C1-C20 alkyl with or without the substituent Q, C2-C20 alkenyl with or without the substituent Q, C2-C20 alkynyl with or without the substituent Q, C3-C20 cycloalkyl with or without the substituent Q, C1-C20 alkoxy with or without the substituent Q, C2-C20 alkenoxy with or without the substituent Q, C2-C20 alkynoxy with or without the substituent Q, C6-C20 aryl with or without the substituent Q, C6-C20 aryloxy with or without the substituent Q, C7-C20 aralkyl with or without the substituent Q, C7-C20 aralkoxy with or without the substituent Q, C7-C20 alkaryl with or without the substituent Q and C7-C20 alkaryloxy with or without the substituent Q, and $R^1$-$R^5$ are optionally joined to form a ring or ring system;

each M is independently selected from the group consisting of nickel and palladium;

each Y is independently selected from the group consisting of O and S;

each X is independently selected from the group consisting of halogen, C1-C6 alkyl with or without the substituent Q, and C1-C6 alkoxy with or without the substituent Q;

each $R_{12}$ is independently C1-C10 alkyl with or without the substituent Q; and each substituent Q is independently selected from the group consisting of halogen, hydroxy, C1-C6 alkyl, halogenated C1-C6 alkyl, C1-C6 alkoxy, and halogenated C1-C6 alkoxy.

19. The diimine-metal complex as claimed in claim 1, which is represented by Formula Ic:

Formula Ic

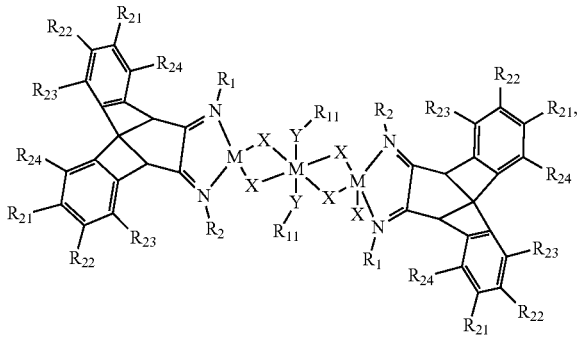

wherein, $R_{21}$-$R_{24}$ are each independently selected from the group consisting of hydrogen, halogen, hydroxy, C1-C20 hydrocarbyl with or without the substituent Q and C1-C20 hydrocarbyloxy with or without the substituent Q, and $R_{21}$-$R_{24}$ are optionally joined to form a ring or ring system; and $R_1$, $R_2$, $R_{11}$, Y, M and X are as defined for the Formula I.

20. The diimine-metal complex as claimed in claim 19, having at least one of the following features:

$R_1$ and $R_2$ are independently selected from the group consisting of C1-C20 alkyl with or without the substituent Q and C6-C20 aryl with or without the substituent Q;

each M is independently selected from the group consisting of nickel and palladium;

each Y is independently selected from the group consisting of O and S;

each X is independently selected from the group consisting of halogen, C1-C10 alkyl with or without the substituent Q, and C1-C10 alkoxy with or without the substituent Q;

each $R_{11}$ is independently a C1-C20 alkyl with or without the substituent Q; and each substituent Q is independently selected from the group consisting of halogen, hydroxy, C1-C10 alkyl, halogenated C1-C10 alkyl, C1-C10 alkoxy, and halogenated C1-C10 alkoxy.

21. The diimine-metal complex as claimed in claim 19, having a structure represented by Formula IIIc:

Formula IIIc

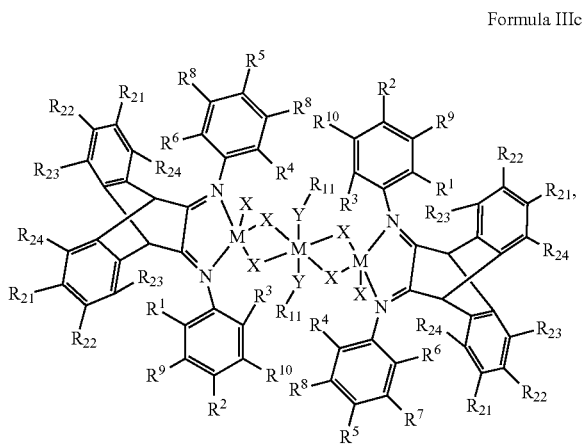

wherein, $R^1$-$R^{10}$, $R_{21}$-$R_{24}$ are each independently selected from the group consisting of hydrogen, halogen, hydroxy, C1-C20 alkyl with or without the substituent Q, C2-C20 alkenyl with or without the substituent Q, C2-C20 alkynyl with or without the substituent Q, C1-C20 alkoxy with or without the substituent Q, C2-C20 alkenoxy with or without the substituent Q, C2-C20 alkynoxy with or without the substituent Q, C6-C20 aryl with or without the substituent Q, C6-C20 aryloxy with or without the substituent Q, C7-C20 aralkyl with or without the substituent Q, C7-C20 aralkoxy with or without the substituent Q, C7-C20 alkaryl with or without the substituent Q, and C7-C20 alkaryloxy with or without the substituent Q, and $R^1$-$R^{10}$ are optionally joined to form a ring or ring system, $R_{21}$-$R_{24}$ are optionally joined to form a ring or ring system; and Ru, Y, M and X are as defined for the Formula Ic.

22. The diimine-metal complex as claimed in claim 21, wherein $R^1$-$R^{10}$, $R_{21}$-$R_{24}$ are each independently selected from the group consisting of hydrogen, halogen, hydroxy, C1-C10 alkyl with or without the substituent Q, C2-C10 alkenyl with or without the substituent Q, C2-C10 alkynyl with or without the substituent Q, C3-C10 cycloalkyl with or without the substituent Q, C1-C10 alkoxy with or without the substituent Q, C2-C10 alkenoxy with or without the substituent Q, C2-C10 alkynoxy with or without the substituent Q, C3-C10 cycloalkoxy with or without the substituent Q, C6-C15 aryl with or without the substituent Q, C6-C15 aryloxy with or without the substituent Q, C7-C15 aralkyl with or without the substituent Q, C7-C15 aralkoxy with or without the substituent Q, C7-C15 alkaryl with or without the substituent Q, and C7-C15 alkaryloxy with or without the substituent Q.

23. The diimine-metal complex as claimed in claim 21, which is selected from the group consisting of 1) the complex represented by Formula IIIc, wherein $R^1$=$R^3$=$R^4$=$R^6$=isopropyl, $R^2$=$R^5$=$R^7$-$R^{10}$=$R_{21}$=$R_{22}$=$R_{23}$=$R_{24}$=H, $R_{11}$=ethyl, M=Ni, Y=O, X=Br;

2) the complex represented by Formula IIIc, wherein $R^1$=$R^3$=$R^4$=$R^6$=ethyl, $R^2$=$R^5$=$R^7$-$R^{10}$=$R_{21}$=$R_{22}$=$R_{23}$=$R_{24}$=H, $R_{11}$=ethyl, M=Ni, Y=O, X=Br;

3) the complex represented by Formula IIIc, wherein $R^1$=$R^3$=$R^4$=$R^6$=methyl, $R^2$=$R^5$=$R^7$-$R^{10}$=$R_{21}$=$R_{22}$=$R_{23}$=$R_{24}$=H, $R_{11}$=ethyl, M=Ni, Y=O, X=Br;

4) the complex represented by Formula IIIc, wherein $R^1$-$R^6$=methyl, $R^7$-$R^{10}$=$R_{21}$=$R_{22}$=$R_{23}$=$R_{24}$=H, $R_{11}$=ethyl, M=Ni, Y=O, X=Br;

5) the complex represented by Formula IIIc, wherein $R^1$=$R^3$=$R^4$=$R^6$=Br, $R^2$=$R^5$=$R^7$-$R^{10}$=$R_{21}$=$R_{22}$=$R_{23}$=$R_{24}$=H, $R_{11}$=ethyl, M=Ni, Y=O, X=Br;

6) the complex represented by Formula IIIc, wherein $R^1$=$R^3$=$R^4$=$R^6$=Cl, $R^2$=$R^5$=$R^7$-$R^{10}$=$R_{21}$=$R_{22}$=$R_{23}$=$R_{24}$=H, $R_{11}$=ethyl, M=Ni, Y=O, X=Br;

7) the complex represented by Formula IIIc, wherein $R^1$=$R^3$=$R^4$=$R^6$=F, $R^2$=$R^5$=$R^7$-$R^{10}$=$R_{21}$=$R_{22}$=$R_{23}$=$R_{24}$=H, $R_{11}$=ethyl, M=Ni, Y=O, X=Br;

8) the complex represented by Formula IIIc, wherein $R^1$=$R^3$=$R^4$=$R^6$=isopropyl, $R^2$=$R^5$=$R^7$-$R^{10}$=$R_{21}$=$R_{22}$=$R_{23}$=$R_{24}$=H, $R_{11}$=isobutyl, M=Ni, Y=O, X=Br;

9) the complex represented by Formula IIIc, wherein $R^1=R^3=R^4=R^6$=ethyl, $R^2=R^5=R^7$-$R^{10}=R_{21}=R_{22}=R_{23}=R_{24}$=H, $R_{11}$=isobutyl, M=Ni, Y=O, X=Br;
10) the complex represented by Formula IIIc, wherein $R^1=R^3=R^4=R^6$=methyl, $R^2=R^5=R^7$-$R^{10}=R_{21}=R_{22}=R_{23}=R_{24}$=H, $R_{11}$=isobutyl, M=Ni, Y=O, X=Br;
11) the complex represented by Formula IIIc, wherein $R^1$-$R^6$=methyl, $R^7$-$R^{10}=R_{21}=R_{22}=R_{23}=R_{24}$=H, $R_{11}$=isobutyl, M=Ni, Y=O, X=Br;
12) the complex represented by Formula IIIc, wherein $R^1=R^3=R^4=R^6$=Br, $R^2=R^5=R^7$-$R^{10}=R_{21}=R_{22}=R_{23}=R_{24}$=H, $R_{11}$=isobutyl, M=Ni, Y=O, X=Br;
13) the complex represented by Formula IIIc, wherein $R^1=R^3=R^4=R^6$=Cl, $R^2=R^5=R^7$-$R^{10}=R_{21}=R_{22}=R_{23}=R_{24}$=H, $R_{11}$=isobutyl, M=Ni, Y=O, X=Br;
14) the complex represented by Formula IIIc, wherein $R^1=R^3=R^4=R^6$=F, $R^2=R^5=R^7$-$R^{10}=R_{21}=R_{22}=R_{23}=R_{24}$=H, $R_{11}$=isobutyl, M=Ni, Y=O, X=Br;
15) the complex represented by Formula IIIc, wherein $R^1=R^3=R^4=R^6$=isopropyl, $R^2=R^5=R^7$-$R^{10}=R_{22}$=H, $R_{21}$=tert-butyl, $R_{23}=R_{24}$=H, $R_{11}$=ethyl, M=Ni, Y=O, X=Br;
16) the complex represented by Formula IIIc, wherein $R^1=R^3=R^4=R^6$=ethyl, $R^2=R^5=R^7$-$R^{10}=R_{22}$=H, $R_{21}$=tert-butyl, $R_{23}=R_{24}$=H, $R_{11}$=ethyl, M=Ni, Y=O, X=Br;
17) the complex represented by Formula IIIc, wherein $R^1=R^3=R^4=R^6$=methyl, $R^2=R^5=R^7$-$R^{10}=R_{22}$=H, $R_{21}$=tert-butyl, $R_{23}=R_{24}$=H, $R_{11}$=ethyl, M=Ni, Y=O, X=Br;
18) the complex represented by Formula IIIc, wherein $R^1$-$R^6$=methyl, $R^7$-$R^{10}=R_{22}$=H, $R_{21}$=tert-butyl, $R_{23}=R_{24}$=H, $R_{11}$=ethyl, M=Ni, Y=O, X=Br;
19) the complex represented by Formula IIIc, wherein $R^1=R^3=R^4=R^6$=Br, $R^2=R^5=R^7$-$R^{10}=R_{22}$=H, $R_{21}$=tert-butyl, $R_{23}=R_{24}$=H, $R_{11}$=ethyl, M=Ni, Y=O, X=Br;
20) the complex represented by Formula IIIc, wherein $R^1=R^3=R^4=R^6$=Cl, $R^2=R^5=R^7$-$R^{10}=R_{22}$=H, $R_{21}$=tert-butyl, $R_{23}=R_{24}$=H, $R_{11}$=ethyl, M=Ni, Y=O, X=Br;
21) the complex represented by Formula IIIc, wherein $R^1=R^3=R^4=R^6$=F, $R^2=R^5=R^7$-$R^{10}=R_{22}$=H, $R_{21}$=tert-butyl, $R_{23}=R_{24}$=H, $R_{11}$=ethyl, M=Ni, Y=O, X=Br;
22) the complex represented by Formula IIIc, wherein $R^1=R^3=R^4=R^6$=isopropyl, $R^2=R^5=R^7$-$R^{10}=R_{22}$=H, $R_{21}$=tert-butyl, $R_{23}=R_{24}$=H, $R_{11}$=isobutyl, M=Ni, Y=O, X=Br;
23) the complex represented by Formula IIIc, wherein $R^1=R^1=R^4=R^6$=ethyl, $R^2=R^5=R^7$-$R^{10}=R_{22}$=H, $R_{21}$=tert-butyl, $R_{23}=R_{24}$=H, $R_{11}$=isobutyl, M=Ni, Y=O, X=Br;
24) the complex represented by Formula IIIc, wherein $R^1=R^3=R^4=R^6$=methyl, $R^2=R^5=R^7$-$R^{10}=R_{22}$=H, $R_{21}$=tert-butyl, $R_{23}=R_{24}$=H, $R_{11}$=isobutyl, M=Ni, Y=O, X=Br;
25) the complex represented by Formula IIIc, wherein $R^1$-$R^6$=methyl, $R^7$-$R^{10}=R_{22}$=H, $R_{21}$=tert-butyl, $R_{23}=R_{24}$=H, $R_{11}$=isobutyl, M=Ni, Y=O, X=Br;
26) the complex represented by Formula IIIc, wherein $R^1=R^3=R^4=R^6$=Br, $R^2=R^5=R^7$-$R^{10}=R_{22}$=H, $R_{21}$=tert-butyl, $R_{23}=R_{24}$=H, $R_{11}$=isobutyl, M=Ni, Y=O, X=Br;
27) the complex represented by Formula IIIc, wherein $R^1=R^3=R^4=R^6$=Cl, $R^2=R^5=R^7$-$R^{10}=R_{22}$=H, $R_{21}$=tert-butyl, $R_{23}=R_{24}$=H, $R_{11}$=isobutyl, M=Ni, Y=O, X=Br;
28) the complex represented by Formula IIIc, wherein $R^1=R^3=R^4=R^6$=F, $R^2=R^5=R^7$-$R^{10}=R_{22}$=H, $R_{21}$=tert-butyl, $R_{23}=R_{24}$=H, $R_{11}$=isobutyl, M=Ni, Y=O, X=Br;

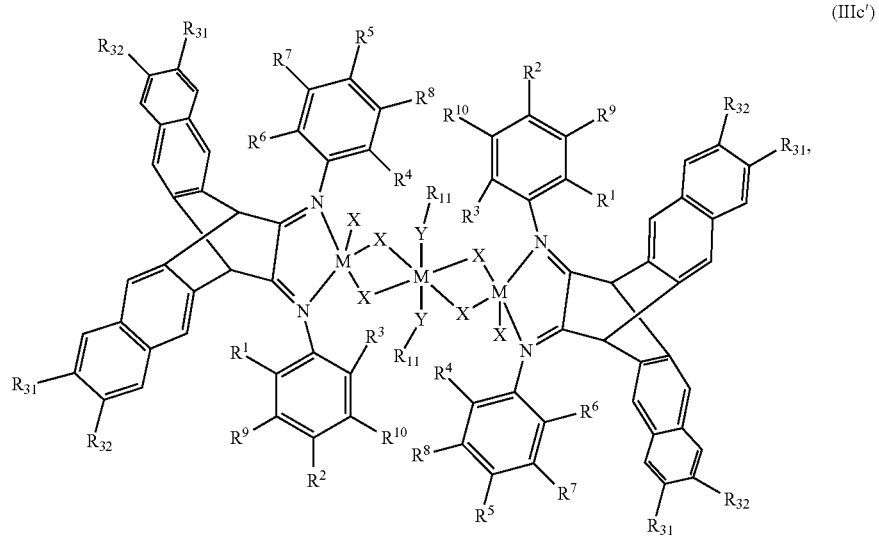

(IIIc')

29) the complex represented by Formula (IIIc'), wherein $R^1=R^3=R^4=R^6$=isopropyl, $R^2=R^5=R^7$-$R^{10}=R_{31}=R_{32}$=H, $R_{11}$=ethyl, M=Ni, Y=O, X=Br;
30) the complex represented by Formula (IIIc'), wherein $R^1=R^3=R^4=R^6$=ethyl, $R^2=R^5=R^7$-$R^{10}=R_{31}=R_{32}$=H, $R_{11}$=ethyl, M=Ni, Y=O, X=Br;
31) the complex represented by Formula (IIIc'), wherein $R^1=R^3=R^4=R^6$=methyl, $R^2=R^5=R^7$-$R^{10}=R_{31}=R_{32}$=H, $R_{11}$=ethyl, M=Ni, Y=O, X=Br;
32) the complex represented by Formula (IIIc'), wherein $R^1$-$R^6$=methyl, $R^7$-$R^{10}=R_{31}=R_{32}$=H, $R_{11}$=ethyl, M=Ni, Y=O, X=Br;

33) the complex represented by Formula (IIIc'), wherein $R^1=R^3=R^4=R^6=Br$, $R^2=R^5=R^7-R^{10}=R_{31}=R_{32}=H$, $R_{11}=$ethyl, M=Ni, Y=O, X=Br;
34) the complex represented by Formula (IIIc'), wherein $R^1=R^3=R^4=R^6=Cl$, $R^2=R^5=R^7-R^{10}=R_{31}=R_{32}=H$, $R_{11}=$ethyl, M=Ni, Y=O, X=Br;
35) the complex represented by Formula (IIIc'), wherein $R^1=R^3=R^4=R^6=F$, $R^2=R^5=R^7-R^{10}=R_{31}=R_{32}=H$, $R_{11}=$ethyl, M=Ni, Y=O, X=Br;
36) the complex represented by Formula (IIIc'), wherein $R^1=R^3=R^4=R^6=$isopropyl, $R^2=R^5=R^7-R^{10}=R_{31}=R_{32}=H$, $R_{11}=$isobutyl, M=Ni, Y=O, X=Br;
37) the complex represented by Formula (IIIc'), wherein $R^1=R^3=R^4=R^6=$ethyl, $R^2=R^5=R^7-R^{10}=R_{31}=R_{32}=H$, $R_{11}=$isobutyl, M=Ni, Y=O, X=Br;
38) the complex represented by Formula (IIIc'), wherein $R^1=R^3=R^4=R^6=$methyl, $R^2=R^5=R^7-R^{10}=R_{31}=R_{32}=H$, $R_{11}=$isobutyl, M=Ni, Y=O, X=Br;
39) the complex represented by Formula (IIIc'), wherein $R^1-R^6=$methyl, $R^7-R^{10}=R_{31}=R_{32}=H$, $R_{11}=$isobutyl, M=Ni, Y=O, X=Br;
40) the complex represented by Formula (IIIc'), wherein $R^1=R^3=R^4=R^6=Br$, $R^2=R^5=R^7-R^{10}=R_{31}=R_{32}=H$, $R_{11}=$isobutyl, M=Ni, Y=O, X=Br;
41) the complex represented by Formula (IIIc'), wherein $R^1=R^3=R^4=R^6=Cl$, $R^2=R^5=R^7-R^{10}=R_{31}=R_{32}=H$, $R_{11}=$isobutyl, M=Ni, Y=O, X=Br;
42) the complex represented by Formula (IIIc'), wherein $R^1=R^3=R^4=R^6=F$, $R^2=R^5=R^7-R^{10}=R_{31}=R_{32}=H$, $R_{11}=$isobutyl, M=Ni, Y=O, X=Br;
43) the complex represented by Formula (IIIc'), wherein $R^1=R^3=R^4=R^6=$isopropyl, $R^2=R^5=R^7-R^{10}=H$ $R_{31}=R_{32}=R_{11}=$ethyl, M=Ni, Y=O, X=Br;
44) the complex represented by Formula (IIIc'), wherein $R^1=R^3=R^4=R^6=$ethyl, $R^2=R^5=R^7-R^{10}=H$, $R_{31}=R_{32}=R_{11}=$ethyl, M=Ni, Y=O, X=Br;
45) the complex represented by Formula (IIIc'), wherein $R^1=R^3=R^4=R^6=$methyl, $R^2=R^5=R^7-R^{10}=H$, $R_{31}=R_{32}=R_{11}=$ethyl, M=Ni, Y=O, X=Br;
46) the complex represented by Formula (IIIc'), wherein $R^1-R^6=$methyl, $R^7-R^{10}=H$, $R_{31}=R_{32}=R_{11}=$ethyl, M=Ni, Y=O, X=Br;
47) the complex represented by Formula (IIIc'), wherein $R^1=R^3=R^4=R^6=Br$, $R^2=R^5=R^7-R^{10}=H$, $R_{31}=R_{32}=R_{11}=$ethyl, M=Ni, Y=O, X=Br;
48) the complex represented by Formula (IIIc'), wherein $R^1=R^3=R^4=R^6=Cl$, $R^2=R^5=R^7-R^{10}=H$, $R_{31}=R_{32}=R_{11}=$ethyl, M=Ni, Y=O, X=Br;
49) the complex represented by Formula (IIIc'), wherein $R^1R_3=R_4=R^6=F$, $R^2=R^5=R^7-R^{10}=H$, $R_{31}=R_{32}=R_{11}=$ethyl, M=Ni, Y=O, X=Br;
50) the complex represented by Formula (IIIc'), wherein $R^1=R^3=R^4=R^6=$isopropyl, $R^2=R^5=R^7-R^{10}=H$, $R_{31}=R_{32}=R_{11}=$ethyl, M=Ni, Y=O, X=Br;
51) the complex represented by Formula (IIIc'), wherein $R^1=R^3=R^4=R^6=$ethyl, $R^2=R^5=R^7-R^{10}=H$, $R_{31}=R_{32}=$ethyl, $R_{11}=$isobutyl, M=Ni, Y=O, X=Br;
52) the complex represented by Formula (IIIc'), wherein $R^1=R^3=R^4=R^6=$methyl, $R^2=R^5=R^7-R^{10}=H$, $R_{31}=R_{32}=$ethyl, $R_{11}=$isobutyl, M=Ni, Y=O, X=Br;
53) the complex represented by Formula (IIIc'), wherein $R^1-R^6=$methyl, $R^7-R^{10}=H$, $R_{31}=R_{32}=$ethyl, $R_{11}=$isobutyl, M=Ni, Y=O, X=Br;
54) the complex represented by Formula (IIIc'), wherein $R^1=R^3=R^4=R^6=Br$, $R^2=R^5=R^7-R^{10}=H$, $R_{31}=R_{32}=$ethyl, $R_{11}=$isobutyl, M=Ni, Y=O, X=Br;
55) the complex represented by Formula (IIIc'), wherein $R^1=R^3=R^4=R^6=Cl$, $R^2=R^5=R^7-R^{10}=H$, $R_{31}=R_{32}=$ethyl, $R_{11}=$isobutyl, M=Ni, Y=O, X=Br; and
56) the complex represented by Formula (IIIc'), wherein $R^1=R^3=R^4=R^6=F$, $R^2=R^5=R^7-R^{10}=H$, $R_{31}=R_{32}=$ethyl, $R_{11}=$isobutyl, M=Ni, Y=O, X=Br.

24. The diimine-metal complex as claimed in claim 19, having at least one of the following features:

$R_1$ and $R_2$ are independently selected from the group consisting of C1-C20 alkyl with or without the substituent Q and C6-C20 aryl with or without the substituent Q, and at least one of $R_1$ and $R_2$ is a group represented by Formula A:

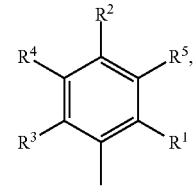

Formula A wherein, $R^1$-$R^5$ are each independently selected from the group consisting of hydrogen, halogen, hydroxy, C1-C20 alkyl with or without the substituent Q, C2-C20 alkenyl with or without the substituent Q, C2-C20 alkynyl with or without the substituent Q, C3-C20 cycloalkyl with or without the substituent Q, C1-C20 alkoxy with or without the substituent Q, C2-C20 alkenoxy with or without the substituent Q, C2-C20 alkynoxy with or without the substituent Q, C6-C20 aryl with or without the substituent Q, C6-C20 aryloxy with or without the substituent Q, C7-C20 aralkyl with or without the substituent Q, C7-C20 aralkoxy with or without the substituent Q, C7-C20 alkaryl with or without the substituent Q and C7-C20 alkaryloxy with or without the substituent Q, and $R^1$-$R^5$ are optionally joined to form a ring or ring system;

each M is independently selected from the group consisting of nickel and palladium;

each Y is independently selected from the group consisting of O and S;

each X is independently selected from the group consisting of halogen, C1-C6 alkyl with or without the substituent Q, and C1-C6 alkoxy with or without the substituent Q;

each $R_{11}$ is independently a C1-C10 alkyl with or without the substituent Q; and each substituent Q is independently selected from the group consisting of halogen, hydroxy, C1-C6 alkyl, halogenated C1-C6 alkyl, C1-C6 alkoxy, and halogenated C1-C6 alkoxy.

25. The diimine-metal complex as claimed in claim 1, having at least one of the following features:

$R_1$ and $R_2$ are independently selected from the group consisting of C1-C20 alkyl with or without the substituent Q and C6-C20 aryl with or without the substituent Q, and at least one of $R_1$ and $R_2$ is a group represented by Formula A:

Formula A

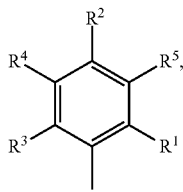

wherein, $R^1$-$R^5$ are each independently selected from the group consisting of hydrogen, halogen, hydroxy, C1-C20 alkyl with or without the substituent Q, C2-C20 alkenyl with or without the substituent Q, C2-C20 alkynyl with or without the substituent Q, C1-C20 alkoxy with or without the substituent Q, C2-C20 alkenoxy with or without the substituent Q, C2-C20 alkynoxy with or without the substituent Q, C6-C20 aryl with or without the substituent Q, C6-C20 aryloxy with or without the substituent Q, C7-C20 aralkyl with or without the substituent Q, C7-C20 aralkoxy with or without the substituent Q, C7-C20 alkaryl with or without the substituent Q and C7-C20 alkaryloxy with or without the substituent Q, and $R^1$-$R^5$ are optionally joined to form a ring or ring system;

each M is independently selected from the group consisting of nickel and palladium;

each Y is independently selected from the group consisting of O and S;

each X is independently selected from the group consisting of halogen, C1-C6 alkyl with or without the substituent Q and C1-C6 alkoxy with or without the substituent Q;

each $R_{11}$ is independently a C1-C10 alkyl with or without the substituent Q; and $R_3$ and $R_4$ are each independently selected from the group consisting of hydrogen, halogen, hydroxy, C1-C10 alkyl with or without the substituent Q, C2-C10 alkenyl with or without the substituent Q, C2-C10 alkynyl with or without the substituent Q, C3-C10 cycloalkyl with or without the substituent Q, C1-C10 alkoxy with or without the substituent Q, C2-C10 alkenoxy with or without the substituent Q, C2-C10 alkynoxy with or without the substituent Q, C3-C10 cycloalkoxy with or without the substituent Q, C6-C15 aryl with or without the substituent Q, C6-C15 aryloxy with or without the substituent Q, C7-C15 aralkyl with or without the substituent Q, C7-C15 aralkoxy with or without the substituent Q, C7-C15 alkaryl with or without the substituent Q, and C7-C15 alkaryloxy with or without the substituent Q.

26. A method for preparing the diamine-metal complex according to claim 1, comprising step 1) reacting a diimine compound represented by Formula IV with $MX_n$ and $R_{11}YH$ to generate the diamine-metal complex represented by Formula I,

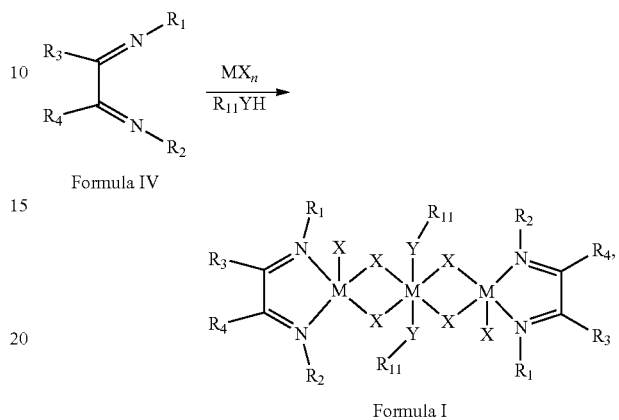

wherein, the $R_1$, $R_2$, $R_3$ and $R_4$ in Formula IV have the meanings as defined for Formula I;

in the $MX_n$, M is a Group VIII metal; each X is independently selected from the group consisting of halogen, C1-C10 hydrocarbyl with or without the substituent Q and C1-C10 hydrocarbyloxy with or without the substituent Q, and n is the number of X satisfying the valence state of M; and in the $R_{11}YH$, $R_{11}$ is a C1-C20 hydrocarbyl with or without the substituent Q, and Y is a Group VIA non-metal atom.

27. The method as claimed in claim 26, wherein the reaction in step 1) is carried out in an organic solvent, which is a halogenated alkane.

28. A catalyst for olefin polymerization, comprising the diamine-metal complex as claimed in claim 1, and one or both of a co-catalyst and a chain transfer agent.

29. A process for olefin polymerization, comprising conducting an olefin polymerization reaction in the presence of the catalyst according to claim 28, with a temperature for the polymerization reaction ranging from −78° C. to 200° C., and a polymerization pressure ranging from 0.01 to 10.0 MPa.

* * * * *